(12) United States Patent
Schuetzle et al.

(10) Patent No.: US 7,980,829 B2
(45) Date of Patent: Jul. 19, 2011

(54) RADIAL TYPE RECIPROCATING COMPRESSOR AND PORTABLE TOOL POWERING SYSTEM WITH FLEXING CONNECTING ROD ARRANGEMENT

(76) Inventors: Larry Alvin Schuetzle, Calgary (CA); Lloyd Dean Penner, Calgary (CA)

( * ) Notice: Subject to any disclaimer, the term of this patent is extended or adjusted under 35 U.S.C. 154(b) by 364 days.

(21) Appl. No.: 11/760,325

(22) Filed: Jun. 8, 2007

(65) Prior Publication Data
US 2008/0003119 A1    Jan. 3, 2008

Related U.S. Application Data

(60) Provisional application No. 60/804,216, filed on Jun. 8, 2006.

(51) Int. Cl.
*F04B 1/04* (2006.01)
*F04B 39/10* (2006.01)
*F04B 17/03* (2006.01)
(52) U.S. Cl. .......................... 417/273; 92/148
(58) Field of Classification Search .................. 417/273, 417/411, 564; 91/491, 495; 92/171.1, 72, 92/148, 140, 249
See application file for complete search history.

(56) References Cited

U.S. PATENT DOCUMENTS

| 167,604 | A | | 9/1875 | Chisholm | |
|---|---|---|---|---|---|
| 1,368,315 | A | | 2/1921 | Wygodsky | |
| 2,023,609 | A | * | 12/1935 | Nelson | 417/273 |
| 2,255,851 | A | | 9/1941 | Lundin | |
| 2,255,852 | A | | 9/1941 | Lundin | |
| 2,284,645 | A | * | 6/1942 | Duffy | 417/419 |
| 2,309,551 | A | * | 1/1943 | Trapp et al. | 92/72 |
| 2,466,215 | A | * | 4/1949 | Ekleberry | 417/273 |
| 2,544,055 | A | * | 3/1951 | Staats | 74/600 |
| 2,568,357 | A | * | 9/1951 | Moulden | 417/221 |
| 2,621,607 | A | * | 12/1952 | Trapp | 417/273 |
| 3,035,757 | A | | 5/1962 | Poore et al. | |

(Continued)

FOREIGN PATENT DOCUMENTS
DE    4109072    9/1991
(Continued)

OTHER PUBLICATIONS
Machine Translation of DE19626938A1.*
(Continued)

*Primary Examiner* — Devon C Kramer
*Assistant Examiner* — Nathan Zollinger
(74) *Attorney, Agent, or Firm* — Michael R. Williams; Ryan W. Dupuis; Ade & Company Inc.

(57) ABSTRACT

A reciprocating compressor or pump features a manifold arranged not only to define a hollow interior for receiving fluid discharged from a plurality of cylinders but also to define a base or frame on which the cylinders are carried. Unique valves formed in part by flexible material reduces the likelihood of fatigue and increases efficiency by retaining less heat relative to conventional reed valves. A compressor or pump mounted at an end of a handle extending parallel to a motor housing likewise extending from the compressor or pump provides an easy to carry portable assembly. A fan mounted between a motor and a compressor pulls air through the compressor inlet to both cool the motor and feed the compressor. A portable tool system powers both pneumatic and electric tools. Connecting rod structures for radial compressors or pumps provide improved strength and easier assembly.

19 Claims, 29 Drawing Sheets

U.S. PATENT DOCUMENTS

| | | | |
|---|---|---|---|
| 3,366,073 A * | 1/1968 | Andrews et al. | 92/140 |
| 3,570,372 A * | 3/1971 | Campbell | 91/496 |
| 3,779,672 A * | 12/1973 | Schroeder | 417/493 |
| 3,924,968 A | 12/1975 | Gaines et al. | |
| 3,931,554 A | 1/1976 | Spentzas | |
| 3,961,868 A | 6/1976 | Droege, Sr. et al. | |
| 3,965,756 A | 6/1976 | Valles | |
| 3,968,736 A * | 7/1976 | Pecorari | 92/165 R |
| 3,981,229 A * | 9/1976 | Breisch et al. | 92/72 |
| 4,094,567 A | 6/1978 | Karcher et al. | |
| 4,223,595 A * | 9/1980 | Ortelli | 92/72 |
| 4,311,437 A | 1/1982 | Liska | |
| 4,358,251 A | 11/1982 | Gannaway | |
| 4,381,179 A * | 4/1983 | Pareja | 417/273 |
| 4,498,372 A * | 2/1985 | Pareja | 92/187 |
| 4,676,724 A | 6/1987 | Birdwell | |
| 4,715,787 A | 12/1987 | Hung | |
| 4,759,560 A | 7/1988 | Virgulti | |
| 4,776,776 A | 10/1988 | Jones | |
| 4,863,073 A | 9/1989 | Burt et al. | |
| 5,030,065 A | 7/1991 | Baumann | |
| 5,035,613 A | 7/1991 | Breads et al. | |
| 5,095,259 A | 3/1992 | Bailey et al. | |
| 5,375,982 A * | 12/1994 | Joosse et al. | 417/273 |
| 6,089,835 A | 7/2000 | Suzuura et al. | |
| 6,589,024 B2 | 7/2003 | Nishikawa et al. | |
| 6,692,239 B2 | 2/2004 | Nishikawa et al. | |
| 6,913,450 B2 | 7/2005 | Hong et al. | |
| 6,942,464 B2 | 9/2005 | Brashears et al. | |
| 6,991,436 B2 | 1/2006 | Beckman et al. | |
| 7,220,248 B2 | 5/2007 | Mernoe | |
| 2002/0081215 A1 * | 6/2002 | Plaga | 417/273 |
| 2002/0158102 A1 | 10/2002 | Patton et al. | |
| 2004/0007824 A1 | 1/2004 | Durham | |
| 2005/0214136 A1 | 9/2005 | Tsai | |
| 2005/0265873 A1 | 12/2005 | Chou | |

FOREIGN PATENT DOCUMENTS

| | | |
|---|---|---|
| DE | 4318073 | 12/1993 |
| DE | 19626938 A1 * | 1/1998 |
| JP | 59190486 | 10/1984 |
| JP | 59190486 A * | 10/1984 |
| JP | 06292317 | 10/1994 |
| JP | 2001050438 | 2/2001 |
| KR | 20010070644 | 7/2001 |
| WO | WO 01/29421 | 4/2001 |

OTHER PUBLICATIONS

Earth Systems Solutions, Compressor/Manifold Unit, http://www.earthsystemssolutions.com/assets/compressor.html, date unknown, pp. 1 to 6.

* cited by examiner

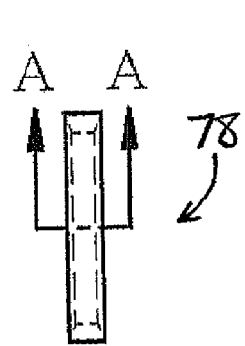
FIG. 20
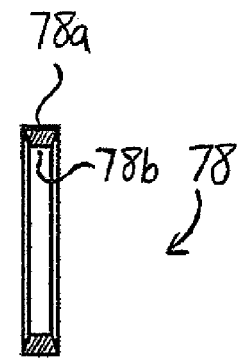
FIG. 20A
FIG. 19
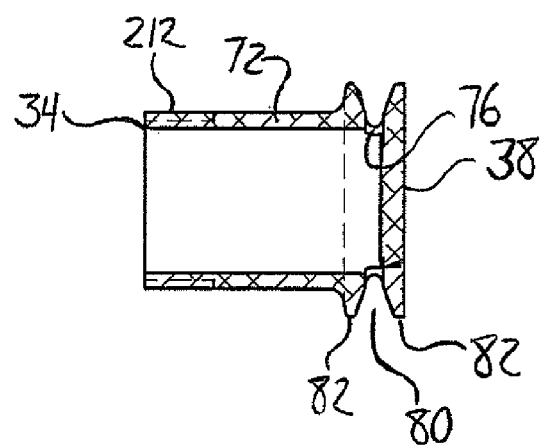

FIG. 25
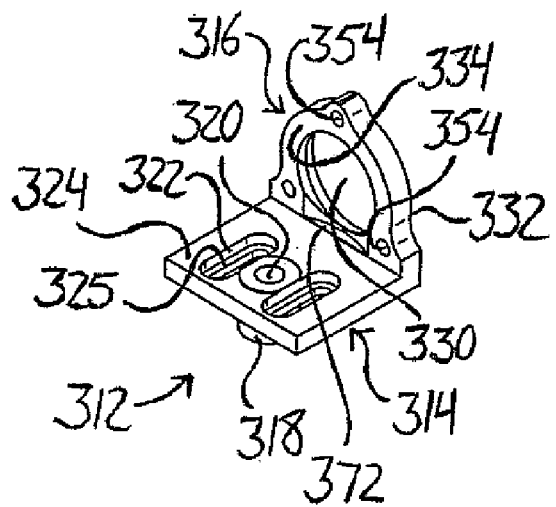
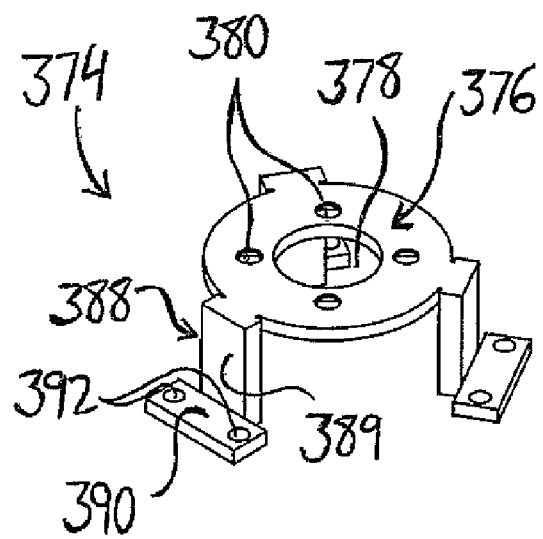
FIG. 26

RADIAL TYPE RECIPROCATING COMPRESSOR AND PORTABLE TOOL POWERING SYSTEM WITH FLEXING CONNECTING ROD ARRANGEMENT

This application claims the benefit under 35 U.S.C. 119(e) of U.S. provisional application Ser. No. 60/804,216, filed Jun. 8, 2006.

FIELD OF THE INVENTION

This invention relates to compressors and pumps, and more particularly to cylinder and piston based reciprocating compressors and pumps.

BACKGROUND OF THE INVENTION

The user of a pneumatic tool requiring a steady source of compressed air for operation is usually limited in mobility by a length of air hose connected to an air compressor that is stationary, or at least limited in mobility. A conventional air compressor is often limited in mobility due to a large tank for storing compressed air, a non-electric motor driving the compressor that may emit harmful gases and requires a fuel source that adds weight and dimension, or an electric motor requiring connection to a fixed power source such as an AC outlet.

U.S. Pat. Nos. 6,692,239 and 6,589,024 of Nishikawa et al. and U.S. Pat. No. 5,030,065 of Baumann teach radially disposed reciprocating compression mechanisms, opposed pairs of which are each linked by a respective yoke mechanism to drive reciprocation thereof.

Japanese Patent Abstract Publication No. 59190486 teaches a reciprocating air compressor having its cylinders secured radially on the polygonal peripheral wall of a crankcase to reduce the front-to-rear length of the compressor. Conventional connecting rod assemblies used in such radial cylinder arrangements typically use pins to pivotally connect a master connecting rod to other connecting rods. Such pins may prematurely fail when significantly reduced in scale for use in a compact portable device and may involve a significant number of assembly steps to complete connection between the master connecting rod and all of the pistons.

Battery-powered portable air compressors having either small tanks or no tanks at all have been developed in an attempt to avoid the mobility limitations of conventional compressors listed above. However, such battery-powered types of compressors typically do not provide enough airflow to be useful for powering pneumatic tools, which require relatively high amounts of air pressure provided on a relatively continuous basis for optimal operation. These compressors are typically reciprocating compressors that feature only a single piston/cylinder arrangement in the interest of keeping the compressors relatively small for the purpose of improving portability.

International Publication Number WO 01/29421 teaches a battery powered portable compressor system featuring a two-cylinder compressor, of the type described in U.S. Pat. No. 4,715,787 mounted on a belt and storing compressed air within a hose connecting the compressor to a pneumatic tool.

U.S. Pat. No. 3,931,554 of Spentzas teaches a two-piston reciprocating motor compressor that, in the embodiment of FIG. 9, is battery operated.

U.S. Patent Application Publication Number 2002/0158102 of Patton et al. teaches a portable pneumatic tool having an onboard single-piston compressor assembly that can be powered by a detachable battery and a portable single-piston compressor assembly that can be borne by a user to power a pneumatic tool.

U.S. Pat. No. 6,089,835 of Suzuura et al. teaches a portable single-piston compressor having a motor and a power transmitting mechanism supported in a two-piece housing and an air tank defined by an outer surface of the second housing and an inside surface of a third housing mounted to the second housing.

U.S. Patent Application Publication number 2005/0214136 of Tsai teaches a portable compressor system including a knapsack divided into two chambers, one of which contains a DC motor, an air cylinder, an air storage flask, a pressure switch and a quick connector, and the other containing a battery and a control box.

U.S. Pat. No. 3,961,868 teaches a small compressor having a single cylinder with a wobble type piston having the intake port valve provided on the piston head to introduce air from the crank case into the cylinder.

A worker using both portable electric tools and pneumatic tools powered by a portable compressor at one job site typically must carry two or more separate battery packs, as conventional portable air compressors and conventional portable electric tools are powered by separate dedicated battery packs.

U.S. Pat. No. 5,095,259 teaches a system for operating a plurality of different DC power tools and appliances one-at-a-time. However, the use of such a system to power both an electric tool and a portable compressor for a pneumatic tool involves the running of two separate power delivery lines, an electrical cord from the battery pack for connection to the electric tool or the compressor and an air hose from the compressor to the pneumatic tool.

Conventional compressors and pumps often use reed valves using a thin, flexible strip of metal or fiberglass fixed at one end and bendable to open and close over a port in response to differences in pressure on opposite sides of the valve. These valves may break off or fail to seat properly after repeated exposure to the bending stresses experienced in their operation. Metal reeds also retain heat which may be considered wasted energy and may corrode over time with exposure to moisture.

Conventional pumps used, for example, to withdraw production-inhibiting water from oil and gas wells, may fail relatively quickly when run continuously with exposure to brackish water or other fluids containing abrasive particulate material such as sulfur or sand. More particularly, the reeds in such a pump may wear or corrode at an increased rate as a result of such exposure.

SUMMARY OF THE INVENTION

According to a first aspect of the invention there is provided a reciprocating compressor or pump comprising:

a plurality of cylinder liners each having a cylindrical bore therethrough;

a plurality of pistons each sealed to a respective one of the cylinder liners within the cylindrical bore thereof;

a drive system coupled to each piston to effect reciprocal motion thereof along the cylindrical bore of the respective cylinder liner between a fully extended position furthest from the drive system and a fully retracted position nearest the drive system;

an intake valve and an exhaust valve associated with each cylinder liner, the intake valve being arranged to open as the piston retracts toward the fully retracted position and to close as the piston extends away therefrom and the exhaust valve being arranged to open as the piston extends toward the fully extended position and to close as the piston retracts away therefrom;

a manifold having a hollow interior fluidly communicating with the cylindrical bore of each cylinder liner when the intake valve associated therewith is open;

wherein the plurality of cylinder liners and the drive system are carried by the manifold.

Preferably the cylinder liners are disposed in a common plane and extend radially about an axis normal to the common plane.

The cylinder liners may be mounted to an external surface of the manifold, in which case each cylinder liner preferably extends along a plane in which the external surface of the manifold lies.

Preferably the manifold on which the cylinder liners are carried is substantially rigid.

The manifold may be sealed to an outer surface of each cylinder liner to enclose a portion thereof on which the exhaust valve associated therewith is defined.

The hollow interior of the manifold may define an annular space extending about the axis to communicate with each exhaust valve.

Each cylinder liner may be disposed at least partially within the hollow interior of the manifold with each exhaust valve disposed within the hollow interior of the manifold to control flow between the cylindrical bore of the cylinder liner and the surrounding hollow interior. In this instance, each exhaust valve preferably comprises at least one exhaust port extending through the cylinder liner and a resilient band disposed circumferentially about the cylinder liner, the band being resiliently stretchable about the respective cylinder liner by fluid pressure exerted on the band through the exhaust port during movement of the piston toward the fully extended position.

The cylinder liners may project from a crank chamber, in which the drive system is at least partially disposed, into the hollow interior of the manifold. In this instance, the crank chamber may be surrounded by an annular wall with the hollow interior of the manifold defining an annular space extending about the annular wall to communicate with the cylindrical bore of each cylinder liner, which projects radially from the annular wall to the hollow interior of the manifold, when the respective exhaust valve is open.

According to a second aspect of the invention, there is provided a portable compressor or pump assembly comprising:

a carrying handle having opposite first and second ends;

a motor supported on the carrying handle and comprising a drive shaft extending therealong; and a reciprocating compressor or pump supported on the carrying handle at the first end thereof and connected to the driveshaft of the motor for driven operation thereby.

There may be provided a power delivery device supported at the second end of the carrying handle and connected to the motor for powered operation thereof. In this instance, the power delivery device is preferably manually removable and there is preferably provided a conduit extending along the carrying handle in fluid communication with a receiver into which fluid is delivered by operation of the reciprocating compressor or pump, and a pressure switch in fluid communication with the conduit at the end thereof nearest the second end of the carrying handle for electrical connection to the power delivery device and motor to control operation of the motor in response to pressure measured within the conduit and receiver.

Alternatively, there may be provided a second reciprocating compressor or pump supported on the carrying handle at the second end thereof and connected to the driveshaft of the motor for driven operation thereby. In this instance, and there is preferably provided a power delivery device connected to the motor for powered operation thereof, the power delivery device defining a base on which the carrying handle, the motor and the reciprocating compressors or pumps are mounted; and a conduit extending along the carrying handle to fluidly connect two receivers into which fluid is delivered by operation of the reciprocating compressors or pumps, and an outlet in fluid communication with the conduit and the two receivers to define a common discharge of the two reciprocating compressors or pumps.

Preferably the conduit is defined by a hollow interior of the carrying handle.

Preferably the reciprocating compressor or pump comprises a plurality of cylinders spaced about, and each extending radially relative to, an axis of the drive shaft within a common plane.

According to a third aspect of the invention there is provided a reciprocating compressor or pump comprising:

a housing defining a crank chamber;

a crankshaft comprising a shaft arranged for driven rotation about an axis and a crank pin carried on the shaft eccentric to the axis within the crank chamber;

a plurality of cylinders arranged to extend radially about the axis outward from the crank chamber; and a piston and rod structure comprising:

a central body pivotally secured to the crank pin for relative rotation between the central body and the crank pin about an eccentric axis defined by the crank pin eccentric to the axis about which the shaft is rotatable;

a plurality of connecting rods each having a first connection at one end thereof to the central body and extending outward therefrom to a second connection, the first connection of each connecting rod allowing generally pivotal motion thereof relative to the central body; and a plurality of pistons each connected to a the second connection of a respective connecting rod and being sealed against an interior wall of a respective cylinder, the second connection of each connecting rod allowing generally pivotal motion thereof relative to the piston;

and intake and exhaust valves associated with each cylinder and arranged to allow passage of fluid into the cylinder, and subsequent discharge of the fluid therefrom under exertion of pressure on the fluid by the piston during movement thereof along the cylinder away from the shaft under driven rotation thereof;

wherein each connecting rod is integral with at least one of the central body and the respective piston and forms a flexible connection therewith.

Preferably the central body and the connecting rods are integral.

Preferably the central body and the connecting rods comprise integral plastic.

Preferably each connecting rod is integral with the respective piston.

Preferably each connecting rod and the respective piston comprise integral plastic.

Preferably there is provided a motor coupled to the driveshaft and operable for driven rotation thereof.

According to a further aspect of the invention there is provided a reciprocating compressor or pump comprising:

a housing defining a crank chamber;

a crankshaft comprising a shaft arranged for driven rotation about an axis and a crank pin carried on the shaft eccentric to the axis within the crank chamber;

a plurality of cylinders arranged to extend radially about the axis outward from the crank chamber; and a connecting rod structure comprising:

a central body pivotally secured to the crank pin for relative rotation between the central body and the crank pin about an eccentric axis defined by the crank pin eccentric to the axis about which the shaft is rotatable; and a plurality of connecting rods connected to the central body, each connecting rod extending outward from the central body into a respective cylinder to pivotally support a piston at the end of the connecting rod opposite the flexible connection sealed against an interior wall of the cylinder;

the body having a plurality of peripheral keyways parallel to and spaced about the eccentric axis, the keyways receiving ends of all but one of the connecting rods, the keyways and each of the all but one connecting rods being arranged to prevent separation thereof, while allowing limited relative pivoting therebetween, within a plane normal to the eccentric axis;

and intake and exhaust valves associated with each cylinder and arranged to allow passage of fluid into the cylinder, and subsequent discharge of the fluid therefrom under exertion of pressure on the fluid by the piston during movement thereof along the cylinder away from the shaft under driven rotation thereof.

Preferably a wall of each peripheral keyway comprises an arcuate portion spanning over 180 degrees to form a mouth having a width less than the diameter of the arcuate portion.

Preferably each of the all but one of the connecting rods comprises a rounded end having a diameter greater than the width of the mouth of a respective one of the peripheral keyways, and a stem having a width less than the diameter of the rounded end and extending from the rounded end through the mouth of the respective one of the peripheral keyways away from the central body of the connecting rod structure.

Preferably the arcuate portion of the wall of each peripheral keyway defines said wall entirely.

According to a fifth aspect of the invention there is provided a reciprocating compressor or pump comprising:

a hollow cylinder;

a piston mounted within the cylinder for limited reciprocal movement therealong;

a drive system connected to the piston and operable to drive the reciprocal movement thereof;

intake and exhaust valves associated with the cylinder and operable to allow passage of fluid into the cylinder from a fluid supply outside the cylinder and subsequent discharge of the fluid from the cylinder under exertion of pressure on the fluid in the cylinder by the piston during movement toward a fully extended position thereof furthest from the drive system;

wherein the intake valve comprises:

a valve seat comprising a projection extending into a space within the hollow cylinder between a sealing engagement of the piston with the cylinder and a distal end of the cylinder opposite an open end thereof through which the piston and the drive system are connected;

a passage extending through the valve seat with an opening of the passage being defined on the projection to fluidly communicate the fluid supply outside the cylinder with the space within the hollow cylinder between the sealing engagement of the piston with the cylinder and the distal end of the cylinder; and a resilient band disposed circumferentially about the projection, the band being resiliently stretchable about the projection by a difference in pressure between the fluid supply outside the cylinder and the space within the hollow cylinder between the sealing engagement of the piston with the cylinder and the distal end of the cylinder.

Preferably the resilient band is disposed in a circumferential recess in the projection.

Preferably the circumferential recess in the projection is tapered from an outermost periphery thereof.

Preferably the resilient band is tapered from an outer surface thereof to an inner surface thereof.

Preferably a depth of the circumferential recess is sufficient to prevent complete withdrawal of the resilient band from the circumferential recess under stretching by the difference in pressure.

The valve seat may be formed on the piston with the passage extending through the piston to fluidly communicate opposite sides of the sealing engagement of the piston with the cylinder.

Alternatively the valve seat may be formed on the distal end of the cylinder with the projection extending into the space within the hollow cylinder from the distal end thereof. In this instance, the valve seat may be formed on a cylinder head sealed to the distal end of the cylinder with the passage extending through the cylinder head to fluidly communicate opposite sides of a sealing engagement of the cylinder head with the cylinder.

According to a sixth aspect of the invention there is provided a reciprocating compressor or pump comprising:

a cylinder liner defining a cylindrical bore and a piston sealed to the cylinder liner within the cylindrical bore for reciprocal movement therealong;

a drive system connected to the piston and operable to drive the reciprocal movement thereof; and intake and exhaust valves associated with the cylinder and operable to allow passage of fluid into the cylindrical bore from a fluid supply outside the cylinder liner and subsequent discharge of the fluid from the cylindrical bore into a receiver under exertion of pressure on the fluid in the cylinder by the piston during movement toward a fully extended position thereof furthest from the drive system;

the exhaust valve comprising at least one exhaust port extending through a wall of the cylinder liner and a resilient band disposed circumferentially about the cylinder liner, the band being resiliently stretchable about the respective cylinder liner by passage of the fluid through the exhaust port from the cylindrical bore by the under the pressure exerted on the fluid by the piston; and the receiver being sealed about the cylinder liner to enclose the resilient band and stretching of the resilient band within the receiver allowing flow of the fluid from the cylindrical bore into the receiver through the at least one exhaust port.

Preferably there is provided a plurality of cylinder liners about which the receiver is sealed to receive fluid from the cylindrical bore of each cylinder liner.

Preferably the resilient band is disposed in a circumferential recess in the wall of the cylinder liner.

Preferably the circumferential recess in the wall of the cylinder liner is tapered from an outermost periphery thereof toward the cylindrical bore.

Preferably the resilient band is tapered from an outer surface thereof to an inner surface thereof.

Preferably a depth of the circumferential recess is sufficient to prevent complete withdrawal of the resilient band from the circumferential recess under stretching by the compressed gas.

According to a seventh aspect of the invention there is provided reciprocating compressor or pump comprising:
a hollow cylinder;
a piston disposed within an interior of the hollow cylinder and sealed to the hollow cylinder for reciprocal movement therealong;
a drive system connected to the piston and operable to drive the reciprocal movement thereof along the hollow cylinder; and
intake and exhaust valves associated with the hollow cylinder and operable to allow passage of fluid into the cylinder, and subsequent discharge of the fluid therefrom under exertion of pressure on the fluid by the piston during movement toward an extended position thereof furthest from the drive system;
at least one of the intake and exhaust valves comprising:
a valve port communicating a fluid supply outside the hollow cylinder with a space within the hollow cylinder between a sealing engagement of the piston with the cylinder and a distal end of the cylinder opposite an open end thereof through which the piston and the drive system are connected; and
a flap comprising a fixed portion secured at a surface surrounding an opening of the valve port on one side thereof and a movable portion connected to the fixed portion by a flexible portion, the movable portion having greater rigidity than the flexible portion;
the flexible portion of the flap between the fixed and movable portions thereof being bendable in response to pressure differences between the space within the hollow cylinder and the fluid supply outside the hollow cylinder to move the movable portion between a closed position sealingly covering the opening of the valve port and an open position at least partially lifted from the opening of the valve port to allow fluid flow therethough.

The at least one of the intake and exhaust valves may include the intake valve, the valve port of the intake valve extending through the piston across the sealing engagement of the piston with the hollow cylinder and the flap being secured to a face of the piston on a side of the sealing engagement opposite the drive system.

There may be provided a second port surrounded by the surface and second movable and flexible portions of the flap likewise arranged to seal off and open the second port in response to pressure differences between the space within the hollow cylinder and the fluid supply outside the hollow cylinder. In this instance, preferably the valve port and the second port, the movable portion and the second movable portion of the flexible flap, and the flexible portion and the second flexible portion are symmetric across the fixed portion of the flap.

Preferably there is provided a seal secured to the surface to extend around the valve port and seal with the moveable portion of the flap in the closed position.

Preferably the movable portion comprises an integral extension of the flexible portion and a piece of material of greater rigidity than the flexible portion secured to the integral extension of the flexible portion.

Preferably the piece of material comprises metal.

Preferably the flexible flap comprises rubber.

According to an eighth aspect of the invention there is provided a portable tool powering system comprising:
a portable air compressor unit comprising an air compressor and an electric motor connected thereto for driven operation thereof;
a battery pack comprising at least one battery and being connectable to the motor to selectively supply power thereto; and
a power delivery assembly comprising:
an air hose connected the air compressor and having a pneumatic tool connector at an end of the air hose opposite the air compressor; and
electrical conductors connected to the battery pack and extending along the air hose toward the end thereof opposite the air compressor, the electrical conductors having an electric tool connector at an end thereof opposite the battery pack;
an end of the power delivery assembly opposite the battery pack and the portable air compressor thereby being connectable to pneumatic or electric tools.

Preferably the electrical conductors are disposed within a common cover.

The battery pack, motor and electrical conductors may be wired to selectively deliver electricity to only one of the motor and the electric tool connection at any one time.

Preferably the battery pack comprises a rechargeable battery.

The pneumatic tool connector and electric tool connector may be defined by a single quick connect unit connectable one-at-a-time to pneumatic and electric tools. In this instance, there may be provided a pneumatic tool and an electric tool, each tool having mounted thereon a quick connect component having an air passageway and a pair of electrical contacts, the quick connect component of the pneumatic tool having the air passageway thereof in fluid communication with an inlet of an air powered drive system of the pneumatic tool and the quick connect component of the electric tool having the electrical contacts thereof electrically connected to an electric powered drive system of the electric tool.

According to a ninth aspect of the invention, there is provided a reciprocating compressor comprising:
a crank chamber;
a crankshaft supported for rotation within the crank chamber;
a motor having a driveshaft coupled to the crankshaft to drive rotation thereof within the crank chamber;
at least one cylinder projecting from the crank chamber with an open end of each cylinder fluidly communicating with the crank chamber;
a piston disposed within each cylinder and sealed thereto, the piston being connected to the crankshaft for reciprocating motion within the cylinder, the piston moving away from the crankshaft during a compression stroke and toward the crankshaft during an intake stroke;
an intake valve associated with each cylinder in fluid communication with the crank chamber, the intake valve being operable to open during the intake stroke in response to a pressure difference between the crank chamber and a space within the cylinder between the piston and an end of the cylinder opposite the open end thereof communicating with the crank chamber to allow fluid to flow into said space during the intake stroke;
an exhaust valve associated with each cylinder and operable to open during the compression stroke to facilitate discharge of the fluid out of said space within the cylinder during the compression stroke; and
a fan mounted between the motor and the at least one cylinder, the fan being in fluid communication with the crank chamber and operable to induce fluid flow into the crank chamber through an inlet thereof, a first portion of the fluid flow being drawn into each cylinder during intake stroke of the piston therein and a second portion of the fluid flow being drawn by operation of the fan past the fan along the driveshaft to the motor.

Preferably the motor and the fan are mounted within a common housing open at one end to the crank chamber and having at least one opening in the housing on a side of the motor opposite the crank chamber for exit of the second portion of the fluid flow after passing the motor.

Preferably the fan is carried on the driveshaft for driven rotation by the motor.

Preferably the housing is cylindrical to form an annular peripheral wall around the motor, the second portion of the motor flowing past the motor between the motor and the peripheral wall closing thereabout.

Preferably the at least one cylinder comprises a plurality of cylinders spaced about and radial to a rotational axis of the crankshaft within a common plane normal to the rotational axis.

BRIEF DESCRIPTION OF THE DRAWINGS

In the accompanying drawings, which illustrate a exemplary embodiments of the present invention:

FIG. 19 is a cross-sectional view of one of the cylinder liners of the second embodiment portable compressor showing exhaust valve ports thereof.

FIG. 20 is a side elevational view of a resilient band of an exhaust valve of the second embodiment portable compressor for cooperation with the exhaust valve ports thereof.

FIG. 20A is a cross-sectional view of the resilient band of the exhaust valve of the second embodiment portable compressor as taken along the line A-A of FIG. 20.

FIG. 25 is a perspective view of a gear and cylinder mount of the third embodiment portable compressor.

FIG. 26 is a perspective view of a motor mount of the third embodiment portable compressor.

In the drawings like characters of reference indicate corresponding parts in the different figures.

DETAILED DESCRIPTION

Original Compressor

Figure 1:
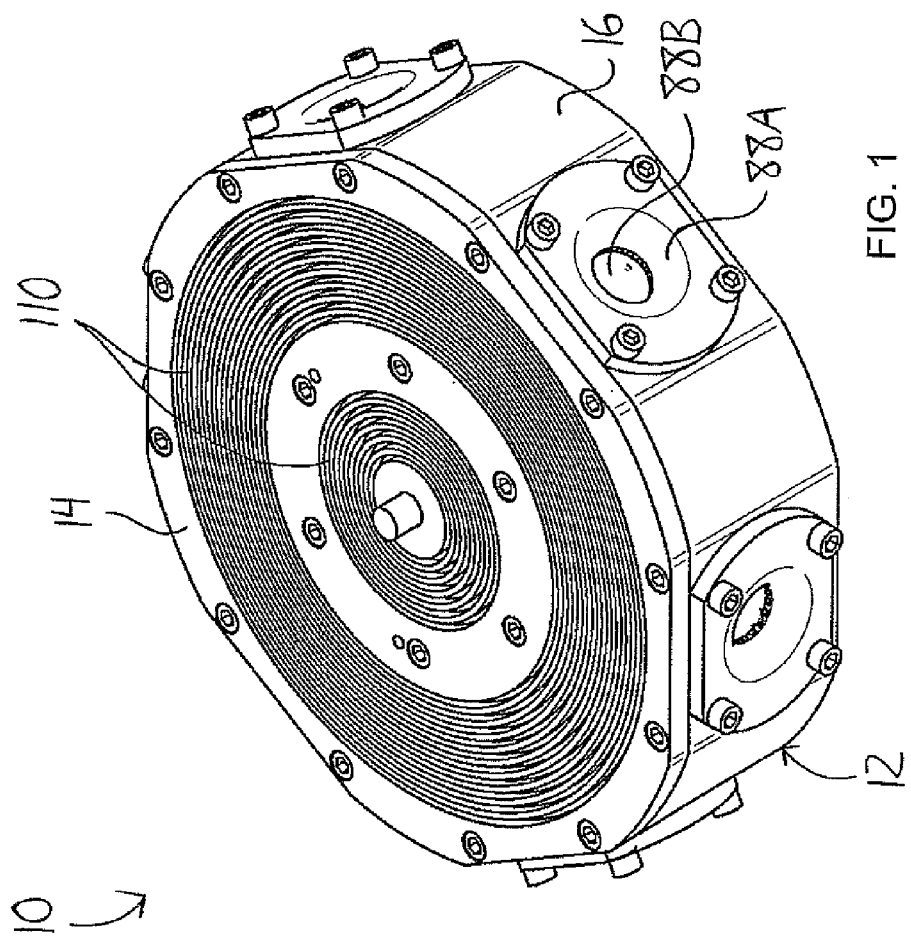
FIG. 1 is a perspective view of a first embodiment portable compressor showing an openable side thereof.
Figure 2:
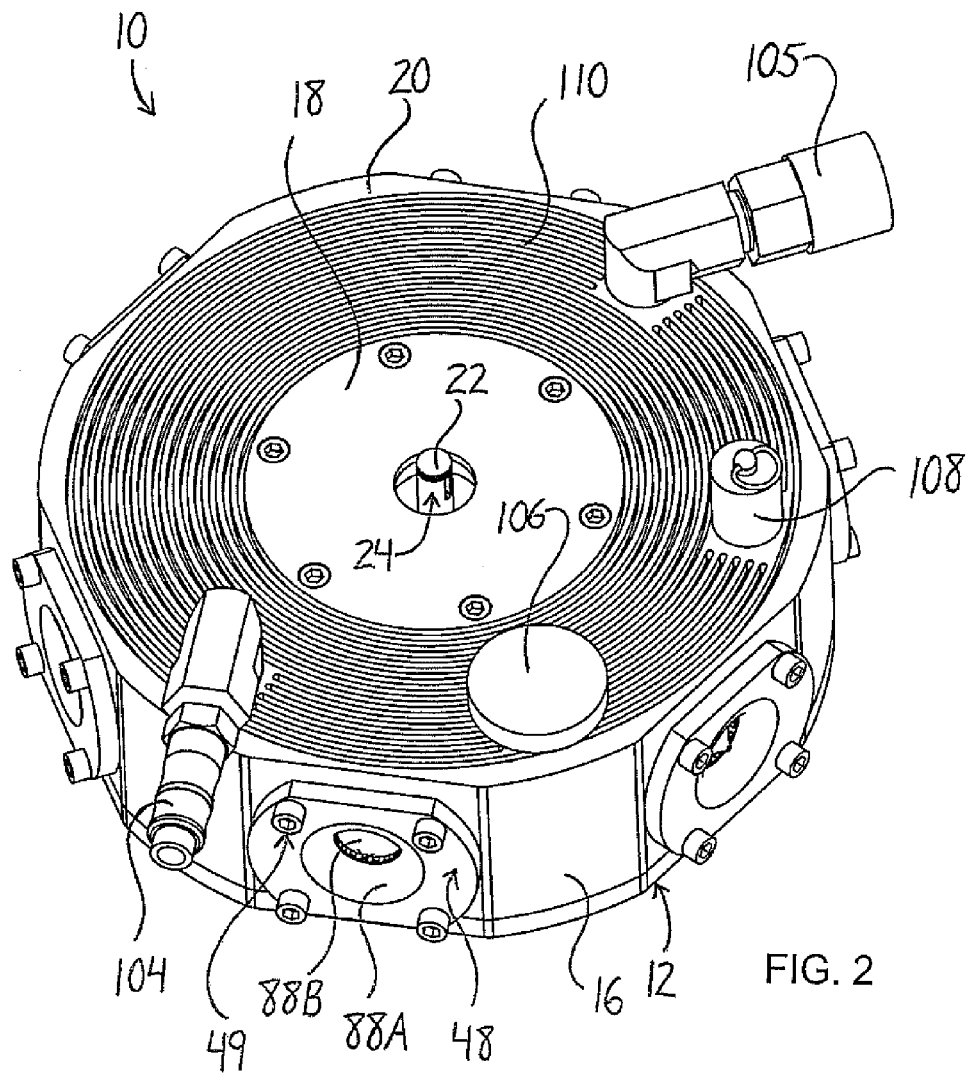
FIG. 2 is a perspective view of the first embodiment portable compressor showing a driving side thereof.
Figure 3:
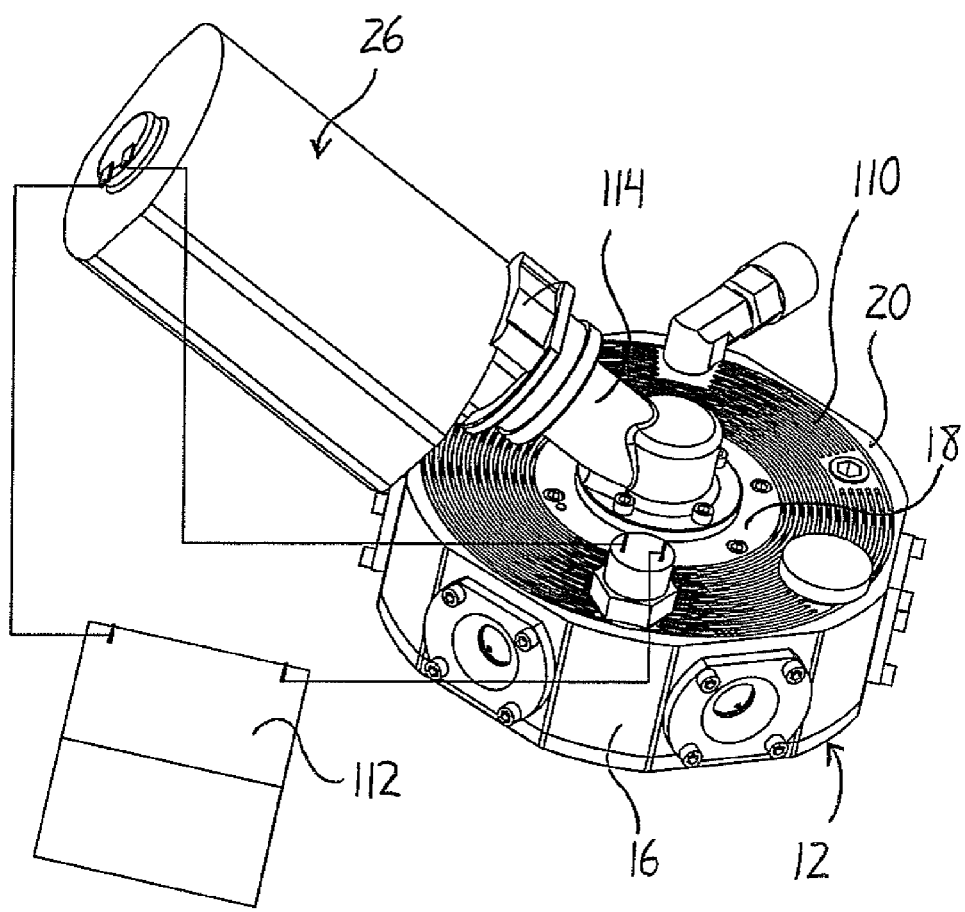
FIG. 3 is a perspective view of the first embodiment portable compressor with an electric motor operatively connected to the driving side thereof.
Figure 4:
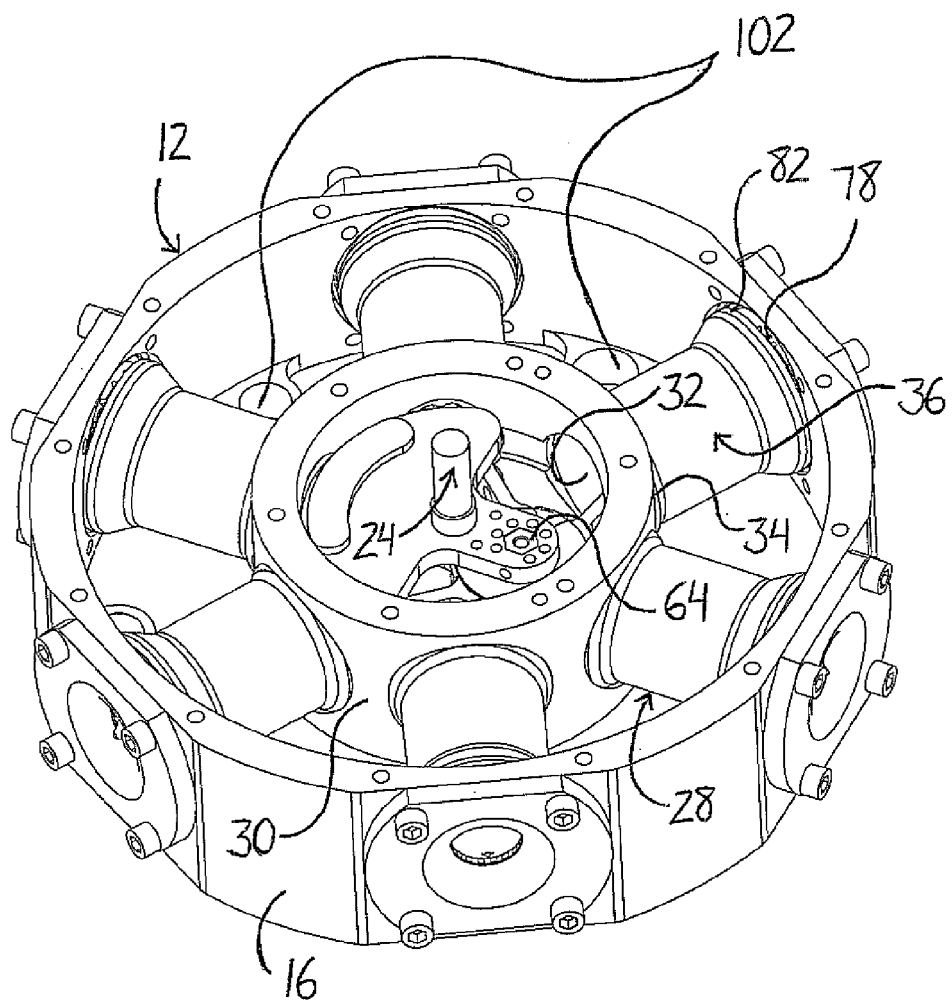
FIG. 4 is a perspective view of the first embodiment portable compressor with a removable cover thereof removed.

FIG. 1 shows an openable side of a first embodiment portable reciprocating compressor 10 of the present invention, which features a housing 12 comprising a removable cover 14 fastened in a sealing manner to an end of an annular cylindrical exterior wall 16, FIG. 2 shows a driving side of the first embodiment compressor 10 opposite the opening side. Here a circular cover 18 closes off the interior of the compressor housing 12 by sitting concentrically within the space surrounded by the annular cylindrical exterior wall 16 on a shoulder defined thereby to mate with an interior surface of the annular exterior wall 16 and sit flush with an end face 20 thereof. A driving end 22 of a crankshaft 24 extends axially from within the cylindrical housing 12 through the second cover 18 for connection to a suitable drive source, such as a portable electric motor 26 as shown in FIG. 3. As seen in FIG. 4 and suggested by the cylindrical housing, the first embodiment reciprocating compressor is of the radial type with a plurality of gas compressors 28 spaced about the crankshaft 24, each extending in a radial direction relative to a central axis of the housing 12 about which the annular exterior wall 16 extends. The portability of the compressor 10 is established, at least in part, by the fact that the housing 10 acts not only to support the gas compressors 28, but also to define a receiving compartment for containing gas compressed by the gas compressors. In forming the receiving compartment, the housing may be considered to be a manifold, as it collects compressed air in its hollow interior from each gas compressor for discharge through a single outlet during use of the portable compressor.

The housing 12 features an interior annular cylindrical wall 30 disposed concentrically within the exterior wall 16. Annular spacing between the two walls forms a receiving compartment in which the gas compressors 28 are disposed, extending radially between the two annular walls. In the first embodiment, the plurality of gas compressors includes six compressors arranged in diametrically opposed pairs and evenly spaced about the central axis of the housing 12. The space within the interior wall 30 defines a crankshaft compartment for housing components of the compressors drive system. The interior wall 30 features round through-holes 32 each of which receives a drive end 34 of a cylinder liner 36 of a respective gas compressor 28. A valve end 38 of the cylinder liner 36 opposite the drive end 34 is received in a through-hole 40 provided in the exterior wall 16 axially aligned with the respective though-hole 32 in the interior wall 30.

Figure 5:
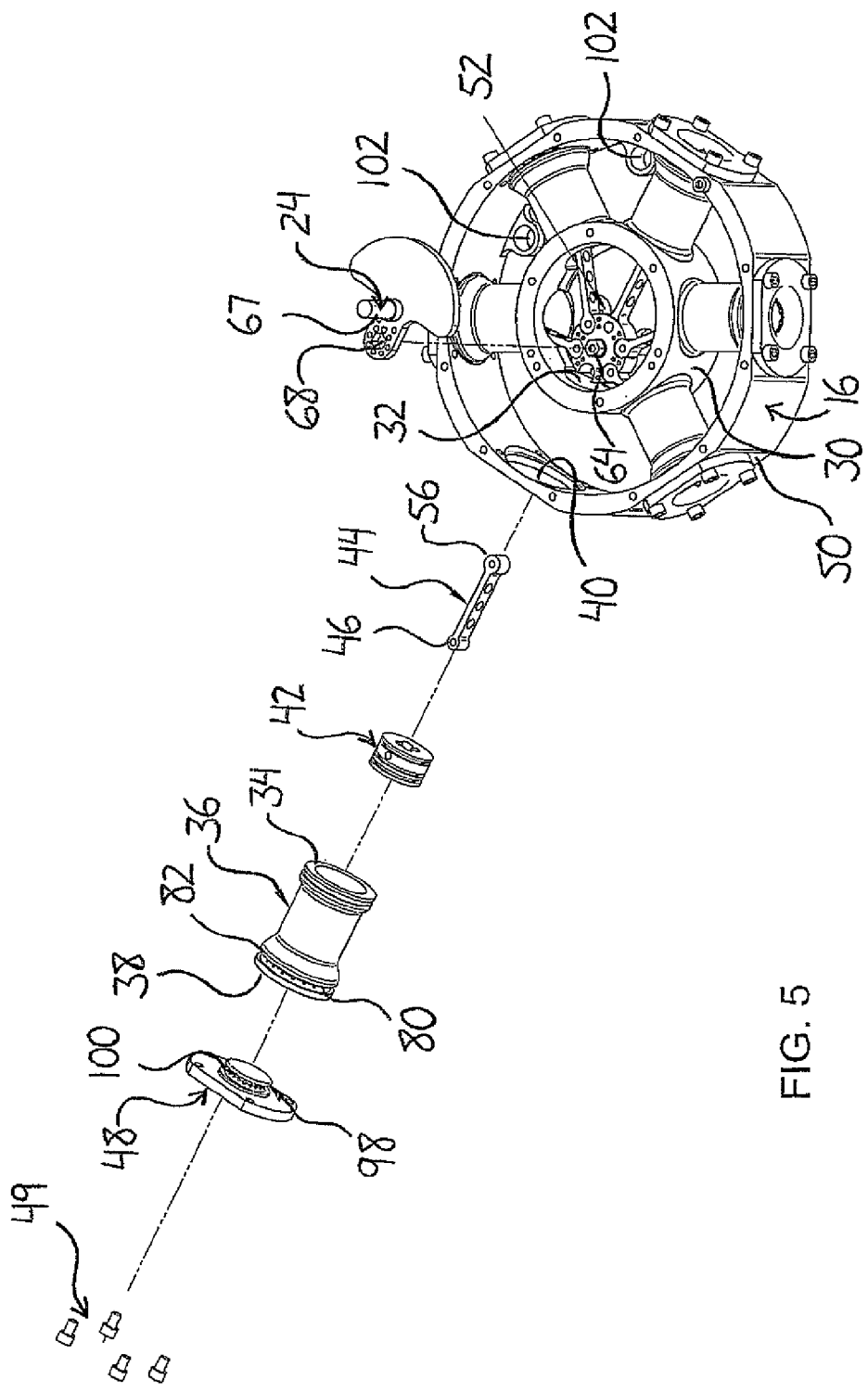
FIG. 5 is a perspective view of the first embodiment portable compressor with the removable cover removed and a gas compressor and crank cheek exploded for illustration.

FIG. 5 shows one of the gas compressors 28 in an exploded state. As with conventional reciprocating compressors, each gas compressor 28 features a piston 42 disposed within and sealed to the cylinder liner 36 for movement therealong to compress gas contained therein. A connecting rod 44 features a piston end 46 having a through-hole provided therein to cooperate with a pin extending diametrically through the piston 42 to provide a pivotal connection between the piston and connecting rod 44 for pivotal motion within a plane parallel to the housing covers 14, 18. Connecting rod and piston connections of this type are well known to those of skill in the art. A driving end of the connecting rod 44 opposite the piston end 46 is adapted for pivotal motion within the same plane and connection to the crankshaft in a manner described herein further below. A cylinder head 48 is adapted for mounting by fasteners 49 on a flattened portion 50 of the exterior surface of the exterior annular cylindrical wall 16. The cylinder head 48 acts to hold the cylinder liner 36 in place within the opening 40 of the exterior wall 16 by blocking motion radially outward therefrom. The cylinder head 48 also provides an intake valve for controlling feeding of air from outside the housing 12 into the cylinder liner 36 for compression by the piston 42. This structure and workings of this valve are described herein further below.

O-rings (not shown) are disposed radially between the openings in the housing walls and the respective ends of the cylinder liner 36 to provide seals to ensure that gas contained within the receiving compartment defined between the housing walls 16, 30 will not leak into the crankshaft compartment within the interior wall 30 or to the exterior environment surrounding the housing 12. Such rings are commercially available and well-known to those of skill in the art.

Figure 9:
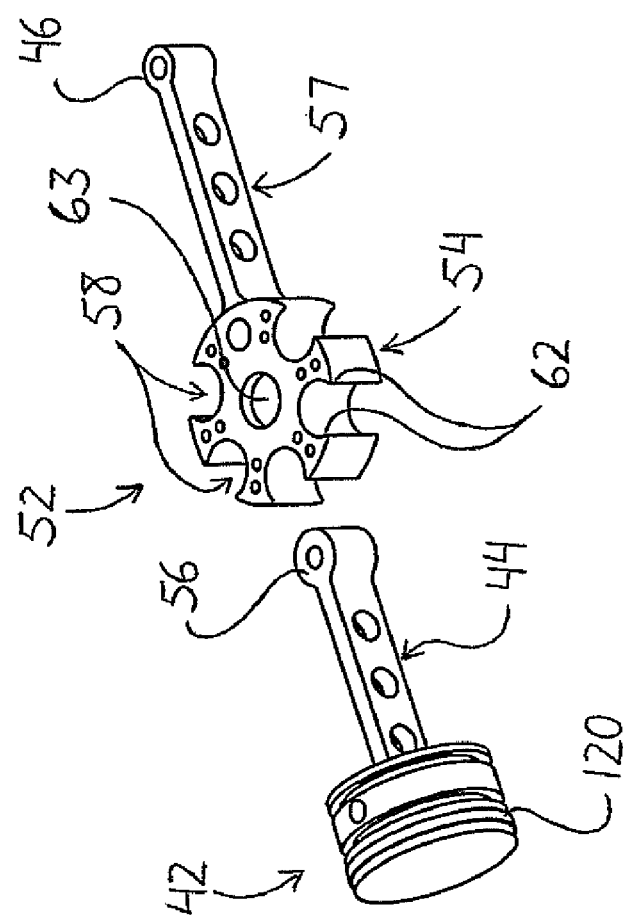
FIG. 9 is a perspective view of select unassembled components of a connecting rod structure of the first embodiment portable compressor.

FIGS. 5 and 9 show master connecting rod 52 having a body portion 54 from which an integral rod or shaft portion 57 extends radially therefrom to a piston end 46 having the same structure as the pistons ends of the connecting rods 44 for connection to a respective piston. The body portion 54 of the master connecting rod 52 provides attachment points for the other connecting rods 44 so that connection of the master connecting rod 52 to the crankshaft 24 will thereby connect all of the connecting rods 44 to the crankshaft for actuation of the pistons 42. A driving end 56 of each connecting rod 44 acts as a key for receipt in a respective key-way of the body 54. The keys and key-ways are provided with smooth rounded surfaces to allow pivoting of the connecting rod 44 with respect to an axis of the keyway. As shown in FIG. 9, the body portion 54 is provided with five key-ways in the form of cylindrical bores 58 overlapping with a periphery 60 of the otherwise cylindrical body portion 54. The result is a series of arcuate recesses into a peripheral wall of the body portion 54, each of which extends more than 180 degrees such that a linear distance between tips 62 of the recess is less than the diameter of the bore. The driving end 56 of each connecting rod is cylindrical and round and can be lifted or lowered into a respective recess and fit so as to be pivotal therein, but is too large to be pulled from the recess or key-way through the mouth defined by the opening between the tips 62. The key-ways extend parallel to a central axis of the body 54 along which a central bore 63 extends through the body 54 perpendicular to the parallel top and bottom faces thereof. With the rounded end 56 of each connecting rod received in the rounded keyway 58 open between the tips 62 thereof, the connecting rod can pivot about its rounded end 56 within a plane normal to the central axis of the body 54 and the central bore 63 therein, the pivoting being limited in either direction by contact of the stem of the connecting rod between its ends with a respective one of the tips 62. With the opening between the tips 62 being of lesser diameter than the arcuate recess 58 and the connecting rod end 56, withdrawal of the connecting rod from the recess or key-way along the plane in which the connecting rod 44 is pivotal is prevented. Withdrawal from the keyway is only allowed by linear movement of the connecting rod parallel to the central axis of the body 54. Unlike the keyway connected rods, the integral rod 57 of the master connecting rod 52 is fixed relative to the body 54 and therefore is not pivotable in the plane normal to the central axis of the body.

This master connecting rod 52 provides the necessary pivotal connection to each connecting rod 44 in a relatively small space without the use of small pins (such as in an arrangement similar to that used to connect the rods and pistons) which may not provide adequate strength at the mounting points to avoid breakage and resulting detachment of the connecting rods. The connection point of each connecting rod is housed between portions of solid material of significant width or thickness separating adjacent ones of the keyways from one another along the periphery of the central body, thereby minimizing the chance of failure. This master connecting rod is of a construction that provides simplicity by avoiding use of pins, bushings and/or bearings for connection to the connecting rods while being robust yet small. The mating surfaces between the connecting rods 44 and the master connecting rod 52 should be smooth and hard to prevent vibration and wear. Known material treatment methods, such as hardening and peen treating, may be used to attain suitable characteristics at these connections. It is envisioned that a connection structure similar to that between the master connecting rod 52 and the connecting rods 44 may be adopted at the connection between the connecting rods 44 and pistons 42 by overlapping a cylindrical bore with the face of the piston nearest the master connecting rod to form an arcuate keyway extending across the piston into which the round cylindrical piston end 46 of the connecting rod can be slid before mounting the piston within the cylinder liner.

Figure 6:
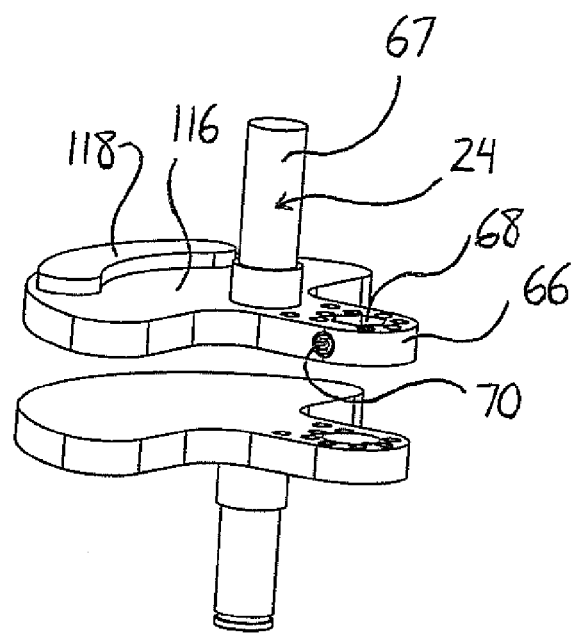
FIG. 6 is a perspective view of the crank cheeks of the first embodiment portable compressor.

The master connecting rod 52 is journaled on a crank pin 64 which extends through the central bore 63 passed the master connecting rod 52 on either side thereof for rigid connection to a respective crank cheek 66 from which extends a respective portion of the crankshaft journal 67. The crank cheek 66 features a receiving hole 68 for receiving the end of the crank pin 64 extending beyond the master connecting rod 52. Relative rotation between the crank cheek 66 and crank pin 64 may, for example, be prevented by a set screw 70 as shown in FIG. 6 or by forming the cooperating crank pin 64 and receiving hole 68 to have the same straight-sided shape and size as shown in FIG. 5. The crankshaft 24 is thus formed by the crankshaft journal 67 defining the axis of rotation and extending out of the compressor housing 12 through each cover thereof, the crank pin 64 offset from, or eccentric to, the crankshaft journal 67 and axis of rotation, and the two crank cheeks 66 connecting the opposite ends of the crank pin 64 to the crankshaft journal 67.

With a motor 26 operatively connected to the drive end 22 of the crankshaft 24 extending from the compressor housing 12 as shown in FIG. 3, rotation of the crankshaft 24 causes the master connecting rod 52 to revolve around the crankshaft's axis of rotation due to the connection of the master connecting rod to the crank pin 64. The movement of the master connecting rod 52 along this circular path within the crankshaft compartment transfers rotational motion of the crankshaft 24 into linear displacement of the pistons 42 within the cylinder liners 26 by means of the connecting rods 44. As the master connecting rod 52 approaches a particular gas compressor 28 during its revolution about the crankshaft's axis of rotation, the piston 42 of that gas compressor 28 moves radially outward toward the external wall 16 of the housing 12 to a maximum displacement. As the master connecting rod 52 continues moving and thus eventually passes the gas compressor 28, the piston is pulled back radially inward toward the interior wall 30 of the housing 12. These outward and inward displacements of the piston 42 correspond to the compression and intake strokes of the compressor respectively.

As mentioned herein above, the housing 12 defines a receiving compartment between the interior and exterior walls 30, 16 thereby contributing to the compressors compactness and portability by doubling as both a housing, support or base for carrying the cylinders and a manifold for collecting compressed gas from all the cylinders within a single enclosure. The gas compressors 28 feature unique exhaust valves to take advantage of this arrangement. In a conventional compressor, the gas compressors are supported on their own frame or housing and compressed gas is guided from the cylinders of the gas compressors to a receiving tank outside the housing through an exhaust valve in each cylinder head and a manifold connecting the exhaust valves and the tank. In the first embodiment of the present invention, the external tank is eliminated and the compressed gas from the cylinder liners 36 is exhausted directly into the receiving compartment of the housing 12 by the unique exhaust valve arrangement.

Figure 7:
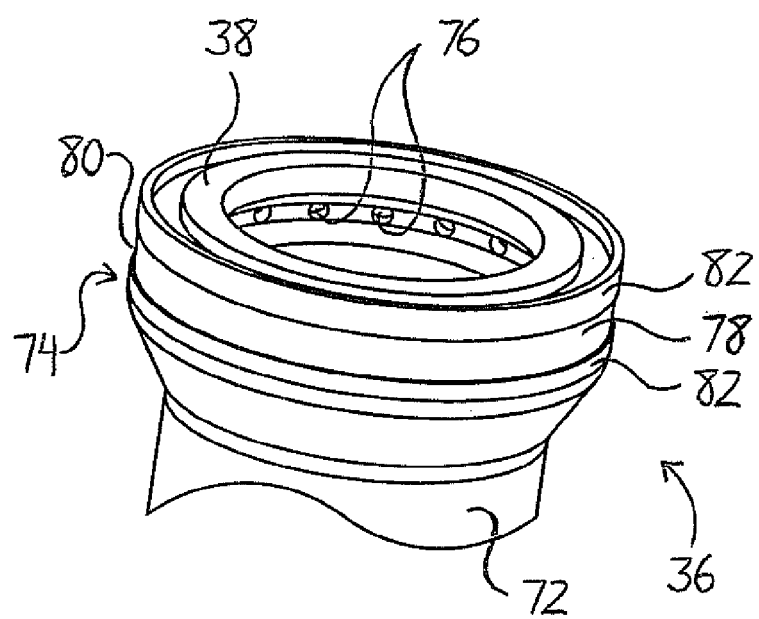
FIG. 7 is a partial perspective view of a cylinder liner of the first embodiment portable compressor showing a valve end of the cylinder liner.

Rather than exhaust compressed gas in the conventional manner through an exhaust valve in the cylinder head 48 only to then have to redirect it back into the housing 12 to the receiving compartment with some type of additional manifold or separate tubes for the multiple cylinders, the exhaust valve of the first embodiment is disposed on the cylinder liner 36 within the receiving compartment. FIG. 7 shows a close-up view of a cylinder liner 36 near the valve end 38 thereof. The cylinder liner 36 features a cylindrical portion 72 of constant outer diameter which flares outward to an end portion 74 of greater diameter toward each of the valve and driving ends 38, 34 of the cylinder. The end portion 74 nearest the valve end 38 contains the unique exhaust valve. Ports 76 of the exhaust valve extending radially through the wall of the cylinder liner 36 in the end portion 74 and are spaced circumferentially thereabout. Disposed circumferentially about the end portion 74 to cover the exhaust ports 76 is a band 78 of liquid silicone rubber (LSR). The LSR band 78 has a predetermined density, elasticity and size such that it stretches to fit snuggly over the cylinder liner 36 to seal off the exhaust ports 76 when the compressor 10 is not being run and also during the intake stroke of the gas compressor 28. The band 78 stretches radially outward from the cylinder liner 36 when exposed to higher pressure from inside the cylinder liner 36 through the exhaust ports 76 during the compression stroke of the gas compressor 28 to uncover these ports 76 and allow the exit of compressed gas from within the cylinder liner 36 into the receiving compartment of the housing. The band 78 then returns to its original position covering the exhaust ports 76 as the pressure inside the cylinder liner 36 decreases as a result of the passage of the compressed gas into the receiving compartment. The exhaust ports 76 and LSR band 78 thereby cooperate to form an exhaust valve operated by a difference in pressure between the cylinder liner interior and receiving compartment, the band 78 expanding about the cylinder liner to an open position during the compression stroke and then resiliently returning to a closed position to provide a seal between the cylinder liner interior and receiving compartment at all other times. It has been found that the characteristics of LSR are such that it performs in this application with ease and durability while withstanding the heat that is typically associated with compression. However, it should be appreciated that other resilient materials exhibiting similar properties and behaviour may be used to form the band 78 of the exhaust valve.

The stretchable, flexible bands have an advantage over conventional metal reed valves in that they do not retain heat in the same way due to the significantly different material properties. These unique valves thus contribute to an improved efficiency of the compressor, as less of the energy used to open the valves is effectively lost through the creation of waste heat. In other words, a greater fraction of the energy applied to the valve actually contributes to its physical movement than in a conventional reed valve arrangement, so that less energy from the compressed air is wasted, i.e. less heat is produced, in the use of the unique compressor valve of the present invention than in the use of a conventional reed valve having the same opening pressure.

The resilient, stretchable, flexible bands also have other advantages over conventional reed valves in that they don't corrode under exposure to moisture and don't experience the same bending fatigue that may lead to the failure of a reed valve to seat properly over the port opening or snapping off the reed. The use of LSR or similar material can thus improve the lifespan of a compressor and reduce the need or frequency of maintenance, repair and overhaul. Not only does the unique compressor valve structure reduce the waste heat produced, but liquid silicone rubber has a relatively high thermal stability, meaning that its material properties are relatively stable over the temperatures ranges experienced during typical use and storage of the compressor.

In the first embodiment, two preventive measures are taken to ensure that the exhaust valve band 78 is not displaced axially along the cylinder liner 36 when it stretches about the liner during the compression stroke to open the exhaust ports 76. Firstly, an exterior surface of the wall of the cylinder liner 36 features a recess 80 extending circumferentially about the end portion 74 nearest the valve end 38, effectively creating flanges 82 on either side of the recess 80. The exhaust ports 76 extending through the wall of the cylinder liner 36 are spaced along this recess and the band 78 is therefore positioned in the recess to cover them. The flanges 82 act to retain the band 78 in the recess 80, with the depth of the recess 80 being such that the band does not fully withdraw therefrom during exposure to the elevated pressures experienced during the compression stroke of the piston. Secondly, the opening 40 in the exterior wall 16 of the housing 12 in which the valve end 38 and respective end portion 74 of the cylinder lining 36 are received is sized to have a diameter slightly larger than the end portion 74 to create and annular space between the cylinder liner 36 and exterior wall 16. The band 78 can expand into this annular space during the compression stroke, but is limited in this expansion by contact with the exterior wall 16 at the periphery of the opening 40. This prevents the band 78 from expanding far enough to slip over flanges 82 of the end portion 74 and risk being displaced from its port-covering axial position along the cylinder liner 36.

Figure 8:
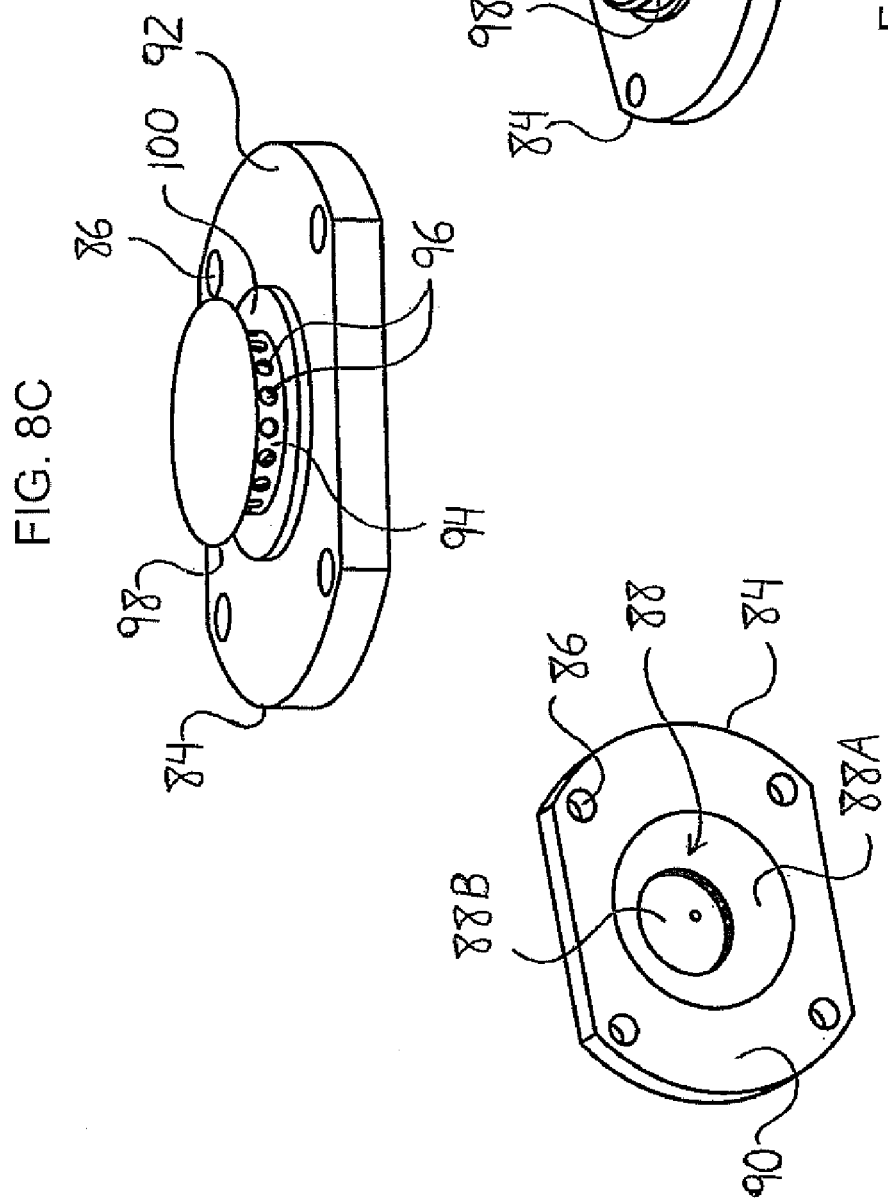
FIGS. 8A, 8B and 8C are perspective views of a cylinder head of the first embodiment portable compressor.

In the first embodiment, the same unique valve structure is used to form the intake valve in the cylinder head 48. As shown in FIGS. 8A-8C, the cylinder head 48 features a cover portion 84 in the form of a flat plate for flush mounting against a respective flattened portion 50 of the exterior surface of the exterior housing wall 16. Fastener holes 86 are provided in corners of the cover portion 84 for receiving fasteners 49 that threadingly engage the exterior wall 16. An inlet 88 is recessed into the cover portion 84 from an outer face 90 thereof then continues passed an inner face 92 of the cover portion so as to form a cylindrical portion 94 projecting into the cylinder liner when the cylinder head 48 is mounted on the compressor housing 12. The external side of the inlet 88, i.e. that side viewable from outside the compressor housing with the cylinder head installed thereon, is shaped similar to a jet engine intake, with a curved outer edge 88A forming a trumpet like flare in a direction outward from the housing 12, like that of a velocity stack, and an inlet cone or conical center 88B surrounded by the flared surface, concentric therewith and tapering to its tip in a direction outward from the housing 12. The contoured inlet serves to accelerate the flow of air therethrough to increase the volume of air feeding into the cylinder. These surfaces of the inlet are polished to provide a highly smooth finish. The cylindrical portion 94 extending perpendicularly from the inner face 92 of the cover portion 84 features intake ports 96 extending radially through its wall and spaced circumferentially thereabout, creating passageways between the inlet 88 and the interior of the cylinder liner 36 when the cylinder head 48 is mounted. A flange 98 extends radially outward along the circumference of the cylindrical portion 94 at an end thereof opposite the cover portion 84, thereby creating a groove 100 between the flange 98 and inner face 92 for retaining another resilient band 78. The resilient band 78 acts similar to that of the exhaust valve except it acts to let uncompressed gas enter the cylinder liner 36 for compression therein by the piston 42.

During the intake stroke where the piston 42 retracts radially inward toward the interior wall 30 of the housing 12 under the action of the respective connecting rod 44 toward a fully retracted position nearest the crankshaft compartment and the drive system components disposed therein, pressure is reduced within the cylinder liner 36. Since the pressure outside the housing 12 exceeds this reduced pressure within the cylinder liner 36, it acts to expand the band 78 about the cylindrical portion 94 of the cylinder head 48, thereby uncovering the intake ports 96 and allowing gas to flow from outside the compressor housing 12 into the cylinder liner 36 for compression by the piston 42 during the compression stroke. As gas enters the cylinder liner 36, the pressure difference between the surrounding environment and the cylinder liner interior reduces, causing the resilient band 78 to elastically return from its expanded open position to its closed position sealing of the intake ports 96. During the compression stroke, as the piston moves toward a fully extended position furthest from the crankshaft compartment, the build-up of pressure within the cylinder liner 36 therefore acts not only to stretch the band of the exhaust valve to open the exhaust ports but also to keep the band of the intake valve sealed over the intake ports. In other words increased pressure within the cylinder liner of each gas compressor encourages expansion of the exhaust band but opposes expansion of the intake band. Again, the characteristics of the bands are carefully chosen to provide the necessary function at the desired pressure levels of the compressor.

As shown in FIGS. 4 and 5, gas passageways 102 are provided extending from within the receiving compartment between the interior and exterior walls 30, 16 of the housing 12 through the circular cover 18 for communication with a number of components supported on the housing exterior. As seen in FIG. 2, these components may include male and female connection fittings 104, 105 for connection of discharge lines or air delivery hoses having male or female connectors thereon, a pressure gauge 106 for monitoring pressure within the receiving compartment or manifold and a depressurization valve 108 for manually emptying the receiving compartment of compressed gas. It should be appreciated that the compressor of the present invention may be equipped with other components used with conventional compressors. For example, a pressure switch can be installed and wired between the battery and motor in a known manner to activate and deactivate the motor in response to the pressure measured within the receiving compartment or manifold to activate when additional compressed air is needed and deactivate when the pressure reaches a particular value. The pressure switch may be adjustable to allow adjustment of this value to control the discharge air pressure for a particular application. The removable and circular covers 14, 18 may feature cooling fins 110 to help dissipate heat produced during compression. FIG. 3 shows the compressor coupled with a DC motor 26 at the driving end 22 of the crankshaft 24, the DC motor being powered by a schematically illustrated battery pack 112, which may be rechargeable. In the first embodiment, the motor 26 is angled at approximately 30 degrees to reduce the height to which the motor extends from the circular lid 18, therefore requiring a transmission 114 to transfer power from the motor to the crankshaft. It should be appreciated that the motor may be mounted in alternative orientations. In the first embodiment, the crankshaft extends outward from the housing through each cover so that a drive source can be connected to one end and a second compressor may be coupled to the other end for running of two or more compressors by the one drive source. It should be appreciated that the compressor would still be operable with only one end of the crankshaft extending outward from the housing for coupling with a drive source.

Driven by the motor 26, the crankshaft 24 drives the master connecting rod 52 about the rotational axis of the crankshaft by means of the crank pin 64. This rotational motion is transferred to linear displacement of the pistons 42 within the cylinder liners 36 by means of the connecting rods 44 (including the rod portion extending from the master connecting rod, or master connecting rod). The result is that the gas compressors 28 begin their respective compression strokes in a sequential fashion about the rotational axis, exhausting compressed gas into the receiving compartment one after the other so as to effectively provide a near-continuous supply of compressed gas for discharge from the compressor 10. In the same sequential fashion, the intake strokes of the gas compressors 28 begin one after the other in a sequential fashion about the compressor, thereby effectively providing a near-continuous intake of gas from outside the compressor housing to prevent emptying of the receiving compartment. The compressor of the first embodiment is of the single-stage variety such that the air compressed within each cylinder liner is discharged directly to the receiving compartment rather than to another cylinder liner for further compression.

With the six radially arranged gas compressors spaced around the driveshaft axis, when the piston of one gas compressor completes its compression stroke by reaching the fully extended position, the piston of a diametrically opposed gas compressor completes the intake stroke with its piston reaching the fully retracted position. At this moment, two of the four remaining gas compressors are in their compression stroke with their pistons moving toward their fully extended position and the other two gas compressors are in their intake strokes with their pistons moving toward the fully retracted position. The even spacing of the gas compressors about the driveshaft axis ensures that the timing between the completion of one compression stroke and the next is consistent at a constant rotational speed of the driveshaft.

As seen in FIG. 4 to 6, each of the crank cheeks 66 extends passed the crankshaft journal 67 to form an integral counterweight 116 in the form a semi-circular lobe disposed diametrically opposite the master connecting rod 52 about the crankshaft's rotational axis. The counterweights help minimize vibration of the compressor 10 caused by eccentric rotation and reciprocation during operation. The counterweights may be provided with closable containers 118 thereon for storing weight-adding material to provide dynamic balancing by means of adding or removing such material to adjust the overall weight of the counterweights. Access to such containers is provided by means of the removable lid 14.

The compressor is not oil-lubed, but rather includes a ring 120 of Teflon™ or other suitable low-friction material extending about the circumference of each piston 42 to decrease friction between the cylinder liner 36 and piston. Piston rings are used in a conventional manner to provide seals between the pistons and cylinder liners to prevent leakage of air from the gas compressors into the crankshaft compartment.

A working prototype of the first embodiment was produced and coupled with a motor from a 28V cordless skill-saw, powered by a 28V lithium ion battery, by a custom made 1:1 drive-line and housing. The combined components weigh 12 lbs or less, dependant on materials used, and the prototype compressor is 7 inches in diameter and 2.5 inches thick. With the motor attached its overall dimensions fit within a volume of 4×7×14 inches. The 28-volt DC motor of the prototype develops 465-in/lb torque at 4200 rpm and the six pistons are 1-inch diameter with a 1¼ inch stroke. The design flow rate of the first embodiment prototype compressor is 7 CFM at 70 PSIG discharge. Another configuration has the motor positioned directly on top of the compressor resulting in a direct drive as opposed to the angled side line transmission.

The first embodiment compressor may be provided as part of a compact system which can be easily carried by a user to power any number of pneumatic tools without any limitation of movement causes by power cords or air hoses. Such a system may include:

Back Pack—a lightweight carrying case, meant to be worn on the back of the operator. The pack may have adjustable padded straps, carrying handle, pockets for accessories, hookups and loops for carrying and connecting tools, and inlet air and cooling air vents.

Chassis—a lightweight mounting mechanism to which the compressor motor and instruments are mounted, and in turn the entire chassis is placed into the backpack.

Compressor Housing—the compressor housing is an integral unit containing the crankcase (crank shaft compartment), crankshaft, connecting rods, pistons, cylinder liners, cylinder heads, and discharge air exhaust header (circular cover having at least one passageway or port therethrough, each equipped with connection fitting). The compressor is a single stage, air-cooled radial design with cylinders opposite each other in a balanced opposed configuration. Two compressor frames may be bolted together back to back and driven through a flexible coupling for applications which require increased volumes of air Motor—the DC drive motor drives the compressor directly or indirectly through gearbox(s) and is mounted onto the chassis with vibration isolators.

Battery Pak—the DC battery(s) is placed into an adapter that is mounted on the Chassis. The batteries are removable for external recharging.

Pressure Switch—an air/electrical pressure switch is mounted on the chassis to control the discharge air pressure for the application and is adjustable.

Power Switch—an electrical switch located externally on the backpack to isolate the batteries from the motor, and accidental operation. With the power switch on, the pressure switch activates the motor as needed to maintain the discharge air pressure.

Depressurization Valve—a manual valve located externally on the backpack to depressurize the compressor for maintenance or travel.

Pressure Gauge—rescheduled a pressure indicator mounted on the discharge header of the compressor to indicate actual working pressure, as well as to calibrate the pressure switch Quick Disconnect—a standard pneumatic tool quick disconnect mounted externally on the backpack to connect to an air tool hose.

The efficiency of the first embodiment compressor is such that ample amounts of compressed air are produced so quickly, that there is no need for a separate volumetric vessel (tank). Enough compressed air is produced on demand to operate most typical hand held air activated tools. Since this compressor is so efficient, it is therefore possible to drive it with a battery powered motor and achieve the same out put as one would expect from a power corded compressor. This being the case, it is therefore possible to combine the battery, motor and compressor, place them together into a wearable pack enabling an individual to freely roam while having ample compressed air at their finger-tips to operate any air tool which normally would only be driven by a stationary compressor via a long hose.

P3 Compressor

Figure 10:
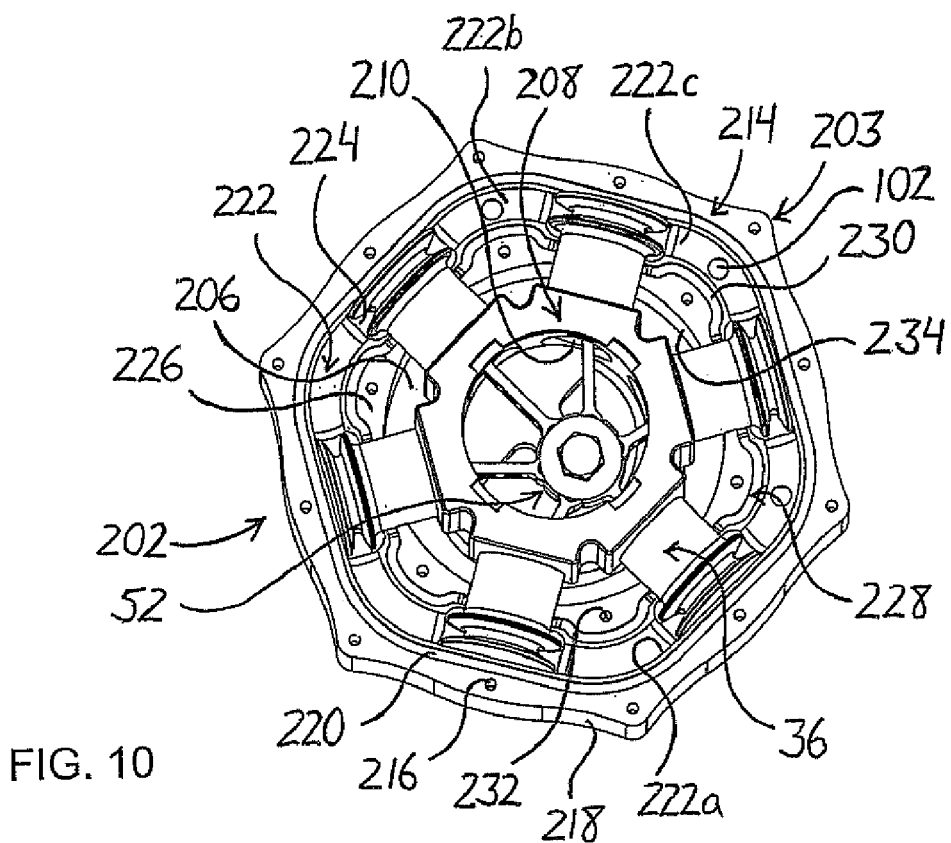
FIG. 10 is a perspective view of a second embodiment portable compressor with a top half of a receiver housing and a lid of a crank housing removed for illustration.
Figure 11:
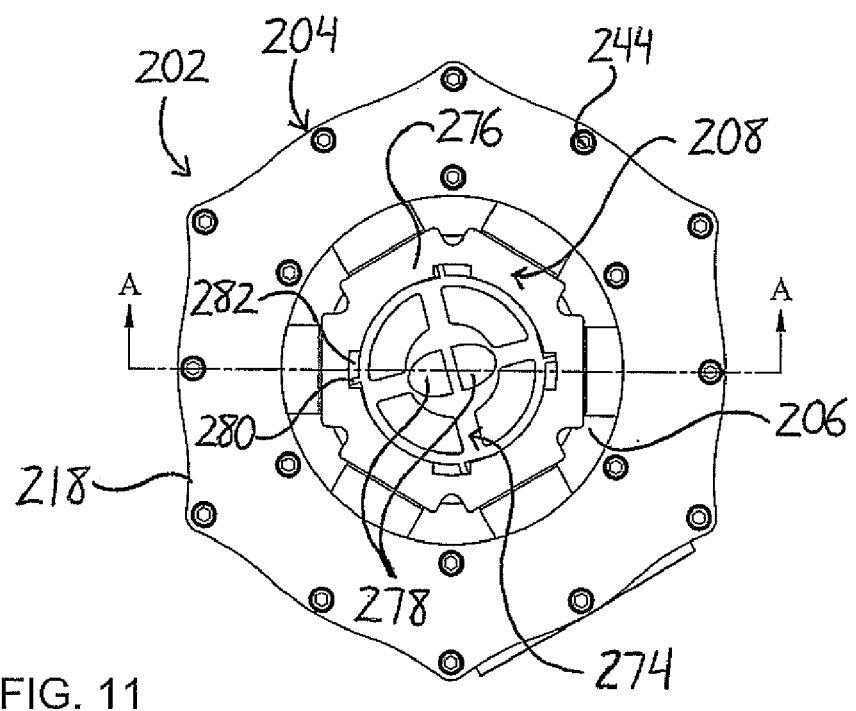
FIG. 11 is a top plan view of the second embodiment portable compressor.
Figure 12:
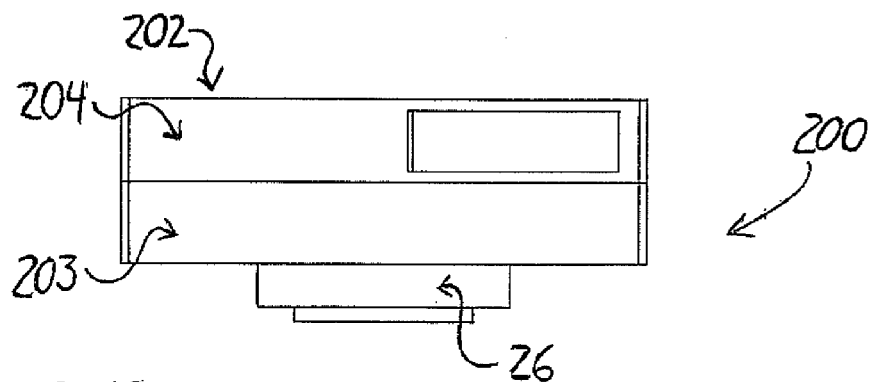
FIG. 12 is a side elevational view of the second embodiment portable compressor.

FIGS. 10 to 12 show a second embodiment portable compressor 200 that is similar to the first embodiment portable compressor in that it features six cylinder liners 36 in a radial arrangement and a similar drive system featuring a motor 26 driving revolution of a master connecting rod 52 through a crank to effect sequential compression strokes of pistons 42 within the cylinder liners to discharge compressed gas into a common receiver. The second embodiment compressor 200 however is different from the first embodiment compressor in a number of ways.

As shown in FIGS. 10 and 11, the second embodiment compressor 200 does not feature a unitary housing, but instead includes two separate housings. A receiver housing 202 defines a manifold into which compressed gas is exhausted from the cylinder liners 36 and is formed by a bottom half 203 and a top half 204 which mate together with the cylinder liners 36 disposed between them. With its halves mated together, the receiver housing 202 is annular in shape so as to define a central opening 206. A crank housing 208 is positioned within the central opening 206 of the receiver housing 202 and similarly has an annular shape defining a central opening, within which the body of the master connecting rod 52 and the crank pin are disposed. The cylinder liners 36 are received in openings 210 extending radially through the annular crank housing 208 from the central opening thereof toward the surrounding receiver housing 202. The cylinder liners 36 are sealed to the crank housing 208 at these openings therein and project radially outward from the crank housing 208 into the surrounding receiver housing 202.

Figure 18:
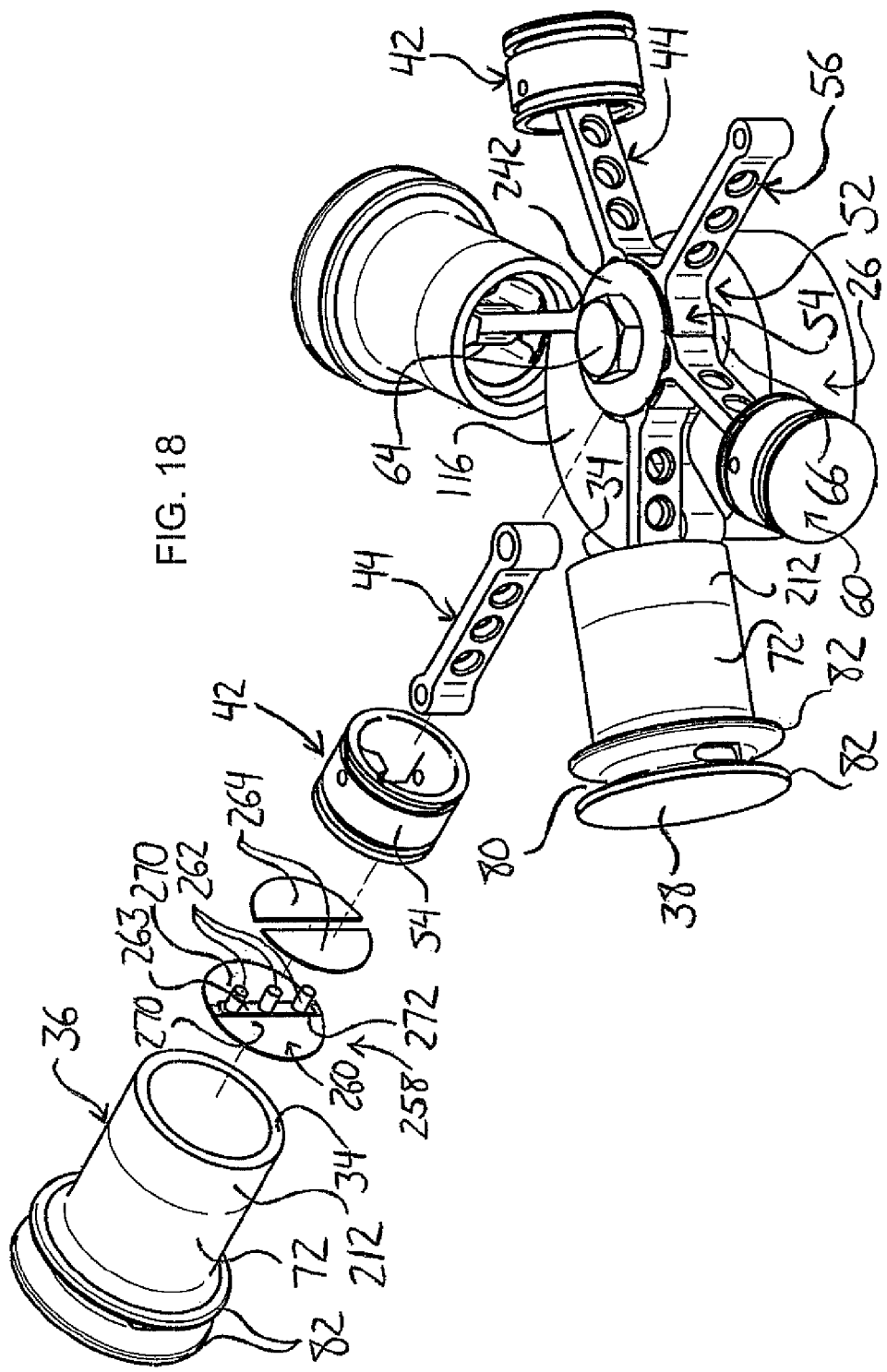
FIG. 18 is a partially exploded perspective view of cylinder liners, a drive system, and the intake valve flap assembly of the second embodiment portable compressor.

Unlike those of the first embodiment, the cylinder liners 36 of the second embodiment compressor 200 do not flare outward to an increased diameter at opposite ends of a cylindrical portion 72. Instead, each cylinder liner 36 has a threaded portion 212 extending from the drive end 34 thereof nearest the central opening of the crank housing 208 so as to sealingly mate with corresponding threads provided on the respective opening 210 through the crank housing 208. A shown in FIGS. 18 and 19, the cylinder liner 36 also does not flare outward toward the valve end 38 opposite the drive end 34, but does feature pair of flanges 82 disposed on opposite sides of a recess 80 in its exterior surface. The one of these flanges 82 furthest from the drive end 34 of the cylinder liner defines the valve end 38 thereof, which in the second embodiment compressor is closed. At the recess 80 defined between the flanges 82, a plurality of exhaust ports 76 spaced about the central longitudinal axis of the cylinder extend radially through the cylinder liner 36 to communicate its hollow interior or cylindrical bore with its exterior. A resilient band of flexible material 78 is stretched about the cylinder liner 36 within the circumferential recess 80 to cooperate with the exhaust ports 76 in the same way as in the first embodiment to define an exhaust valve.

In the second embodiment compressor 200, the recess 80 of the exhaust valve has a tapered V-like shape narrowing inward from the radially outermost extent of the flanges 82 toward the hollow interior of the cylinder liner 36, as best shown in FIG. 19. As shown in FIG. 20A, the flexible resilient band 78 also tapers from a maximum width at its outermost surface 78a to a minimum width at its innermost surface 78b. The groove 80 and the resilient flexible band 78 taper at the same angle for an optimum fit and a tight seal when the band is not being stretched radially outward under the force of compressed air forced against it from the interior of the cylinder liner 36 through the exhaust ports 76.

Figure 13:
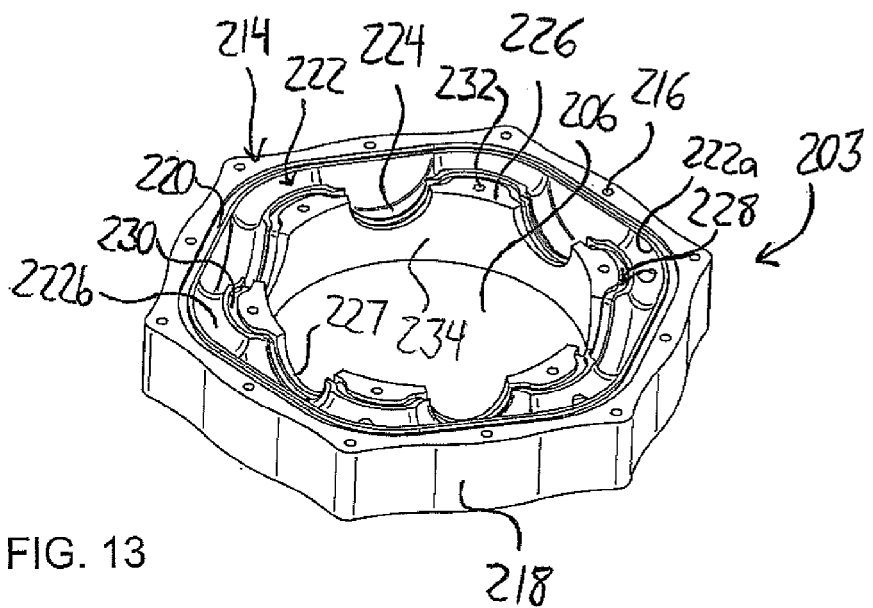
FIG. 13 is a perspective view of a bottom half of the receiver housing of the second embodiment portable compressor.
Figure 13A:
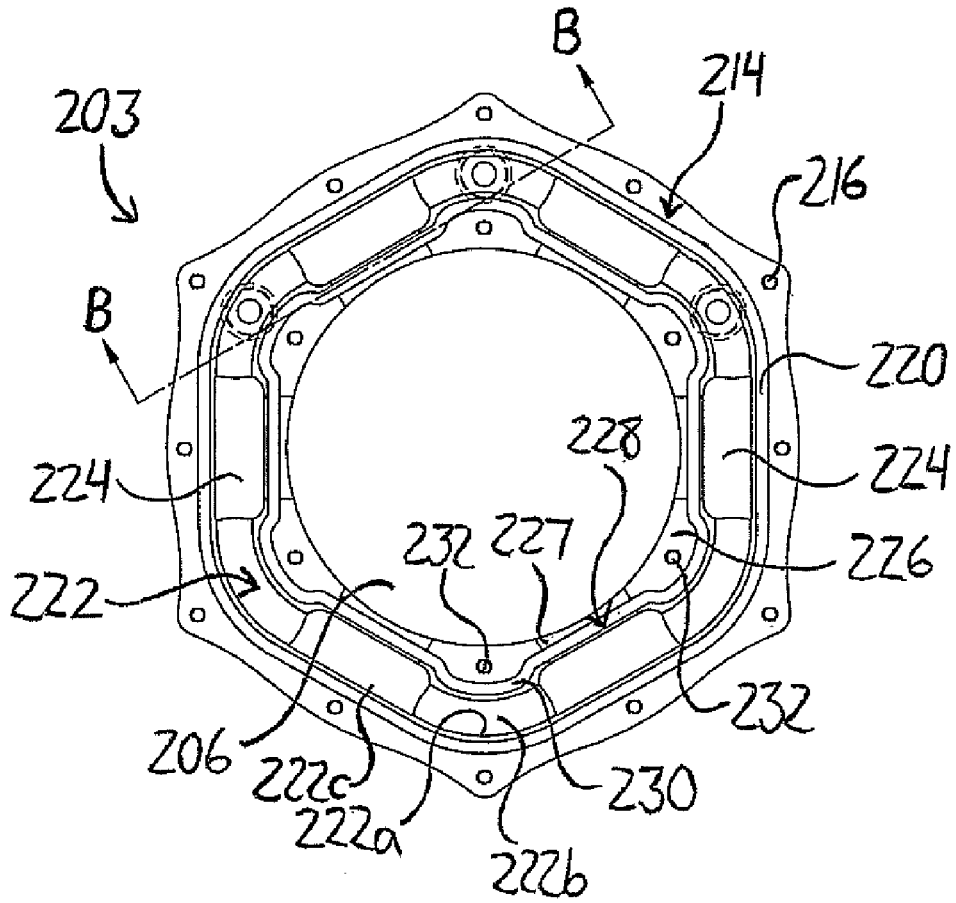
FIG. 13A is a top plan view of the bottom half of the receiver housing of the second embodiment portable compressor.
Figure 13B:
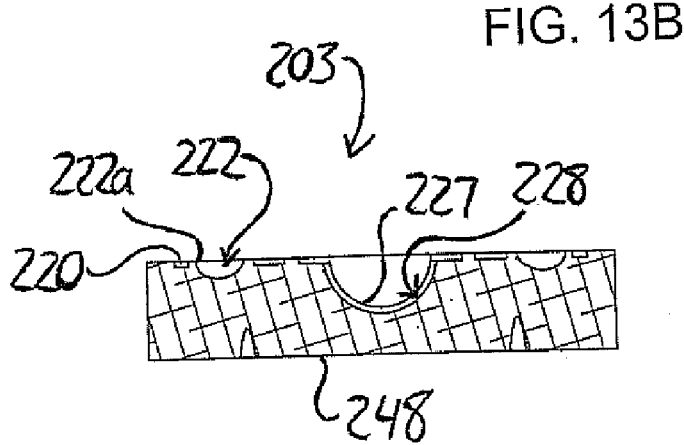
FIG. 13B is a cross sectional view of the bottom half of the receiver housing of the second embodiment compressor as taken along line B-B of FIG. 13A.

FIG. 10 shows the second embodiment compressor 200 without the top half 204 of the receiver housing 202 thereof so as to illustrate the mating side, or face, 214 of the bottom half 203 of the receiver housing, which is shown in isolation in FIG. 13. A series of fastener holes 216 extend into the bottom half 203 from the mating face 214 and are spaced thereabout adjacent the bottom half outer periphery 218. Spaced radially inward from the outer periphery 218 and the fastener holes 216 thereadjacent is an outer seal groove 220, extending fully about the central opening 206 of the receiver housing 202, in which an o-ring like seal is disposed to seal against a mating face of the top half 204 when the two halves of the receiver housing are mated together.

Just radially inward from the outer seal 220 is a groove 222 recessed into the receiver housing bottom half 203 from the mating face thereof, also extending fully around the central opening 206. Unlike the round central opening 206 around which it extends, the groove 222 has a longitudinal path extending around the central opening 206 with the grooves outer edge 222a outlining a hexagonal type shape defining rounded corners 222b and six straight segments 222c of the groove, each straight segment extending perpendicular to the longitudinal axis of a respective one of the cylinder liners. At the midpoints of these six linear segments 223 are recessed portions 224 of the groove 222 dipping further downward into the bottom half 203 from the mating face 214 thereof than the rest of the groove 222. The groove 222 is of sufficient width at each of these recessed portions 224 to receive between its sides the two flanges 82 at the valve end 38 of each cylinder liner 36 forming the valve seat groove 80 that houses the resilient band of the exhaust valve. The groove 222 is less wide between the recessed portions 224 so that the flanges 82 will only seat properly within the recessed portions 224. Each recessed portion 224 of the groove 222 is arcuate in a vertical plane along the groove's longitudinal path around the central opening 206 so as to form a rounded cradle or seat in which the round flanges 82 of the cylinder liner 36 projecting radially outward from the cylindrical portion 72 thereof can rest. An inner portion 226 of the bottom half mating face 214 radially inward of the groove 222 at each of the recessed portions 224 thereof is similarly arcuately recessed, although at a smaller diameter, in a vertical plane to seat or cradle the cylindrical portion 72 of the respective cylinder liner 36 projecting from the flanged valve end 38 thereof into the central opening 206 of the receiver housing 202. One such seat or cradle for supporting the cylindrical portion of a respective cylinder liner is shown at 227 in FIG. 13.

Just radially inward of the groove 222 and concentric with the central opening 206, groove 222, outer seal groove 220 and outer periphery 218 is an inner seal groove 228 extending fully around the central opening 206 in the inner portion 226 of the mating face 214. Between the cylinder liners 36, the inner seal groove 228 is disposed radially outwardly relative to its position at the arcuate recesses in the inner portion 226 of the mating face 214 at which the groove 228 dips downward beneath the cylinders to form a seat or cradle 227. Spaced about the central opening 206 at these more outwardly disposed portions 230 of the inner seal groove 228 is a second set of fastener holes 232 positioned between these outward portions 230 and an inner periphery 234 of the bottom half 203 of the receiver housing and extending into the bottom half from the inner portion 226 of the mating face 214 thereof.

Figure 14:
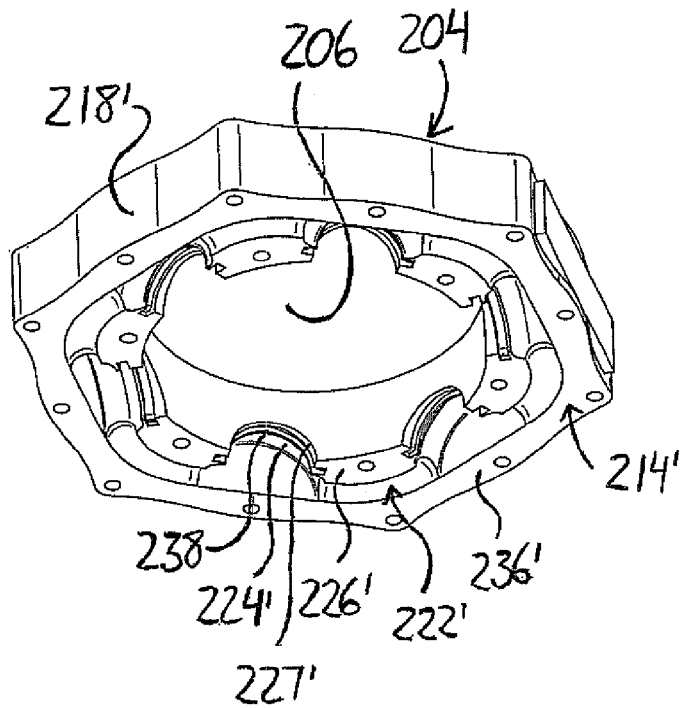
FIG. 14 is a perspective view of the top half of the receiver housing of the second embodiment portable compressor.
Figure 14A:
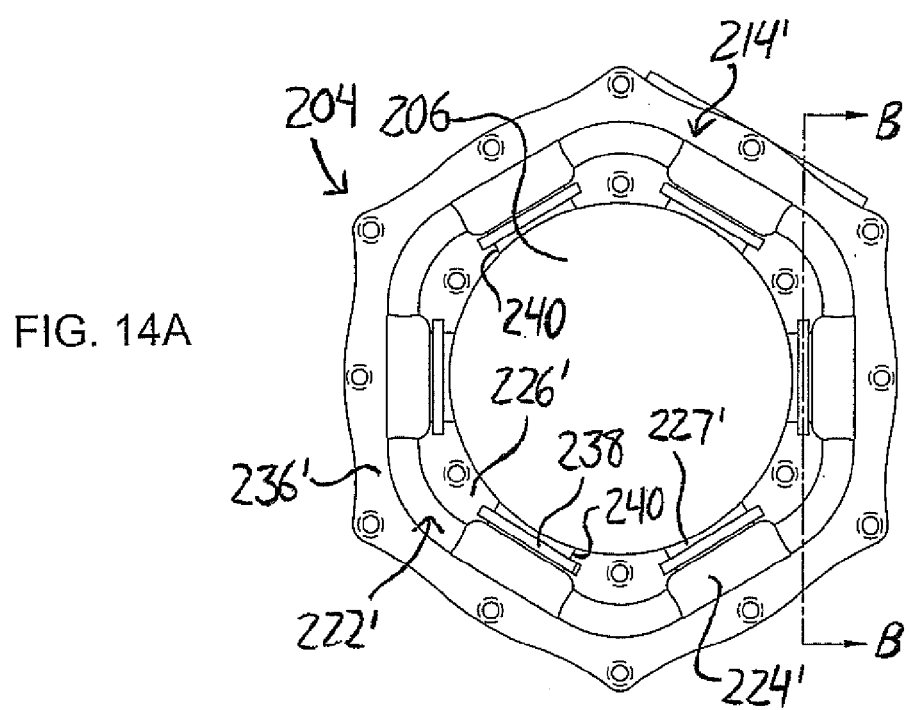
FIG. 14A is a bottom plan view of the top half of the receiver housing of the second embodiment portable compressor.
Figure 14B:
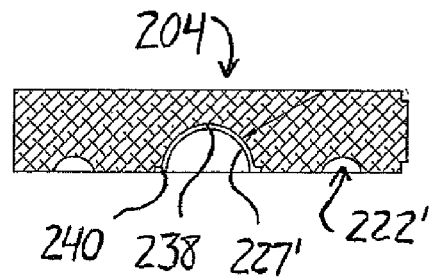
FIG. 14B is a cross sectional view of the top half of the receiver housing of the second embodiment portable compressor as taken along line B-B of FIG. 14A.
Figure 16:
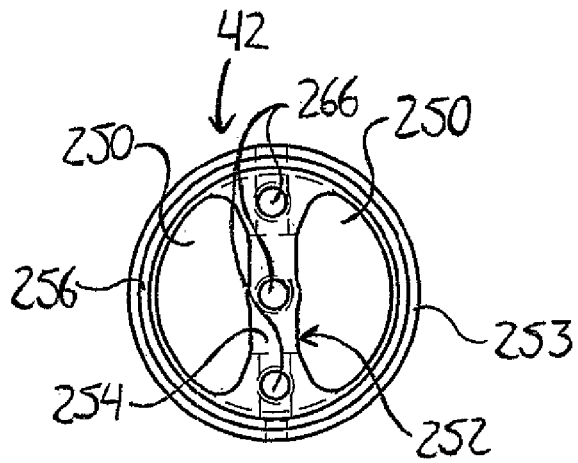
FIG. 16 is an end elevational view of the ported piston of the second embodiment portable compressor.

FIG. 14 shows the top half 204 of the receiver housing 202 in isolation before assembly with the bottom half 203. With the primary exception of the seal grooves, the top half 204 of the receiver has substantially the same structure as the bottom half. The top half 204 has a mating face 214' divided into inner and outer portions 226' and 236' by a groove 222' extending concentrically about the central opening 206 in a generally hexagonal shape with rounded corners. The groove 222' has arcuately recessed portions 224' centrally disposed along straight segments of the groove disposed between the rounded corners thereof to align with the recessed portions 224 of the bottom half 203. When the two halves of the receiver housing 202 are brought face to face with one another, the outer portions 236, 236' of the mating faces 214, 214' are sealed together by a poured in place seal disposed within the outer seal groove 220 and the inner portions 226, 226' are sealed together between the cylinder liners 26 at the outwardly disposed portions 230 of the inner seal groove 228 by a poured in place seal disposed therein. The seal disposed in the inner seal groove 228 of the bottom half 203 of the receiver housing 202 also acts to seal the bottom half 203 to each of the cylinder liners 36 by engagement of the seal along each of the cradles or seats 227 with the bottom half of the cylindrical portion 72 of a respective cylinder liner 36.

As sealing between the two halves of the receiver housing and between the bottom half 203 and the cylinder liners 36 is provided at the seal grooves of the bottom half 203, the top half 204 only needs to provide for sealing between itself and the cylinder liners 36. Six cylinder seal grooves 238 are provided on the top half 204 of the receiver housing 202 each extending along a respective one of the cradles 227' formed by a vertically disposed arcuate recess in the inner portion 226' of the mating face 214'. Each cylinder seal groove 238 extends at each of its ends slightly passed the edge 240 defined between the arcuate seat or cradle 227' and the neighbouring flat segment of the inner portion 226' of the mating face 214' to ensure that when the halves are assembled together with the cylinder liners 36 between them, no gaps exists between the receiver housing 202 and the cylinders at the cylinder seats or cradles 217, 217'. A poured in place seal is provided at each of the cylinder seal grooves 238.

For assembly of the second embodiment compressor 200, the piston liners 36 are threaded into engagement with the threaded openings provided in the outer periphery of the crank housing 208 as shown in FIG. 10. The pistons are mounted within the cylinder liners with their respective connecting rods attached and the slave connecting rods 44 are connected to the master connecting rod 52. Slave connecting rods are those that are not integral with the body of the 54 of the master connecting rod, but instead are pivotally connected thereto as disclosed for the first embodiment compressor, and the stem or shaft 57 integral with the body 54 being part of the single remaining connecting rod. A round disc-like cover 242 having an outer diameter approximately equal to that of the body 54 of the master connecting rod 52 is disposed thereatop and held in place by the head of the crank pin 64 extending downward therethrough on which the master connecting rod 52 is journaled. Beneath the master connecting rod body 54, the crank pin passing therethrough is secured to the crank cheek 66 and integral counterweight 116 which in turn has its crank journal 67 coupled to the driveshaft of the motor 26, which in the second embodiment is a disc-shaped pancake or torque motor fixed to the bottom of the crank housing 208 to help minimize the dimensions of the compressor 200.

With the crank housing 208, the gas compressors and the drive system assembled, the crank housing 208 and attached motor 26 are lowered into the central opening 206 to seat the cylindrical portions 72 of the cylinder liners 36 within the cradles 227 defined by the arcuate recesses in inner portion 226 of the mating surface 214 and seat the flanges 82 of the cylinder liners 36 within the recessed portions 224 of the groove 222. This partial assembly is illustrated best by FIG. 10, in which the top half 204 of the receiver housing has yet to be installed. To complete the assembly, the top half 204 is lowered onto the bottom half 203, with the generally hexagonal shape of the outer periphery walls 218, 218' of the two halves 203, 204 allowing easy visual alignment thereof to dispose the cylinder cradles 227, 227' of the opposing halves in alignment above and below the cylinder liners 36. The fastener holes 216', 232' of the top half 204 of the receiver housing 202 are through holes while the fastener holes 216, 232 of the bottom half 203 are threaded blind holes. The top half fastener holes 216', 232' align with the bottom half fastener holes 216, 232 so that threaded fasteners 244 can be passed into the bottom half 203 and secured thereto to clamp the two halves of the receiver housing together with the cylinder liners 36 between them.

Figure 11A:
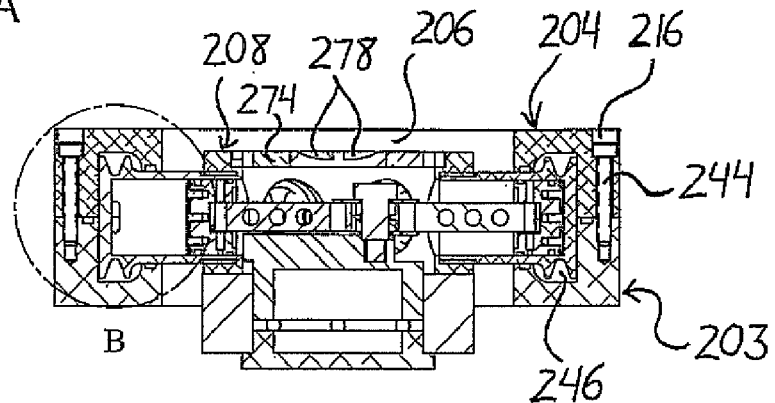
FIG. 11A is a cross sectional view of the second embodiment portable compressor as taken along line A-A of FIG. 11.
Figure 11B:
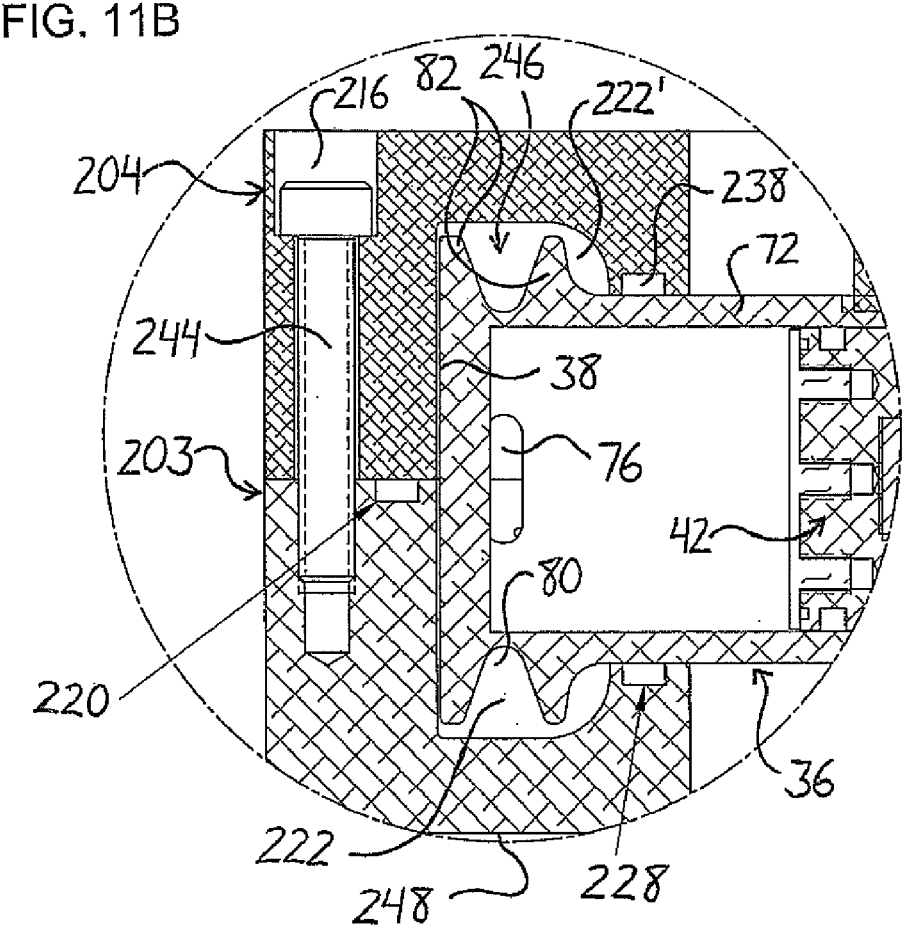
FIG. 11B is a close-up view of a portion of the second embodiment portable compressor indicated by circle B of FIG. 11A.

As shown in FIGS. 11A and 11B, with the two halves 203, 204 of the receiver housing 202 having generally the same structure, the grooves 222, 222' of the two halves are mirrored across the mating faces of the halves to form an enclosed channel 246 extending fully around the central opening 206 with the valve end 38 of each cylinder liner 36 disposed therein. The seal disposed in the outer seal groove 220 of the bottom half 203 provides an air tight seal between the outer portions 236, 236' of the mating faces 214, 214' around the entire channel 246 along the outer side thereof. The seal disposed in the inner seal groove 228 of the bottom half 203 seals between the two halves along the outwardly disposed portions 230 of the inner seal groove between the cylinder liners 36 as well as between the bottom half and each cylinder liner 36 along the arcuate recesses in the inner portion 226 of the mating surface forming the cylinder cradles 227. The seal disposed in the cylinder seal grooves 238 of the top half 204 complete the sealing off of the channel 246 by providing an air tight seal between the top half 204 and each of the cylinder liners 36.

The channel 246 thus forms a receiver, or collector or manifold, that extends about each and all of the cylinder liners 36 to sealingly enclose the valve ends 38 thereof which include the exhaust valves formed at each cylinder by the exhaust ports 76 extending radially through the cylinder liner 36 between the flanges 82 thereof and the resilient band 78 extending about the cylinder liner 36 between the flanges 82. At three of the rounded corners 222b of the groove 222 in the bottom half 203, gas passageways 102 are provided extending through the bottom half 203 parallel to the axis about which the annular receiver housing 102 extends. The bores defining these passageways pass through an exterior face 248 of the bottom half 203 opposite the mating surface 214 thereof. Just as in the first embodiment compressor, these passageways are threaded to provide sealed coupling with connection fittings, a pressure gauge, a depressurization valve or a pressure switch.

Compared to the first embodiment compressor, the receiver housing 102 provides a significantly smaller manifold or receiver for collecting compressed air from each of the cylinders for discharge through a common outlet, such as a male or female connection fitting coupled to a respective one of the gas passageways 102 for connection to an air delivery hose adapted for connection to a pneumatic tool. By defining a channel of relatively small cross section enclosing the exhaust valve on each cylinder liner, but not much else of the cylinder liner, the volume of space for receiving compressed gas is reduced. Keeping the volume of the receiver to a minimum is desirable, as it results more of an air-on-demand situation where the compressor is run more in response to an actual need or demand for compressed air and less for the purpose of filling up a reservoir of compressed air. Having the six cylinders arranged spaced about the driveshaft axis in a radial arrangement such that the pistons sequentially reach their maximum displacement to complete their compression strokes one after the other around the compressor in quick succession provides enough compressed air to run conventional pneumatic tools continuously without an external air tank and with minimal pulsing.

As shown in FIGS. 15 to 18, the second embodiment compressor 200 features a different intake arrangement than the first embodiment compressor. Rather than having intake valves provided in cylinder heads mounted sealed to the valve ends of the cylinder liners, the second embodiment features intake valves formed on the pistons 42. Two intake ports 250 extend axially through the piston 42 on opposite sides of a central span 252 extending diametrically across the round cylindrical annular wall 253 defining the periphery of the piston 42. Each intake port is of a somewhat semi-circular cross sectional shape with a diameter slightly less than that of the piston so as to take up a significant portion of the piston's cross sectional area while leaving the central span intact between the two ports. A face 254 of the piston opposite the end thereof from which the connecting rod 44 projects for connection to the master connecting rod 52, defined by the respective ends of the annular wall 253 and central span 252, surrounds each of the intake ports 250. An o-ring groove 256 in the face 254 of the piston 42 extends around both of the intake ports 250 to receive a conventional o-ring to provide proper sealing of the intake ports 250 when closed. A flap of flexible resilient material, such as LSR, 258 is shaped to define a circular disc 260 having three cylindrical projections 262 of equal length spaced along a linear strip 263 formed on a face of the disc and extending diametrically thereacross to project from the strip in a perpendicularly away from the disc face. On opposite sides of the linear strip 263, two thin metal plates 264 are bonded to the face of the flap disc 260 on which the strip is formed. Each plate 264 is shaped liked the respective portion of the flap disc 260 to which it is bonded, such that the arcuate edge of the plate is substantially flush with the periphery of the flap disc 260. The projections 262 are of sufficient length to project from the strip 263 to engage with three corresponding blind holes 266 extending into the central span 252 of the piston 42 from the face 254 thereof at positions spaced along the diametrical span 252 with the same center to center spacing as the projections.

The linear strip 263 and the diametrically extending portion of the disc 260 of the flexible flap 258 along which the strip 263 extends define a fixed portion 268 of the flap 258 retained in a generally fixed position relative to the piston face 254 by engagement of the projections 262 and blind holes 266. The remainder of the disc 260 on each side of this fixed portion defines a movable portion 270 of the disc 260 extending laterally therefrom and is movable relative to the fixed portion in a pivotal-like motion resulting from bending of the flexible disc 260 along the boundary between the fixed and movable portions, in other words along the edge 272 between the linear strip 263 and the disc face on which the strip is formed. With the projections 262 received in the blind holes 266, the movable portions 270 are movable relative to the fixed portion 268 from a closed position in which they are coplanar, in other words where together with the fixed portion 268 they form the flat disc 260, to an open position in which they each extend out of the plane of the fixed portion 263 away from the piston face 254. In the closed portion, the plate 264 fixed to each movable portion 270 of the disc rests flush against the o-ring seal 256a disposed in the o-ring seal groove 256 along the arcuate portion of the respective somewhat semicircular port 250 for covering or closing thereof. In the open position, the plate 264 is at least partially lifted from this flush contact with the seal 256a to open or uncover the port to allow airflow therethrough.

Figure 15:
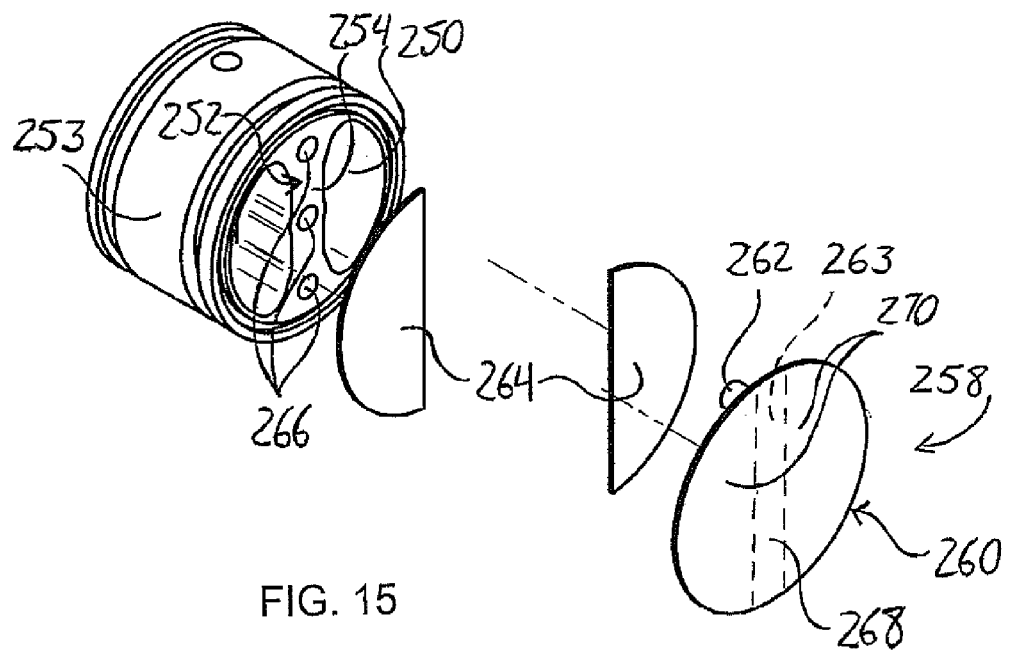
FIG. 15 is an exploded perspective view of a ported piston and an intake valve flap assembly of the second embodiment portable compressor.
Figure 15A:
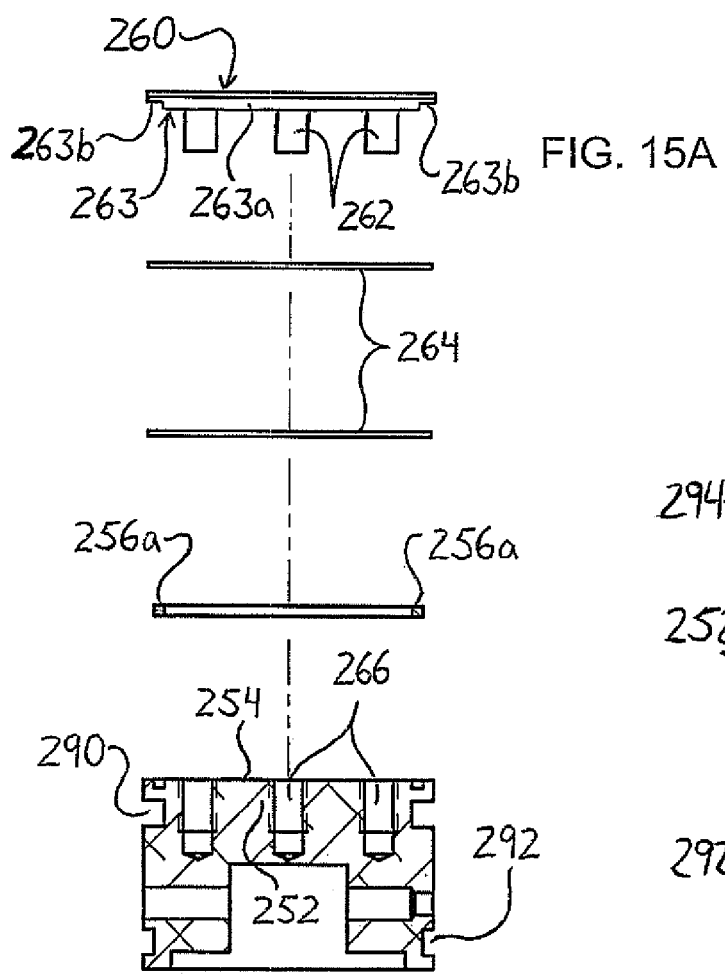
FIG. 15A is an exploded side view of the ported piston and the intake valve flap assembly of the second embodiment portable compressor with the ported piston partially cut away

As best shown in FIG. 15a, the linear strip 263 is stepped at each end from a central portion 263a, from which the projections 262 extend, to a shorter end portion 263b of smaller thickness equal to that of each metal plate 264. With the flap in place for use, the central portion 263a will sit flush against the face of the central span 252 of the piston over its full length from the inside perimeter of the annular o-ring seal groove 256 at one end of the central span 252 to a diametrically opposite point on the inside perimeter of the o-ring seal groove 256. The difference in thickness between the central portion 263a of the strip 263 and the end portion 263b is equal to the distance by which the o-ring seal 256a received in the o-ring seal groove 256 projects from the piston face 254 in a direction perpendicular thereto. Like the metal plates 264 do when the flap is closed over the ports, the end portions 263b of the strip thus rest flush with the face of the o-ring seal 256a projected slightly past the piston face 254 from the o-ring seal groove 256 therein. Spanning the full length of the central span 252, the ends of the central portion 263a of the strip 263 abut against inner periphery of the o-ring seal 256a. The stepped ends of the strip thus 263 seal up and over the o-ring seal 256a from within the annular o-ring seal groove 256 between the two plates to complete the annular seal around the piston face when the movable portions of the flap are in the closed position to seal of both ports 250. In the open position, these strapped ends of the strip 263 remain engaged to the o-ring seal due to the fixed engagement between the integral projections 262 with the piston, but the metal plates 264 are lifted from off the o-ring to allow air to pass through the intake ports.

In the illustrated embodiment, the disc 260, the strip 263 and the projections 262 are an integral unit that may be possible to mold into place on the piston. For example, two temporary elongate linear barriers may be placeable along the central span 252 of the piston on the opposite sides thereof, each being equal in height to an o-ring seal 256a disposed in the o-ring seal groove 256, to form parallel chords of the circle defined by the o-ring seal. Each metal plate 264 can then be set atop the barrier and arcuate portion of the o-ring seal on the respective side of the central span. With the o-ring equipped piston and the plates so arranged within a mold, LSR can then be poured or injected into the mold over the piston and the plates sitting thereatop. The LSR entering the area between the barriers along the central span 252 forms the strip 263, the barriers preventing the LSR from flowing therepast beneath the plates and into the ports. LSR flowing from this area between the barriers down further into the blind holes 266 in the central span 525 forms the projections, the holes each being threaded so that when the LSR dries, interference between the periphery of each projection with the threads of the respective hole 266 prevent linear withdrawal to secure the flap to the piston. In other words, the threads within each hole or bore 266 act as barbs projecting into the periphery of the respective projection 262 of the flap. Rotation of a projection to withdraw from the respective threaded hole or bore is prevented by the use of multiple projection and threaded hole pairings. A thin layer formed over the strip once the area between the barriers is filled defines the disc 260. Forming separate seal grooves around the two ports, rather than the single o-ring seal groove 256 extending about both ports, may improve the ease of molding the flap onto the piston by preventing leakage of LSR into the ports without the need for some temporary measure for this purpose during molding.

Alternatively, the flap 258 may be formed and mounted on the piston in a two-stage molding process in which the disc 260 and the strip 263 are formed on the two metal plates 264 held positioned relative to one another in a mold as though in their in-use closed position (co-planar with their straight sides spaced from one another by a distance corresponding to the strip 263 to be formed), the mold shaped such that LSR flowed between the plates will form the strip 263 and LSR flowed onto the faces of the plates will form the disc thereatop integral with the strip. The mold would feature three projections spaced along the strip-forming portion therein to produce three through holes spaced along the strip and passing through the strip and the disc integral therewith. Having so formed the disc and strip on the metal plates, the second stage involves fixing these components in place on the piston so that the three holes in the disc and strip structure align with the blind holes 266 in the central portion 252 of the piston and the metal plates 264 sitting flush on the o-ring seal already installed on the piston. LSR is then poured or injected into the blind holes 266 in the piston through the corresponding holes in the strip and disc formed during the first stage, this LSR drying to form the same connection with the piston as described above and also bonding to the previously formed LSR disc and strip.

Rather than using the projections 262 to secure the flap to the piston, threaded fasteners may be passed through the disc 260 to engage the threaded holes in the piston. A metal strip of material may be applied on a side of the disc opposite the piston for passage of the fasteners through the metal strip and the flexible flap to better distribute pressure applied to the disc by the fastener heads along the fixed portion to help keep it stationary.

With the intake valves formed on the pistons 42, air is not drawn into the cylinder liners 36 through cylinder heads disposed on the outer periphery of the compressor like the first embodiment, but instead is drawn into the cylinder liners 36 through a hollow space encircled by the annular crank housing 208. As this hollow space or crank chamber at the center of the annular crank housing 208 is closed at the bottom by the motor 26, a top end of this space must be left at least partially open to allow intake air to feed into the cylinder liners 36 through the openings 210 in the annular crank housing walls. Therefore a lid 274 engagable to the crank housing 208 proximate the top face 276 thereof has openings 278 therethrough to allow airflow into the hollow space, or crank chamber, defined by the annular crank housing 208 containing components of the drive system. The lid is disc shaped having four tabs 280 projecting radially outward therefrom at evenly spaced points about its circumference. Four corresponding notches 282 extend radially into the inner periphery of the crank housing 208, each having a respective slot extending from a side thereof below and parallel to the top face 276 such that upon lowering of the lid slightly into the crank chamber to rest the tabs 280 come within the notches 282 open at the top surface 276, the lid 274 can be rotated about its axis to slide and snap the tabs 280 into the slots. This prevents linear withdrawal of the lid 274 upward from the crank housing 208 without a manual unlocking rotation of the lid to return the tabs 280 to the notches 282 open at the top surface of the 276 of the crank housing 208.

When the pressure inside the cylinder liner 36 between the piston 42 and the valve end 38 of the cylinder liner decreases during the intake stroke of the piston 42 back toward the crank housing 208, the air pressure outside the compressor 200 eventually exceeds it. As the intake ports 50 are in fluid communication with the outside air surrounding the compressor 200 through the cylinder liner 36, opening 210, crank chamber and the crank chamber inlet defined by the openings 278 in the lid 274, this increase in pressure forces the movable portions 270 of the flexible flap and the metal plates 264 bonded thereto into the open position to uncover the intake ports 250 and allow airflow into the cylinder liner 36 between the valve end 38 thereof and the piston 42 for later compression by the piston 42 during the compression stroke. As air passes into the end of cylinder liner 36 through the intake ports 250, the pressure difference between the surrounding environment and the cylinder liner interior reduces, causing the movable portions 270 of the resilient flap to elastically return from the bent open position to the closed position, coplanar with the fixed portion 268, to seal off the intake ports 50.

The relatively large total cross sectional are of intake ports 50 of the second embodiment compressor compared to those of the first embodiment increase the intake air volume. At the relatively low pressures associated with the use of typical pneumatic tools, the large ports and LSR flap should allow significant volumes of compressed air to be produced relatively quickly from the plurality of cylinders, with relatively little heat retention, to build up sufficient pressure for powering rapid repetitive actuation of the pneumatic tool. It is also thought that these unique valves may be able to overcome the limitations on the port size of conventional reed valves relative to the achievable compression, and may therefore have potential for use in higher pressure applications. The use of a flexible resilient flap having a movable portion extending from a fixed portion to carry a separate metal plate attached thereto for covering a respective port reduces the likelihood of premature failure compared to metal or fiberglass reed valves which may fatigue and fail to seat properly or snap off, as all of the flexing or bending is handled by the LSR or other suitable flexible material, and not by the metal plates. The metal plates, by having significantly more rigidity than the flexible flap, each provide a consistently flat surface for sealing with the o-ring and limit the flexing or bending of the flap to the border between the fixed and movable portions to allow only the desired pivotal-like motion thereabout. Like the flexible, resilient LSR bands of exhaust valves of the second embodiment and both valve sets of the first embodiment, the LSR flap of the second embodiment intake valves reduce waste energy compared to heat-retaining conventional reed valves and offer improved resistance to stress-induced failure.

Figure 17:
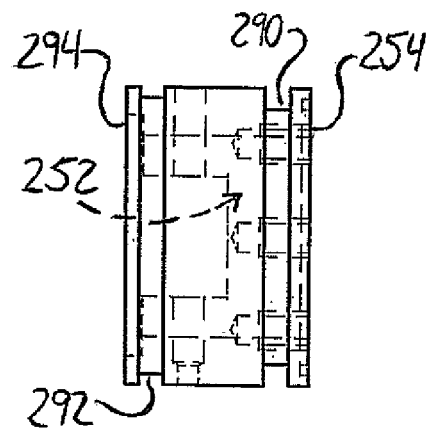
FIG. 17 is a side elevational view of the ported piston of the second embodiment portable compressor.

It should be appreciated that a flap with a fixed portion secured to the surface surrounding a single port on one side thereof and only a single corresponding movable portion would work in the same way, and that a valve of this type is not limited to specific use as an intake valve nor is it limited to a piston-mounted valve type. It should also be appreciated that flexible material other than LSR may be used to provide similar advantages and that the plates may be made of materials other than metal while still providing the greater rigidity required at the movable portion of the valve flap. In the second embodiment compressor, the central span 252 spans the full interior diameter of the annular piston wall 253 only partially along the piston's length from the face 254, as shown in FIG. 17, so as to provide room for pinning of the connecting rod 44 inside the annular 253. A seal ring groove 290 and a rider band groove 292 are provided in the exterior surface of the annular piston wall 253, extending circumferentially thereabout and spaced along piston's length, to support a seal ring and a rider band, such as a friction reducing Teflon piston ring, proximate the face 254 nearest the valve end 38 of the cylinder liner 36 and the opposite connecting rod end 294 of the piston respectively.

Like the first embodiment compressor, the second embodiment compressor 200 may be mounted within a backpack for carrying on the back of a user along with a rechargeable battery pack. It should be appreciated that the compressor 200 may be adapted to have the batter pack relaeasably mounted directly thereto, with wiring of the electrical supply, motor and a pressure switch being well known to those of skill in the art. With the compressor, including the motor, and battery pack provided in such a compact unit, especially with the use of a relatively thin and flat pancake or torque motor, a full size pack may not be necessary to easy carrying by a user. For example, the compressor may be equipped with a tightenable strap for wearing about the waist or leg of a user. When carried within a bag or other somewhat closed container, the use of mesh or otherwise perforated material will reduce any interruption of a steady supply of intake air to the compressor. The battery pack may be connected to the compressor through openings in such a meshed sack or container through the openings therein, to allow easy and quick replacement of a rechargeable battery without having to first remove the entire assembly from its carrying container.

FP Minus 1

Figure 21:
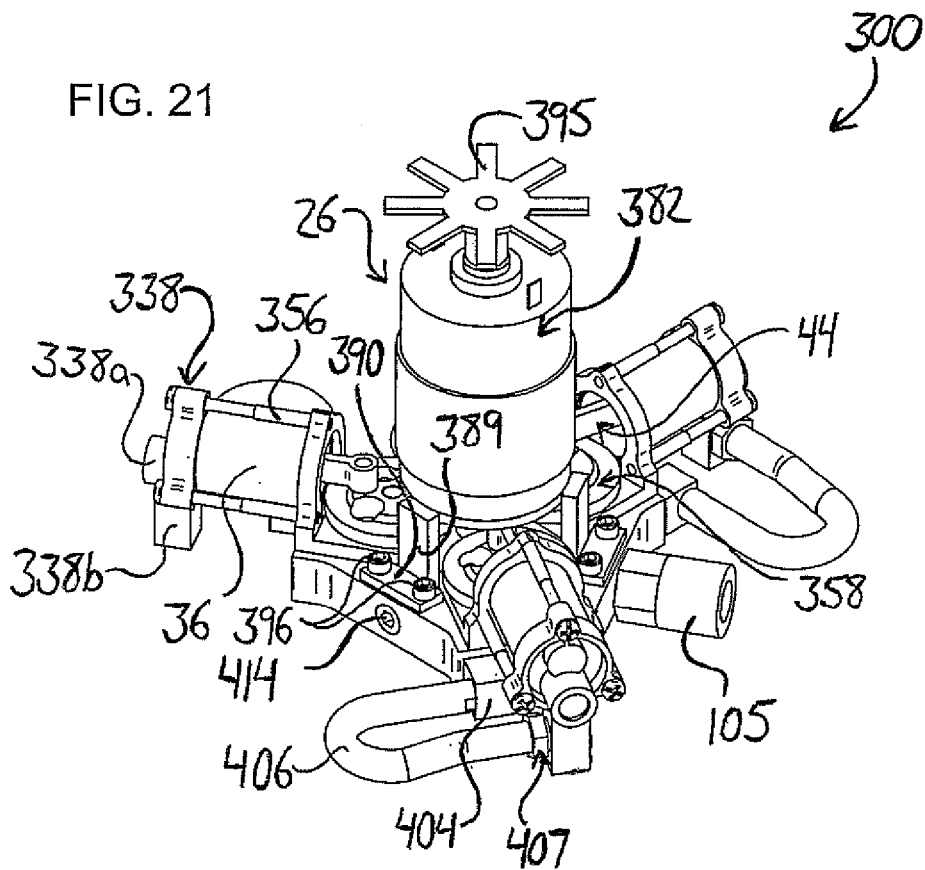
FIG. 21 is a perspective view of a third embodiment portable compressor.
Figure 22:
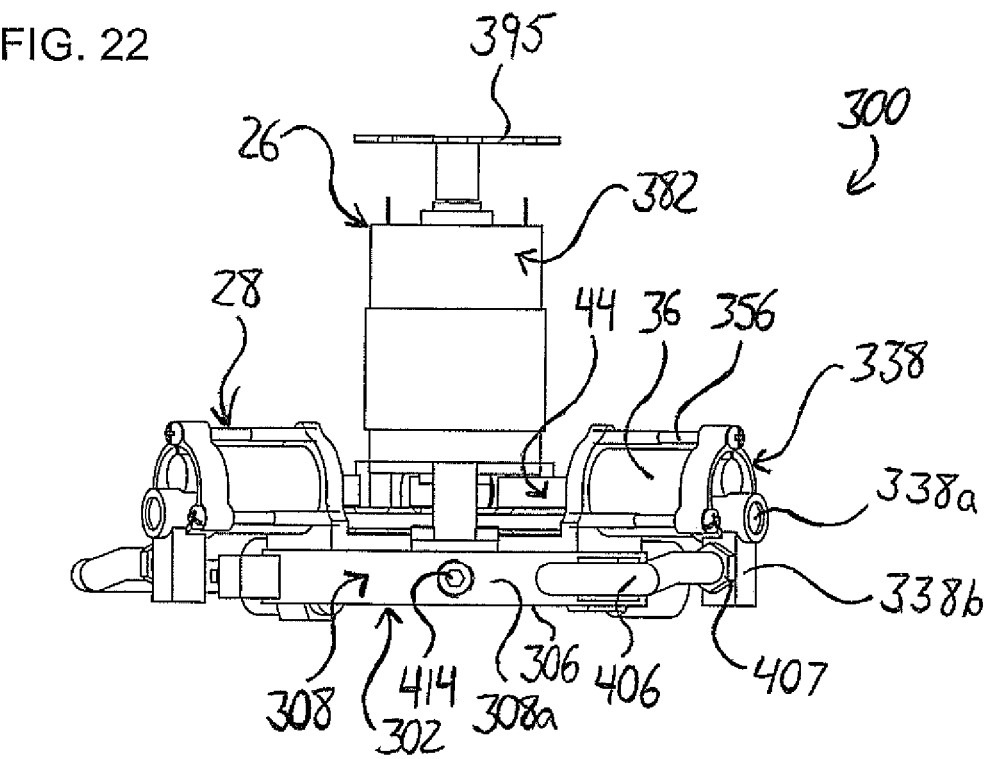
FIG. 22 is a side elevational view of the third embodiment portable compressor.
Figure 23:
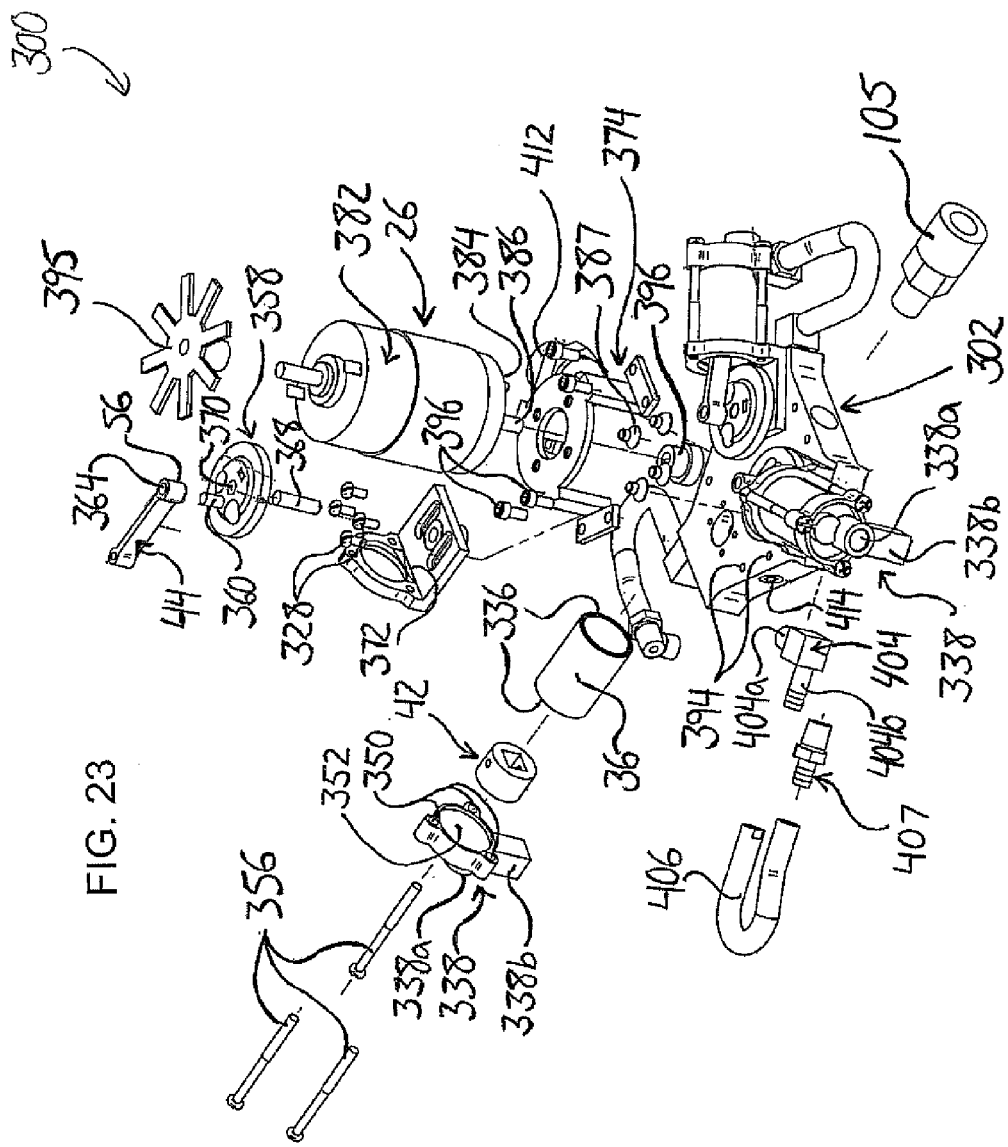
FIG. 23 is an exploded perspective view of the third embodiment portable compressor.

FIGS. 21 to 23 show a third embodiment portable compressor 300, that like the compressors of the first two embodiments features a plurality of reciprocating type gas compressors arranged radially about a central axis in a common plane perpendicular thereto and carried by a receiver or manifold that receives compressed air from each gas compressor cylinder for discharge through a common outlet. The third embodiment compressor differs significantly in structure and in that is has only three cylinders. However, those of skill in the art will appreciate that the number of cylinders present in each embodiment may be varied.

Figure 24:
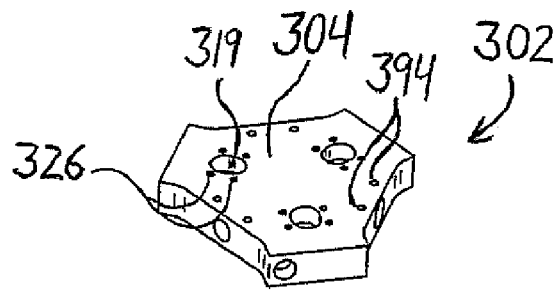
FIG. 24 is a perspective view of a manifold-defining base of the third embodiment portable compressor.
Figure 24A:
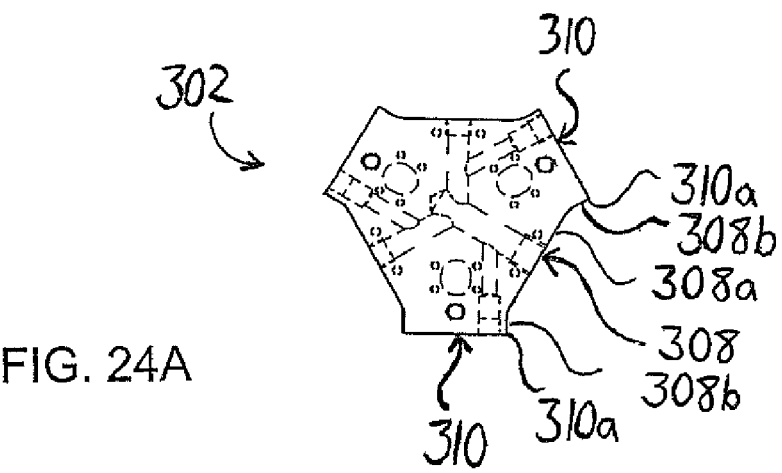
FIG. 24A is a bottom plan view of the base of the third embodiment portable compressor.

A base 302 of the third embodiment compressor 300 supports three gas compressors 28 equally spaced about and extending radially relative to a central axis of the base 302. The base 302 is a block of solid material having two identical, flat, parallel opposing faces 304, 306 with a periphery defining a constant thickness of the body 302 perpendicular to the opposing faces 304, 306 that is significantly less than the span of the identical faces 304, 306. The periphery of the body 302 is shaped such that the body has the appearance of having been formed from an irregular hexagonal body with three long sides of identical length and three shorter sides of identical length, the short and long sides alternating along the periphery of the hexagonal body, which has had the long sides each equally recessed toward the center of the body along the opposed faces 304, 306. Looking at the plan view of FIG. 24A, each resulting recessed longer side 308 of the body 302 is made up of three linear segments, a longest central segment 308a and two shorter end segments 308b at opposite ends of the central segment. The central segment 308a of each longer side 308 is parallel to an imaginary line extending between the adjacent ends 310a of the two shorter sides 310 neighbouring the longer side 308. The end segments 308b of the same longer side 308 extend obliquely outward from the central segment 308a to connect with the ends 310a of the same neighbouring shorter sides 310 at right angles thereto.

As shown in FIGS. 21 and 22, each of the cylinder liners 36 is mounted to the top face 304 of the body 302 so as to project outward from a respective one of the shorter sides 310 of the body 302 radially away from the center thereof. In the third embodiment compressor, the cylinder liners 36 are of a standard conventional type having hollow cylindrical bodies, each open at its opposite ends and continuous around its longitudinal axis over its entire length. As shown in FIGS. 23 and 25, the cylinder mount 312 for each cylinder liner 36 has a right-angle bracket structure including a plate-like rectangular base portion 314 for mounting flush atop the top face 304 of the body 302 and an annular portion 316 projecting perpendicularly from an end of the base portion 314. A cylindrical protuberance 318 depends perpendicularly from the base portion 314 between the end thereof from which the annular portion 316 projects and an opposite end in a direction opposite the projection of the annular portion 316. The protuberance 318 fits into a corresponding blind hole 319 extending into the body 302 perpendicularly from the top face 204 thereof at a distance radially inward from the respective shorter side 310 such that the base portion 314 of the cylinder mount 312 extends from the protuberance 318 toward the shorter side 310 to support the annular portion 316 thereat. The protuberance 318 is hollow with a bore 320 thereof extending through the base portion 314 such that the protuberance 318 is open at both ends thereof. On each side of the protuberance 318, a fastener slot 322 is formed in the base portion 314 to extend toward the end thereof from which the annular portion 316 projects away from the opposite end. The slot 322 passes through the base portion 314 to the bottom surface thereof, but at a depth below the top surface 324 of the base portion 314, the slot 322 is narrowed and shortened by a continuous flange 325 of constant width projecting into it. In other words, the slot is stepped from a first set of larger dimensions to a second set of smaller dimensions moving from the top face 324 of the base portion 314 toward the opposite bottom face. A pair of spaced apart threaded blind fastener holes 326 extends into the body 302 perpendicularly from the top surface 304 thereof on each side of the blind hole 319 so as to align with a respective one of the fastener slots 322 when the protuberance is lowered into the blind hole 319. Two threaded fasteners 328 are passed through each slot 322 and threaded into the respective pair of fastener holes 326 to clamp the cylinder mount 312 to the top face 304 of the body 302 by engagement of the fastener head with the flange 235 of the base portion 314 projecting into the slot 322.

The annular portion 316 of the cylinder mount 312 has a round central opening 330 extending therethrough about an axis perpendicular thereto. Like the slots 322 in the base portion 314, the central opening 330 of the annular portion 316 is stepped, going from a larger diameter at an outer face 332 thereof opposite an inner face 334 of annular portion 316 from which the base portion 314 projects to a smaller diameter at the inner face 334. Viewed from the outer face side of the cylinder mount 312, this creates an annular flange projecting into the opening 330 part way therethrough from the outer face 332 against which one of the annular end faces 336 of the cylinder liner 36 abuts when the cylinder liner 36 is urged into the opening 330 from the outer face side of the cylinder mount 312. A piston 42 is sealingly installed in the bore or hollow interior of the cylinder liner 36 with the piston end 46 of a connecting rod 44 pinned thereto to project out of the cylinder liner 36 through the annular portion 316 of the cylinder mount 12.

A cylinder head 338 is fitted over the end of the cylinder liner 36 opposite the cylinder mount 12 to close off that end. The cylinder head 338 has three fastener holes 350 extending therethrough parallel to and equally spaced about its cylinder receiving opening 352, with three corresponding fastener receiving holes 354 extending through the annular portion 316 of the cylinder mount 312 parallel to and equally spaced about the central opening 330 thereof. Three fasteners 356 are passed through the holes 350 in the cylinder head 338 and extended into the holes 354 of cylinder mount 312 for engagement therewith to clamp the cylinder liner 336 in place between the cylinder head and mount. The intake valves 338a and the exhaust valves 338b of the cylinder heads 338 are conventional ball check valves, known to those of skill in the art, arranged to open and close in response to the pressure differences between the air within the portion of the cylinder liner between the cylinder head and piston and the surrounding air outside this space, just as in a conventional air compressor.

As illustrated by FIG. 23, a driven gear 358 has a round cylindrical projection 360 projecting perpendicularly upward from a top face 362 thereof for fitting into a bore 364 extending through the driving end 56 of the connecting rod 44 perpendicular to the length thereof to provide a pivotal connection of the connecting rod 44 to the driven gear 358. A pin 368 projects into a round central through hole 370 of the driven gear 358 from therebelow, the pin 368 also being concentrically received in the bore 320 passing through the base portion 314 and protuberance 318 of the cylinder mount 312 to provide mounting of the driven gear 358 in a rotatable fashion on the cylinder mounted 312. To accommodate the driven gear 358, a central section of the inner face 334 of the annular portion 316 at the top surface 324 of the base portion 314 has an arcuate recess 372 concentric with the axis of the bore 320.

As shown in FIGS. 23 and 26, a motor mount 374 of the third embodiment compressor 300 comprises a round annular plate 376 having a circular central opening 378 therein with four fastener holes 380 evenly spaced around the opening 378 and extending through the plate 376. The motor 26 includes a cylindrical housing 382 having two end faces through each of which a driveshaft projects for rotation. The motor 26 is lowered to seat its bottom end 384 on the annular plate 376 so that a bottom end 386 of the driveshaft projects downward through the central opening 378 in the annular plate 376. Four fasteners 387 are passed through the fastener holes 380 from beneath the annular plate 376 to engage with the bottom end 386 of the motor 26. Three legs 388 are secured to the annular plate 376 at evenly spaced points about the periphery thereof, each having a projecting portion 389 projecting downward parallel to the central axis of the central opening in the annular plate and a plate-like base portion 390 fixed at a bottom end of the projecting portion and extending perpendicularly crosswise thereto. The base portion 390 of each leg 388 sits flush atop the top surface 304 of the base 302 along and adjacent to the central segment 308a of a respective one of the longer sides 308 such that a pair of through holes 392 spaced along the cross-wise base portion 390 align with corresponding blind holes 394 extending perpendicularly into the base 302 from the top surface 304 thereof. Fasteners 396 are passed through the holes 392 in the base portion of each leg 388 to engage with the blind holes 394 of the base 302. The motor mount 374 and the motor 26 secured to the annular plate 376 thereof are thus secured to the base 302. A fan blade unit 395 is coupled to a top end of the driveshaft projecting upward from the motor housing 382 to improve air circulation for cooling during operation of the motor 26.

A drive gear 396 is fixed to the bottom end 386 of the driveshaft of the motor 26 and positioned between the three driven gears 358 at the center of the body 302 above the top face 304 thereof in intermeshing engagement with the driven gears 358. Driven rotation of the drive gear 396 by the driveshaft of the motor 26 undergoing rotation when the motor is energized by connection to an electrical supply, such as a rechargeable battery, rotates the driven gears 358 about the axes of their pins 368. Revolution of the projection 360 on each driven gear about the axis of the respective pin 368, with the connecting rod 44 pivtotally connected at its ends to the projection 360 and the piston 42, drives reciprocating motion of the piston 42 within the respective cylinder liner 36 to effect the intake and compression stroke. Prior to being engaged with the drive gear 396, the driven gears 358 may be relatively positioned about their respective axes to ensure consistent timing between the completion of the compression stroke by one piston and the completion of the compression stroke by the next piston to so complete compression during operation of the motor 26 to effect rotation of the drive gear.

Figure 24B:
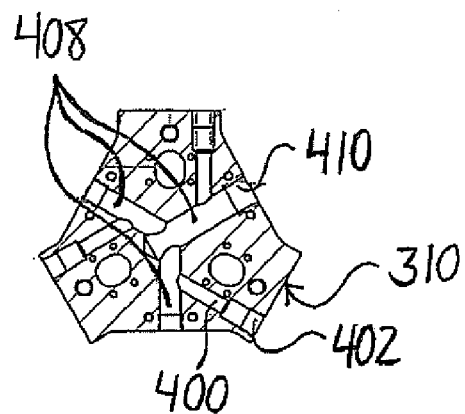
FIG. 24B is a cross-sectional view of the base of the third embodiment portable compressor.

As shown in FIG. 24B, the base 302 not only carries the gas compressors, defined by the cylinder liners, cylinder heads and pistons, and the drive system for operation thereof, but has a hollow interior defined by a series of intersecting bores to provide a manifold for collecting the air compressed in all of the cylinder liners for selective discharge through a common outlet. Extending into each shorter side 310 of the body 302 parallel to and between the top and bottom faces 304, 306 thereof is a respective receiving bore 400. An opening end 402 of each receiving bore at the respective shorter side 310 of the body periphery is threaded to engage with a correspondingly threaded end 404a of a ninety degree fitting 404. A barbed end 404b of the ninety degree fitting 404 has a rubber tube 406 sealingly fitted thereover. A straight barb fitting 407 is sealingly engaged to the opposite end of the tube 406 and sealingly coupled to the cylinder head 338 of the cylinder projecting from the same short side 310 of the base 302 in communication with the port of the exhaust valve 338b. Each exhaust valve of the compressor thus discharges the gas compressed within the cylinder liner into the respective receiving bore 400.

As shown in FIG. 24B, the receiving bores 400 do not intersect one another. Instead, a set of three additional bores 408 are provided, each extending from the central segment 308a a respective one of the longer sides 308 of the base 302 parallel to and between the top and bottom faces 304, 306 thereof, and intersect at the center of the body 302. Each of the receiver and additional bores is perpendicular to the respective side or side segment from which it extends. So as to avoid the blind holes 319 from the top surface 304 of the base 302, the receiving bores 400 each extend into the respective shorter side 310 proximate an end 310a thereof and intersect with the additional bore 408 extending centrally from the adjacent long side 308 between the same adjacent long side and the center of the body 302. With each receiving bore 400 opening into a respective additional bore 408 and the additional bores intersecting at the center of the body 302, the fluidly connected bores thus define a common hollow interior of the body.

An opening end 410 of each additional bore 408 at the central segment 308a of the respective longer side 308 of the body periphery is threaded to couple with a respective one of a connection fitting 105 for coupling to a discharge delivery hose, a pressure switch 412 to operate the motor 26 on the basis of the pressure detected within the hollow interior of the body 302 and a plug 414 to close off one of the opening ends 410 of the additional bores 408. The use of the plug 414 gives the option of connecting another component if desired with the plug removed, it may be desirable to equip the base with a pressure gauge or to provide an additional connection fitting. For example, with the connection fitting 105 illustrated in FIGS. 21 and 23 being a female connection fitting, it may be desirable to remove the plug 414 to attach a male connections fitting, thereby allowing the user to select between the two connection fittings depending on the type of hose to be connected to the compressor 300.

The hollow interior of the body 302 formed by the intersecting bores 400, 408 defines a manifold for collecting compressed air from each of the cylinder liners 36 through the hoses 406 coupled to the opening ends 402 of the receiving bores 400 and channeling the compressed air to one of the openings ends 410 of the additional bores 408 for discharge through a common outlet to a compressed air delivery hose adapted for connection to a pneumatic device. As in the first two embodiments, the manifold defining feature also acts to carry or support the plurality of cylinders. The three-cylinder embodiment shown can be used for less demanding pneumatic applications than an arrangement with more cylinders, such as the six-cylinder arrangements illustrated in the first and second embodiments. Alternatively, a larger manifold defining base may be provided so as to accommodate more gas compressors.

With the three gas compressors spaced about the driveshaft axis, as the piston of one gas compressor completes its compression stroke by reaching the fully extended position, one of the two remaining gas compressors is in its compression stroke with its piston moving toward the fully extended position and the other gas compressor is in its intake stroke with its piston moving toward the fully retracted position.

Each of the three embodiments described above provides a compressor having more than two gas compressors radially disposed about the driveshaft within a common plane so as to keep the height or thickness of the unit down. The compactness of each portable unit is improved over conventional portable compressors by having the rigid base or housing that supports the cylinders also act as the manifold for collecting compressed gas from each cylinder into the same common receiving space. Suitable materials for the compressor embodiments described above will be appreciated by those of skill in the art and include metals and plastics, with plastics or lighter weight metals such as aluminum helping contribute to the portability of the compressor by keeping its overall weight down. As shown by comparing the first and second embodiment compressors to the third, this portability does not rely entirely on having the cylinder liners disposed partly within the manifold itself or on the use of the advantageous, unique compressor valves disclosed herein, although these features do contribute a significantly compact and protected substantially enclosed unit.

As appreciated by those of skill in the art, any of the compressor embodiments described herein above may be additionally include a built-in regulator valve installed in a discharge port or outlet of the compressor to control the pressure of gas delivered by an air hose coupled to the compressor.

Integral Spider Piston/Conrod Structure

Figure 27:
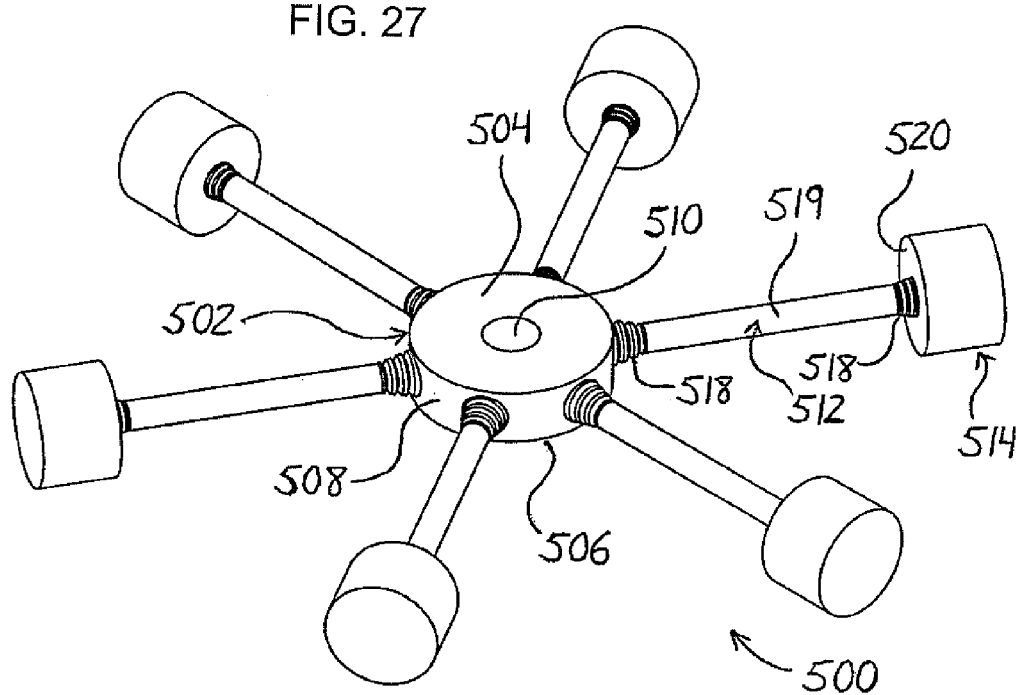
FIG. 27 is a perspective view of an alternate embodiment connecting rod and piston structure for use in a compressor having cylinders spaced about a drive axis and extending radial thereto.

FIG. 27 shows an alternate connecting rod and piston structure 500 that may be substituted for the master connecting rod 52, slave connecting rods 44 and pistons 42 of the first or second embodiment compressors 10, 200. The structure 500 is a single integral unit having a solid central body 502 having a disc-like shape with identical top and bottom circular surfaces 504, 506 and a peripheral wall 508 defining a constant height or thickness of the body 502. A central bore 510 extends fully through the center of the body 502 perpendicular to the top and bottom faces 504, 506 thereof so that the structure 500 can be journaled on the crank pin of the compressor's drive system that revolves about the rotational axis of the crankshaft about which the crank pin revolves. Six connecting rods 512 project radially outward from the peripheral wall 508 of the solid body 502 at evenly spaced points therealong, each supporting a respective piston 514 at an end opposite the central body's periphery. Each connecting rod 512 features flexible portions 518 at opposite ends of a central rigid portion 519 for connection to the peripheral wall 508 of the body 502 and a face 520 of the piston 514 nearest the body 502. The flexible portions allow the pivotal-like motion necessary between the connecting rod 512 and each of the body 502 and the piston 514 to convert the orbital motion of the central body 502 about the axis of the driveshaft into reciprocating linear motion of the piston within the cylinder liner. In other words the connecting rod 512, along a plane normal to the axis of the bore 510 through the body 502 and thus to the driveshaft axis parallel thereto, can undergo pivotal-like motion relative to the body 502 and pivotal-like motion relative to the piston 514. As a single integral piece formed by molded plastic, the connecting rod and piston structure 500 significantly reduces the number of pieces relative to the corresponding structure of the first and second embodiment compressors. This reduces the total number of parts that must be manufactured and the assembly time needed to produce the compressor.

It should be appreciated that the pistons 514 of the connecting rod and piston structure 500 may be of an unported type, like that of the first embodiment in which the face of the piston opposite the connection to the connecting rod is solid, or of a ported type including an intake valve formed thereon, like that of the second embodiment. It should also be appreciated that the number of pieces used in the drive system may similarly be reduced, although by not as much, by making each connecting rod 512 integral with only one of the piston 514 and the body 502. For example, molding the central body 502 and the connecting rods 512 into a single integral plastic unit with the ends of the connecting rods 512 opposite the body 502 adapted for pinning to separate pistons, such as in the first or second embodiment, would still reduce the number of drive system components to be assembled. As another example so would molding each connecting rod integrally with its respective piston with the end of the connecting rod opposite the piston adapted for pin or keyway based pivotal connection to a separate central body.

Piston in Valve with LSR Band

Figure 28:
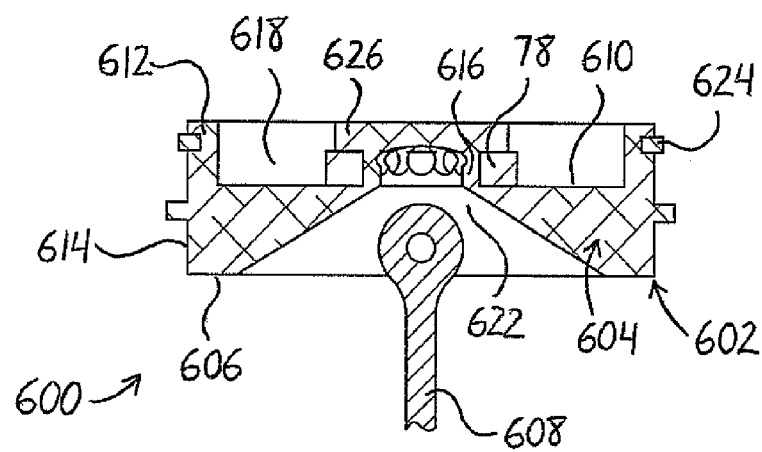
FIG. 28 is a partially cross-sectioned view of an alternate embodiment ported piston and intake valve.

FIG. 28 shows an alternate valve-equipped piston structure 600 that may be substituted for the piston and intake valve of the second embodiment compressor 200. As can be seen from a comparison of FIGS. 28 and 8C, the intake valve of the piston structure 600 is similar to the intake valve formed on each cylinder head of the first embodiment compressor. The piston 600 features an integral piston body 602 defining a round cylindrical base 604 having a drive end face 606 past which a connecting rod 608 extends and a valve end face 610 opposite the drive end face, an annular wall 612 projecting from the valve end face 610 in a direction opposite the drive end face 606 flush with the outer periphery 614 of the base 604 and a round cylindrical projecting portion 616 projecting centrally from the valve end face 610 within a hollow space 618 surrounded by the annular wall 612 and being coaxial therewith. A plurality of intake ports 620 extend radially through the cylindrical projecting portion 616 and communicate with channels 622 bored obliquely into the base 604 from the drive end face 606 thereof from radially outward of a centrally located recessed portion of the drive end face 606 accommodating the pinned connection of the piston 600 and connecting rod 608. The channels 622 converge toward the radial center of the projecting portion 616 and extend thereinto to communicate with the intake ports 620. With a seal ring 624 seated within a groove in the outer surface of the annular wall 612 partially defining the piston's periphery to provide sealed engagement between the piston 600 and the cylinder liner in which the piston is disposed, the fluidly connected channels 624 and the intake ports 620 thus define a passage fluidly communicating opposite sides of the sealing engagement between the piston and cylinder liner.

A flexible resilient band 78 like that used in the intake valve of the first embodiment and the exhaust valve of the first and second embodiments is disposed about the projecting portion 616 to seal tightly over the intake ports 620 until, during the intake stroke of the piston, the pressure of the ambient air outside the cylinder liner exceeds that therewithin enough to stretch the resilient band about the projection portion 816 to uncover the intake ports 620 and allow the ambient air to flow from outside the cylinder liner, into the channels 624 from the drive end face 606 through the intake ports 620 into the enclosed area between the piston and the end of the cylinder liner closed by the exhaust valve. As the pressure increases within this area under entry of the ambient air, the resilient band eventually tends to retighten around the projecting portion 616 to once again seal off the intake ports 620. During the compression stroke, the increasing pressure within the cylinder liner acts only to further retain the resilient band 78 of the intake valve in this closed sealing position over the intake ports 620.

A flange 626 disposed at the end of the projecting portion 616 opposite the valve end face 610 of the cylinder body's base 604 projects radially outward from the projecting portion 616 around the full circumference thereof to define a seat or groove extending around the projecting portion 616 between the flange 626 and the valve end face 610 to keep the resilient band 78 in position about the ported projecting portion 616. The flange 626 blocks the resilient band 78 from moving axially along the projecting portion 616 when to ensure that when the band resiliently retightens around the projecting portion, it will be in position to once again cover the intake ports 620.

It should be appreciated that the first embodiment compressor 10 may be modified to remove the cylinder heads 48 and have the outer periphery of the compressor, as defined by the exterior wall 16 of the housing, closed about the cylinder liners 36, and instead use the piston mounted intake valves of the second embodiment compressor 200 or the alternate piston structure 600. This would of course require that at least one opening be provided to communicate the environment surrounding the compressor with the crank chamber surrounded by the interior wall 30 of the housing 12, for example by extending through the lid or cover 14 opposite the lid or cover 16 to which the motor 26 is mounted.

Pumps

Although the embodiments described herein above are each presented in terms of an air compressor, it should be appreciated that the unique and advantageous features may be useful not only in the context of gas compressors, but also in the context of a reciprocating pump used to convey a fluid from areas of lower pressure to higher pressure with little or no compression of the fluid. For example, a more compact piston-based multiple-cylinder reciprocating pump may be produced using the ideas of having a base or frame not only carry the cylinders but also defining a manifold, or even disposing the cylinders partly within the manifold. The unique valve arrangements of the compressors described above will offer the same advantages within a pump. The compressors disclosed above may be used as submergible pumps, the intake of the compressors from the surrounding ambient air being analogous to the intake of a pump from the surrounding fluid in which it is submerged. Alternatively, the unit may be connected to a fluid source fluidly sealed to the unit to communicate with the intake ports.

For example, a pump of similar structure to the first and second embodiment compressors may be used to pump water out a gas well or pump gas into the earth in underground storage reservoirs. Components of such a pump may be produced using inert epoxies rather than aluminum or another metal to prevent the potential for reaction when in contact with fluids or solutions, and the LSR based valves may offer improved resistance to exposure to abrasive-containing fluids. The relatively high efficiency of the pump allows powering thereof by a battery or photocell, thereby allowing use in areas where there may not be an existing electrical supply. For example, the pump may be used at remote well sites where electrical transmission lines have not been set up, thereby avoiding or delaying the high cost and environmental impact associated with the installation of such a long-distance electrical transmission system. As an example, where more pumping power than that provided by a single unit is required to remove water from a well, a series of pumps having housings resembling those of the first or second embodiment compressors may be mounted on a single driveshaft extending through each one with the discharge conduit of one pump connected to the intake of the next. The pumps would be lowered into the well on the driveshaft to pump fluid through the series of pumps upward from one to next and eventually to the surface. The sealing rings of the pistons used in such a pump may use polyetherketone on the basis of its known relatively high chemical resistance to increase the life of the pump.

Carrying Handle

Figure 29:
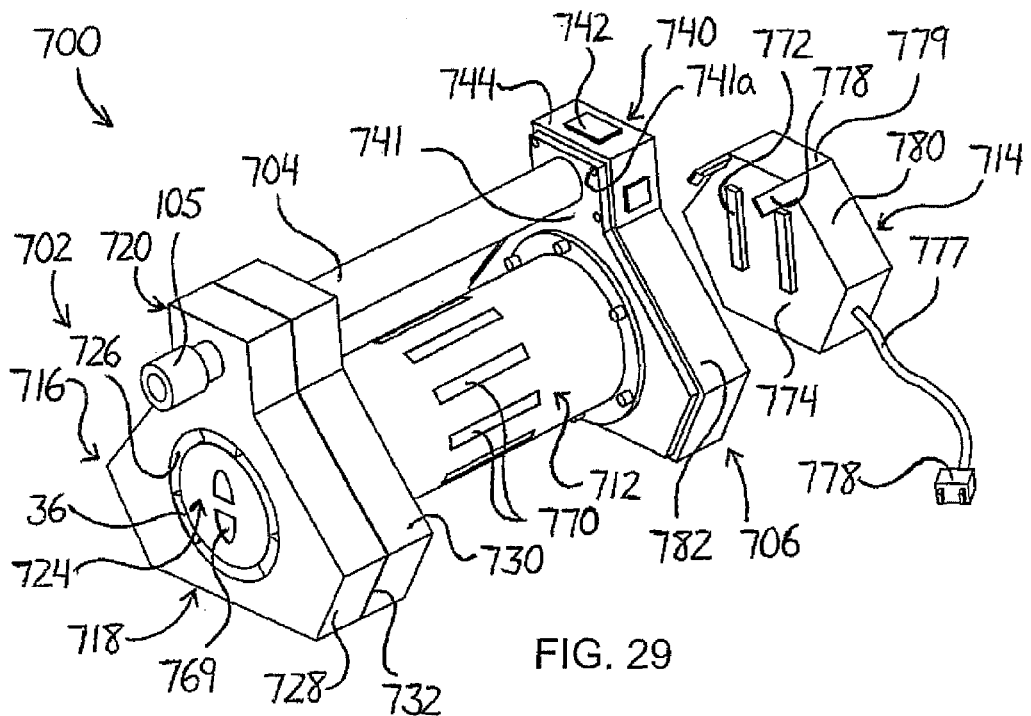
FIG. 29 is a perspective view of a portable compressor assembly and a detachable battery charger for use therewith.

FIG. 29 shows a portable compressor assembly 700 featuring a compressor 702 similar to that of the second embodiment compressor described herein above. The compressor 702 is mounted at one end of a hollow cylindrical tube 704 of circular cross section defining a carrying handle having a rechargeable battery pack 706 mounted at the opposite end thereof. A motor is contained within a cylindrical housing 712 of circular cross section extends parallel to the carrying handle 704 therebelow and is operationally connected at its opposite ends to the battery pack 706 and the compressor 702. A power adapter or battery charger 714 can be releasably mounted to and electrically coupled with the battery pack 706 as needed to charge the battery or run the motor from a conventional AC electrical socket. The assembly 700 is compact, easy to carry by hand and well balanced due to the relative positioning of the components.

Figure 30:
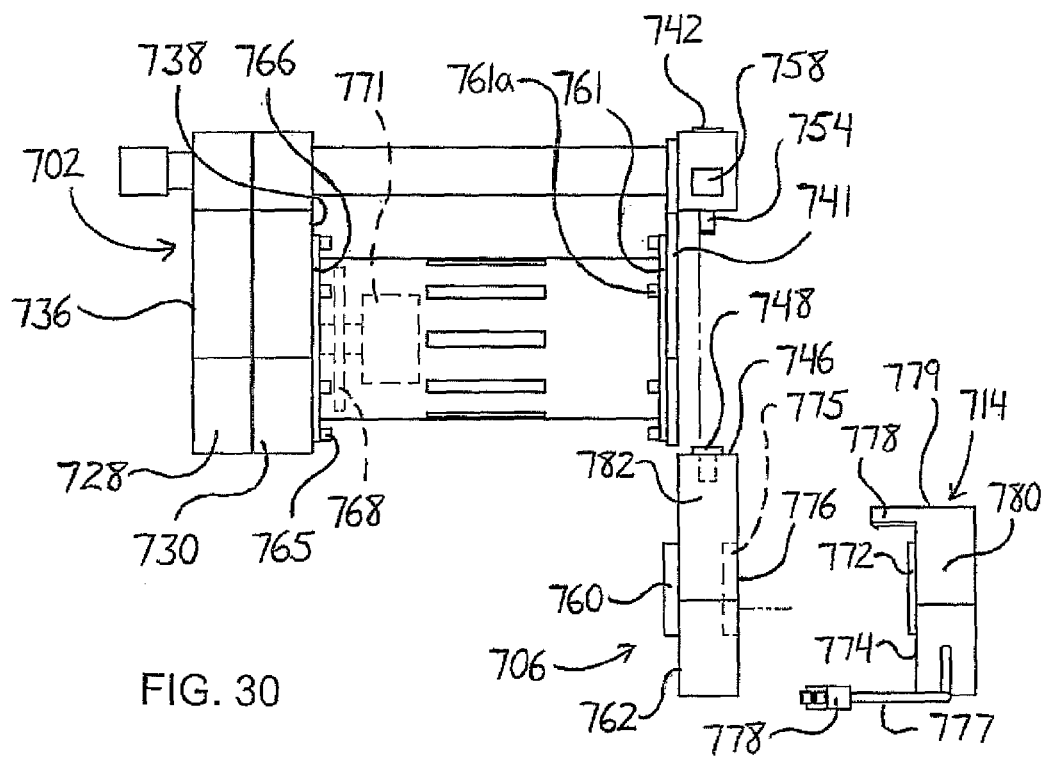
FIG. 30 is a side elevational view of the portable compressor assembly and the detachable battery charger with a detachable battery pack removed.

As shown in FIGS. 29 and 30, the compressor 702 differs from the second embodiment compressor in that it features only three cylinder liners 36 and has a different outer peripheral shape. The receiver housing 716 can be considered to have two portions, a main bottom portion 718 and a top projecting portion 720, divided by imaginary line 722 in FIG. 31 (the words top and bottom being used herein in relation to the positioning and orientation shown in the particular figures being referenced). This three cylinder arrangement results in the main portion of the receiver housing 716 having a six sided shape different than the shape of the receiver housing 202 of the second embodiment compressor, which is somewhat like a regular hexagon with equal length sides but with the sides somewhat curved and the corners rounded, and more similar to the peripheral shape of the manifold-defining base 302 of the third embodiment compressor 300, but without the longer sides being recessed inward from the shorter sides at which the cylinders are disposed. The main portion 718 of the receiver housing 716 of the compressor 702 thus has a peripheral shape of six sides, three equal length longer sides alternating about the periphery with three equal length shorter sides as if formed by a triangle having each of its corners cut away along a straight line between the two sides the previously intersected to define the corner. The three cylinder liners 36 are evenly spaced about the crank housing 724 disposed within the central opening of the receiver housing, defined by the inner peripheral wall 726 of the main portion 716, to project from the crank housing 724 into the receiver housing 716 toward each of the shorter outer peripheral sides of the main portion 716 thereof. As in the second embodiment, a channel-like manifold extends around the central opening in the receiver housing 716 and is sealed around all of the cylinder liners 36 at the valve ends thereof to define the receiver space into which compressed air is discharged from each cylinder liner during the compression stroke of the piston sealed therein.

Figure 31:
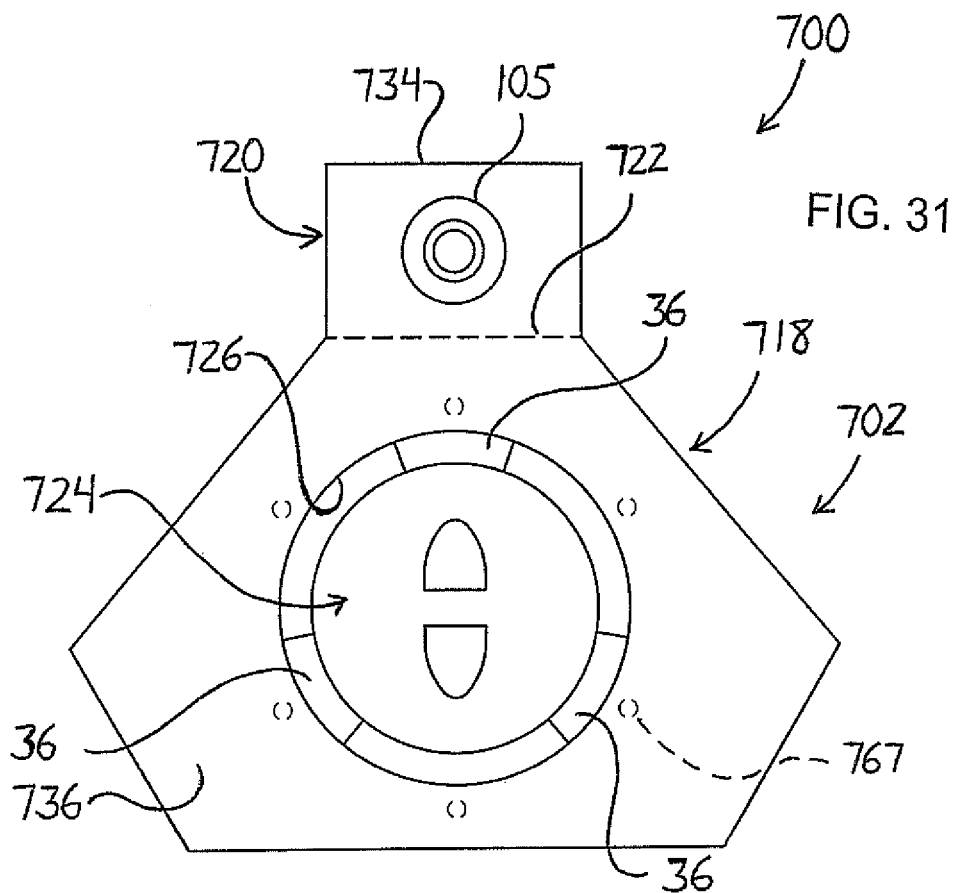
FIG. 31 is an opposite end elevational view of the portable compressor assembly.
Figure 31A:
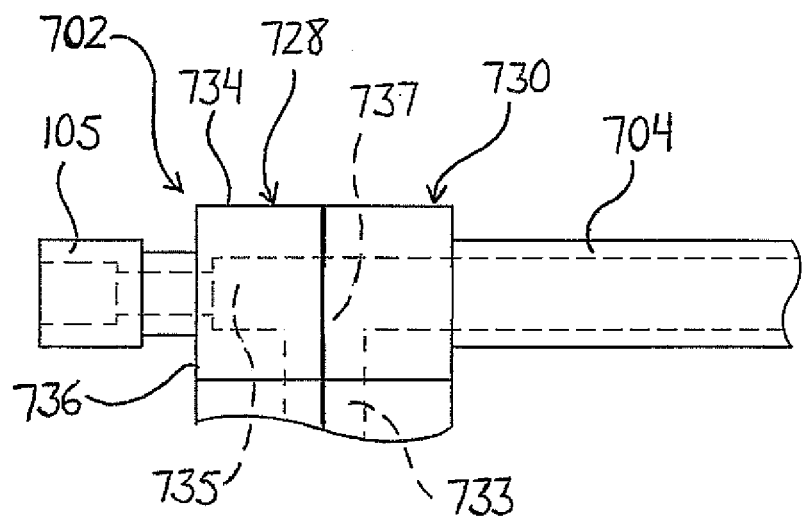
FIG. 31A is a partial close up side elevational view of a compressor and carrying handle of the portable compressor assembly.

The projecting portion 720 of the receiver housing 716 is rectangular in shape, projecting perpendicularly upward from the flat top of the main portion 718 at imaginary line 722 in FIG. 31. Each of the two halves 728, 730 of the receiver housing 716, mated face-to-face in a sealed arrangement as illustrated by line 732 of FIG. 29 in a manner similar to those of the second embodiment, is integral, meaning that the main and projecting portions of each half are defined by a single piece of material. As shown in FIG. 31A, a hollow linear cylindrical channel 733 extends into the projecting portion 718 vertically upward along a central axis thereof from the annular manifold defining channel in the main portion 718 in a direction perpendicular to the imaginary border 722 between the two portions. Like the annular manifold-defining channel of the second embodiment, the linear channel and annular channel of the compressor 702 are each formed by cooperating grooves or recesses in the two halves 728, 730 of the receiver housing 716. Due to the intersection of the annular and linear cylindrical channels, the outer seal disposed around the annular channel does not form a closed circle, but instead arcs around the annular channel from adjacent one side of the linear cylindrical channel to the other and extends upward along both sides of the linear cylindrical channel toward the top face 734 of the receiver housing 716 to close around the upper limit of the linear cylindrical channel 733.

As shown in FIG. 31A, a cylindrical bore 735 extends perpendicularly through the cylindrical channel 733 at the projecting portion 720 right through the receiver housing from the outer non-mating face of one half 728 thereof to the outer non-mating face of the other half 730, that is, from the handle side of the compressor to the side opposite the handle 704. The cylindrical channel 733 extending from the annular manifold-defining channel within the main portion 718 of the receiver housing 716 ends at its intersection with the cylindrical bore 735, forming a T-shaped juncture 737 between the top face of the 734 of the projecting portion of the receiver housing and the parallel imaginary top end 722 of the main portion 718. The bore 735 corresponds most closely to the gas passageways of the first and second embodiment compressors, acting to form an outlet from the manifold, or receiver, defined within hollow interior of the receiver housing, but differs in that it extends through both halves of the housing. At the outer face 736 of the outer half 728 of the compressor's receiver housing 716, opposite the handle 704 and motor housing 712, the bore 735 is threaded to receive and sealingly engage a conventional female quick connect fitting 105 to allow connection of an air hose equipped with a corresponding male half at one end. At the inner face 738 of the inner half 730 of the receiver housing 716, nearest the handle 704 and motor housing 712, the bore 735 is threaded to receive and sealingly engage with a correspondingly threaded end of the hollow cylindrical carrying handle 704. By this arrangement, the hollow interior of the cylindrical carrying handle 704 is in fluid communication with the manifold or receiver, which receives compressed gas from the cylinder liners 36 during operation of the compressor 702, via the intersecting cylindrical channel 733 and bore 735.

The end of the hollow carrying handle 704 opposite the compressor 702 is passed through a suitably sized hole in a supporting plate 741 and is threadingly engaged with a threaded bore 739 communicating with a hollow interior of an otherwise enclosed control box 740. The hollow interior of the control box 740 is thus in fluid communication with the hollow interior of the handle 704, the bore 735 and cylindrical channel 733 in the projecting portion 720 of the receiver housing 716 and the annular channel within the main portion 718 of the receiver housing 716. These interconnected areas thus define a single enclosure for receiving compressed air during operation of the compressor 702 and having a single outlet or discharge at the female air hose quick connect component 105. A pressure switch (not shown) is mounted within the hollow interior of the control box 740 and wired to an on/off switch 742 mounted on a top surface 744 thereof.

The supporting plate 741 has a similar but slightly smaller peripheral shape as the receiver housing 716 of the compressor 702, the hole in the plate 741 through which the handle 704 passes through being situated in the part of the plate corresponding to the projecting portion 720 of the compressor's receiver housing 716. Threaded fasteners 741a pass through the plate 741 from the side thereof into threaded receivers 740a in the control box at the face thereof past which the handle extends for engagement therewith. The portion of the plate 741 corresponding to the main portion of the compressor's receiver housing projects downward from the plate's attachment to the control box 740 to support the motor housing 712. Beneath the control box 740 is the rechargeable battery pack 706 releasably coupled to both the control box 740 and the motor housing 712 to establish electrical connection with the motor within the motor housing 712 via the on/off switch 742 and pressure switch of the control box 740 via circuitry known to those of skill in the art.

With the on/off switch 742 set to on, the battery pack 706 is electrically connected to the motor within the motor housing 712 when the pressure measured by the pressure switch in the control box 740 is below a predetermined limit. The driveshaft of the motor, extending along the cylindrical housing 712 surrounding it parallel to the handle 704, projects concentrically into the central opening in the crank housing 724 and connects to the crankshaft of the compressor 702 so that powering the motor drives rotation of the crankshaft to operate the compressor. A pneumatically driven device can be fluidly connected to the outlet defined by the second cylindrical channel 735 at the outer face 736 of the compressor 702 via an air hose coupled with the female quick connect component 105 for operation by the compressed air provided from the portable compressor assembly 700.

In the embodiment of the portable compressor assembly 700 shown in FIGS. 29 to 31, the control box 740 has the same size and shape as the projecting portion 720 of the compressor 702 and the battery pack 706 has the same size and shape as the main portion 718 of the compressor 702. When assembled, the control box sits atop the battery pack 708 on the flat top surface 746 thereof as defined by one of the shorter sides of the six-sided battery pack. With the battery pack 706 engaged to the motor housing 712 and the control box 740, which is threaded to the corresponding externally threaded end of the hollow cylindrical handle 704, the combined battery pack 706 and control box is in the same orientation as the equally sized and shaped compressor 702, providing a balanced, somewhat symmetric appearance. Having the combined weight of the battery pack 706 and control box 740 being similar to the weight of the compressor 702 may also contribute to a more balance weight distribution across a center plane of the cylinder, depending on the weight distribution within the motor housing 712.

Figure 30A:
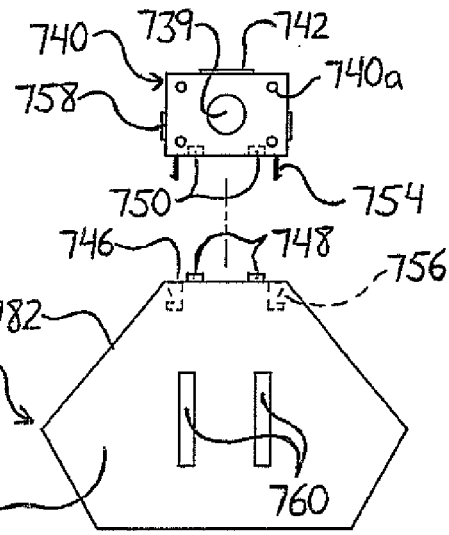
FIG. 30A is an exploded end elevational view of the detachable battery pack and a control box of the portable compressor assembly.
Figure 30B:
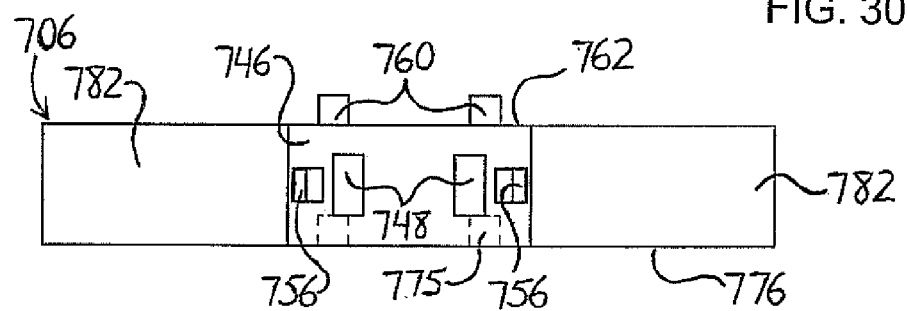
FIG. 30B is an overhead plan view of the detachable battery pack of the portable compressor assembly.

FIG. 30 shows the portable compressor assembly 700 with the detachable battery pack 706 removed. The removable mounting of the battery pack allows for substitution of a drained battery pack for a charged one, easy replacement of an old, damaged or defective battery pack and charging of a battery pack remote from the rest of the assembly. As shown in FIGS. 30 and 30A, the battery pack 706 has a pair of spaced-apart electrical contacts 748 projecting normally from the flat top surface 746 thereof for contact with a corresponding pair of contacts within a pair of recesses 750 projecting normally upward from the otherwise flat bottom surface 752 of the control box 740 into the hollow interior thereof. The sizing and spacing of the battery pack contacts 748 and the control box recesses 750 are such that the battery pack contacts 748 project into the recesses 750 and contact the control box contacts therein when the control box 740 is lowered onto the battery pack 706 to bring the top surface 746 of the battery pack and the bottom surface 752 of the control box into flush face-to-face contact.

To lock the battery pack and control box together when the two components are brought together in such a manner, a pair of resiliently biased latches 754 project downward from the bottom surface 752 of the control box 740 inward of the opposite ends thereof. The latches 754 are biased into the parallel vertical positions shown in FIG. 30a where each extends normal to the bottom surface 752 of the control box, but can be forced to converge toward one another away from the control box. When the control box 740 is lowered onto the battery pack, the latches depend into openings or recesses in the upper surface 746 thereof and sloped surfaces 756 within these openings forcing the latches 754 slightly together out of the biased positions as they move further downward into the openings. Once the latches pass the bottom end of these surfaces 756 they bias away from one another back to their parallel positions to catch a ledge defining end of each latch on the bottom edge of the respective sloped surface, which prevents inadvertent withdrawal of the latches from the openings and separation of the control box and battery pack. To detach these components, the user simultaneously depress two push buttons 768 disposed at the opposite ends of the control box 740, that is the ends thereof on opposite sides of the longitudinal axis of the handle 704, to once again force the latches out of their biased positions to move toward one another and disengage from about the bottom edges of the sloped surfaces 756 so that they can be withdrawn from the openings. Releasable latching arrangements of this type are known for connection of rechargeable battery packs to portable electrical tools, such as hand held cordless drills.

Figure 30C:
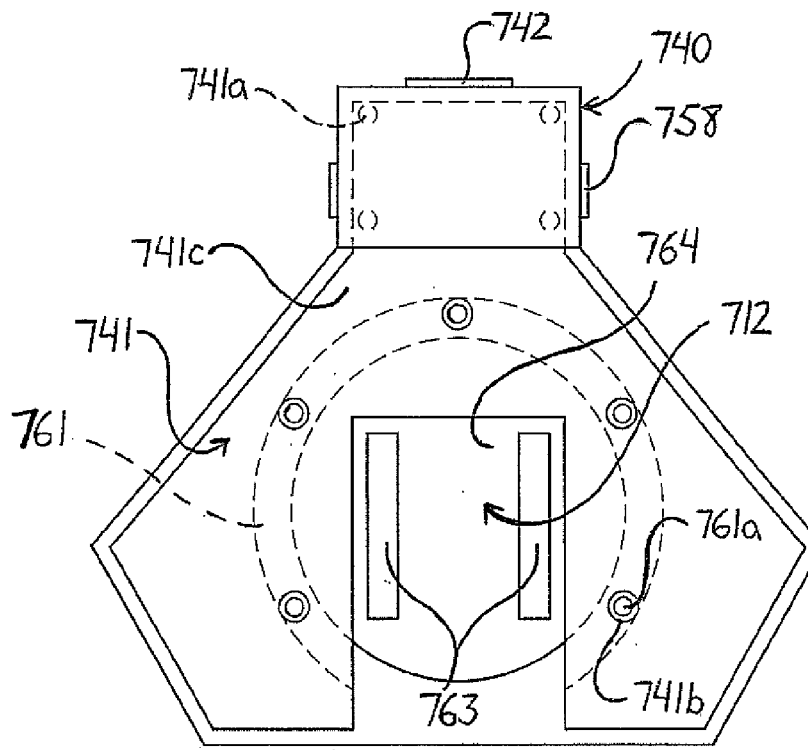
FIG. 30C is an end elevational view of the portable compressor assembly without the detachable battery pack thereof installed.

An additional pair of electrical contacts 760 in the form of parallel elongate rails extending along an inner face 762 of the battery pack are sized and shaped to slide upward into a corresponding pair grooves 763 provided in a respective end face 764 of the motor housing 712. As shown in FIGS. 29 and 30c, a flange 761 projects radially outward from the motor housing 712 about the end face 764 thereof to allow fasteners 761a past through this flange 761 to engage with the supporting plate 741 at points circumerfentially spaced about the motor housing 712. The plate 741 so supporting the motor housing is of sufficient thickness to have recesses 741b in a face 741c of the plate opposite the motor housing 712 so that the heads of the fasteners 761a are recessed from this face 741c, which thus remains flat and smooth for sliding of the battery pack 706 therealong into and out of engagement with the control box 740. A slot 741d extends upward from the bottom of the plate 741 to expose the parallel grooves 763 in the end face 764 of the motor housing 712 extending upward from the bottom thereof for receipt of the rail-like electrical contacts 760 of the battery pack 706, which project far enough from the end face 762 of the battery pack 706 to extend through the slot 741d of the plate into the grooves 763 of the motor housing 712 as the battery pack 706 is lifted upward along the outer face 741c of the plate 741 into engagement with the control box 740. The flange 761 of the motor housing 712 does not completely encircle the end face 764 thereof, but stops on each side of the pair of grooves 763 so as to not project therebelow and block sliding access thereto by the battery pack contacts 760.

Like the recesses 750 in the control box 740, the grooves 763 in the motor housing 712 contain electrical contacts positioned for physical contact with the rail-like electrical contacts 760 of the battery pack 706 once sliding thereof up into full latching engagement with the control box 740 is completed, the motor housing contacts being wired to the motor for powering thereof. The electrical contacts 748 and 760 on the top surface 746 and inner face 762 of the battery pack 706 respectively are wired therein for electrical connection of the at least one rechargeable battery or cell within the pack to the motor in the motor housing 712, via the on/off and pressure switches in the control box 740.

The motor housing 712 is secured to the compressor 702 by threaded fasteners 765 fed through another flange 766 projecting radially outward from the periphery of the round cylindrical motor housing 712 at an end thereof opposite the battery pack 706 to engage with threaded blind-holes 767 extending into the inner half of the receiver housing 716 from the inner face 738 thereof. As shown in FIG. 31, the motor housing securing fasteners 761a, 765 of the illustrated embodiment are provided in pairs at each end of the motor housing 712, the fasteners of each pair being spaced apart along a respective one of the longer sides of the six-sided main portion 718 of the receiver housing 716.

A fan is shown schematically at 768 in FIG. 30, mounted within the interior of the motor housing 712 proximate the flanged compressor-end thereof, which is left at least partially open so as to fluidly communicate the hollow interior of the motor housing 712 with the crank chamber of the compressor, as defined by the crank housing 724 thereof. The fan 768 is mounted on the driveshaft of the motor, shown schematically at 771, so that when the motor is powered, rotation of its driveshaft not only runs the compressor via the crankshaft thereof but also rotates the fan so as to encourage air flow into the crank chamber from the surrounding environment through an opening or inlet 769 in the crank housing lid. Although the opening 769 shown is shaped like those of the second embodiment compressor, this opening or inlet may be given the shape of those featured on the cylinder heads of the first embodiment, with the flared trumpet-like outer peripheral shape of a velocity stack inlet, to encourage an increase in velocity to bring an increased volume of air into the crank chamber A portion of the air being drawn into the crank chamber enters the cylinder liners 36 via the piston-mounted valves, just as described for the second embodiment compressor, for compression therein, while the reminder of the airflow continues into the motor housing and past the fan 768. Air flows around the motor between it and the surrounding housing 712, continuing along the housing 712 to circumferentially spaced vents or openings 770 in the housing wall proximate the end face 764 of the motor housing 712 at which the supporting plate 741 is disposed. The induction fan 768 thus assists the intake of the compressor by encouraging airflow thereinto while also providing a stream of air past the motor to help dissipate heat therefrom and discharge it from the motor housing 712. The motor mounted concentrically within the housing 712 features a round cylindrical casing that may have heat dissipating fins projecting outward therefrom toward the cylindrical housing 712 closed about the motor casing to improve heat transfer from the motor to the fan induced airflow therepast.

FIGS. 29 and 30 show the battery charger 714 that is releasably connectable to the rechargeable battery pack 706, whether attached to the control box 740 or not, for charging thereof. The charger has a casing of the same general shape and size of the battery pack 706 and the main portion 718 of the compressor's receiver housing 716 to provide a consistent appearance among the components of the portable compressor assembly 700. A pair of projecting electrical contacts 772 are provided on an end face 774 of the charger casing to cooperate with corresponding contacts mounted in recess 775 in an end face 776 of the battery pack 706 opposite the motor supporting plate 741 when these end faces are brought flush together along an axis perpendicular to them, just like the contacts cooperating between the battery pack 706 and the control box 740. Two resilient latches or clips 778 project from the charger casing in biased positions along parallel axes normal to the end face 774. A width of each clip extends obliquely downward away from a top center surface 779 of the charger casing along a respective sloped side surface 780 extending downward therefrom. The latches or clips 778 are forced out of their parallel biased positions to diverge away from the end face 774 of the charger casing and the charger is pushed into flush face-to-face contact with the battery pack 706 to connect the electrical contacts of the two components. With the charger 714 so positioned relative to the battery pack 706, the latches or clips 778 return to their biased positions with latching ends being disposed just past the end face 762 of the battery pack 706 at which the motor housing 712 is disposed. The ledges or shoulders formed at the latching ends engage about the edges defined between the motor-side face 762 of the battery pack 706 and the sloped side surfaces 782 thereof extending downward and away from the battery pack's top surface 746. This engagement prevents withdrawal of the battery pack along the axis normal to the mated surfaces of the battery pack and charger. The non-vertical edges to which the clips or latches 778 engaged also acts to resist downward sliding of the charger 714 off the battery pack 706. Fall of the charger down from the battery pack is also resisted by contact of the bottom ends of the charger's electrical contacts 772 on shelves defined by closed bottom ends of the corresponding recesses 775 in the battery pack's outer end face 776.

An electrical cord 777 coupled to the charger 714 includes a conventional plug 778 for connection to a conventional AC outlet, and the charger 714 and battery pack 706 are configured to allow either one of charging the battery pack when drained or powering the DC motor via the power and pressure switches when the cord 777 is connected to an appropriate external power source.

Figure 32:
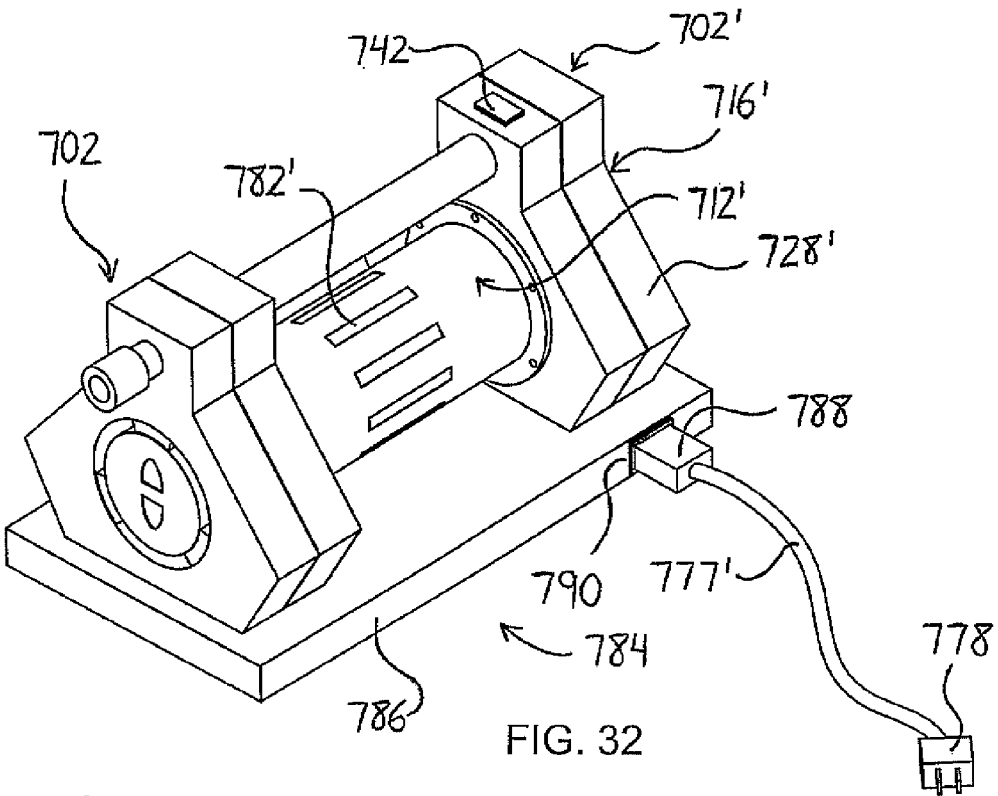
FIG. 32 is a perspective view of an alternate embodiment portable compressor assembly.

FIG. 32 shows an alternate embodiment portable compressor assembly 784 that has a similar appearance to the portable compressor assembly 700 of FIGS. 29 to 31. The alternate embodiment portable compressor assembly 784 however, features not one, but two reciprocating compressors 702, 702', one at each end of the hollow carrying handle 704. The two compressors 702, 702' are nearly identical, except for a few differences in the projecting portions 702, 702'. Compressor 702 is identical to the other portable compressor assembly detailed herein above. Compressor 702' differs however in that the cylindrical bore fluidly communicating with the hollow cylindrical carrying handle 706 is not equipped with a female quick connect fitting 105, but rather is either plugged at the outer non-mating face of the outer half 728' of the receiver housing 716' or does not extend fully through this face at all. The annular manifold-defining channels of the two compressors 702, 702' are fluidly communicated with on another through the conduit-defining hollow carrying handle 704 via the cylindrical bores and cylindrical channels of the two compressors for discharge through the single outlet defined at the female quick connect fitting 105. The on/off switch 742 is mounted at the top surface 734' of the second compressor 702' in the same position as the other embodiment, and wired to a pressure switch (not shown) communicating with the common enclosed space fed by the cylinders of the two compressors.

The motor housing 712' is connected to each of the compressors 702, 702' by flanges and fasteners at each end, as described for the single compressor of the other embodiment, with each end being open in fluid communication with the crank chamber of the respective compressor. The motor contained within the motor housing 712' is centrally mounted therealong and has the driveshaft extending from both of its ends, each end of the driveshaft connected to the crankshaft of a respective one of the two compressors. Two fans are mounted on the driveshaft for driven rotation thereby, each between the motor and the respective compressor. The openings 782' in the peripheral wall of the motor housing 712' and circumferentially spaced thereabout are located centrally along the housing 712', that is, spaced about the motor. Each fan operates in the same way to draw air into the crank chamber of the respective compressor through the inlet defined by the openings in the crank housing lid so that a portion of the air flow is drawn into the cylinders for compression and a remaining portion of the air flow continues into the motor housing 712' past the fan to the motor. The air flows from the two fans meet at the longitudinal center of the motor housing 712' in the space between the motor and the surrounding peripheral wall of the housing and disperse outward through the vents or openings 782'. Convection heat transfer occurs from the motor to these air flows so that heat is carried out of the housing through the openings 782' to cool the motor and housing.

As shown in FIG. 32, the alternate embodiment portable compressor assembly 784 features a rectangular power device 786 that not only delivers electricity to the motor disposed within the motor housing 712, but also acts to define a base of the assembly. The two compressors sit atop the rectangular power device 786 carrying the motor housing 712' between them. The power device is wired to the motor via the on/off switch 742 and the pressure switch, which may be mounted to compressor 702' in proximity to the on/off switch. The power device includes a conventional removable electrical cord 777' with a male plug 778 for connection to a conventional AC electrical socket and a female end 788 for manually releasable connection to male prongs provided within a recess 790 in the outer shell of the power device 786. The power device may be an adapter for converting the electricity from the AC external power supply for use with the DC motor. Alternatively, the power device may include at least one rechargeable battery or cell with a built in charger using the removable cord 777' for connection to an external power supply, or may be a unit capable of either charging its internal rechargeable battery or running the motor when connected to an external power supply. The power device may be manually detachable for releasable connection to the compressors or motor housing to allow quick and easy replacement thereof by known releasable fastening methods, for example by the use of flexible resilient clips similar to those used to connect the battery charger and battery pack of the other portable compressor assembly embodiment for engaging between the compressors 702, 702' and the power device 786, in which case mating male (projecting) and female (recessed) electrical contacts also similar to those taught above can provide breakable electrical contact between the detachable components.

The assemblies of FIGS. 29 to 32 are easy to carry and provide a relatively compact arrangement, especially when used with compressors of the type described herein above where the cylinders extend radial to the driveshaft axis at positions spaced thereabout in a common plane perpendicular to this axis. The relatively high efficiency of the first and second embodiment compressors means that the handle assembly can be used to provide a portable unit comfortably carriable in one hand that can be easily transported from site to site and is capable of use in higher demand applications than previously available portable units. Other portable compressors may be similarly equipped with a handle carrying a battery pack or additional compressor at the opposite end and adapted to have its motor carried between the ends of the handle.

Electronic/Pneumatic Tool System

Figure 37:
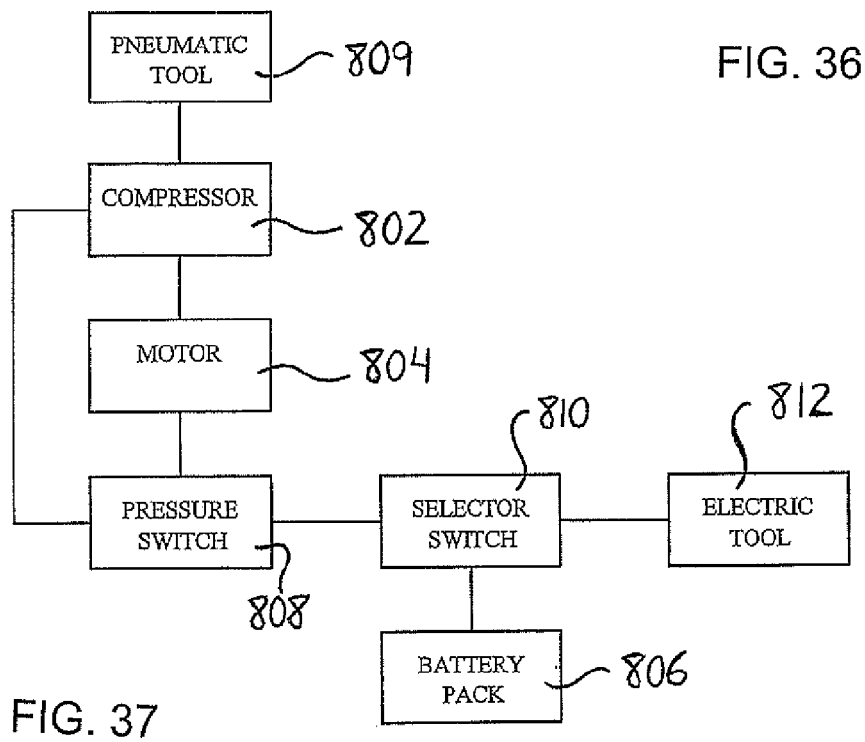
FIG. 37 is a schematic illustration of the portable tool system capable of powering pneumatic tools and electric tools.

FIG. 37 schematically illustrates a portable tool system 800 that offers a significant level of portability and flexibility, particularly when using any of the three compact compressor embodiments described herein above, which as also described above, may be carried in a backpack, bag, mesh sack or perforated container or on a leg strap or belt. The system 800 features a compressor 802 driven by a compressor motor 804, which is wired to a rechargeable battery pack 806 via a pressure switch 808 in a conventional manner to run the motor 804 in response to the demand for compressed air. A pneumatic tool 809 is connected to the compressor via an air hose for selective operation. A selector switch 810 is wired between the battery pack 806 and the pressure switch 808, the switch also being wired to electrical connections for selective coupling with an electric tool 812. The switch 810 has an off position, a pneumatic-tool-on position and an electric-tool-on position in which the battery pack is electrically isolated, connected to the pressure switch and motor, and connected to the electric tool respectively. The system 800 is set to off when not in use, or set to power one of either the pneumatic tool or the electric tool.

Figure 33A:
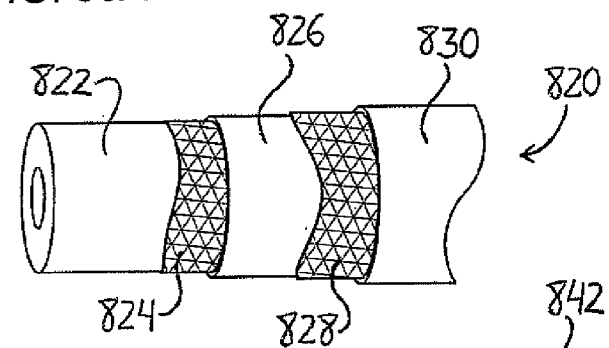
FIGS. 33A, 33B and 33C are perspective views of cut and partially stripped sections of three embodiments of a hose adapted for use in a portable tool system capable of powering pneumatic tools and electric tools.
Figure 33B:
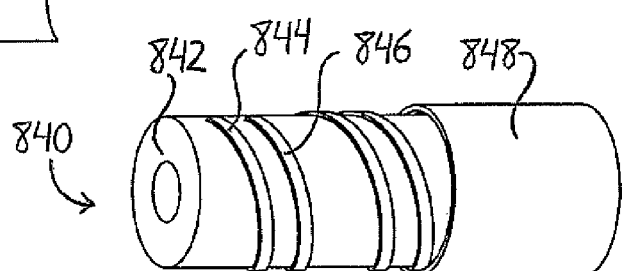
Figure 33C:
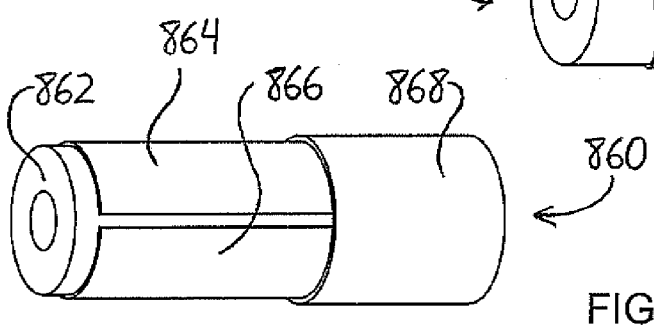

FIGS. 33A to 33C show three hose structures each adapted for use in the portable tool system 800 to deliver both air to the pneumatic tool 809 and electricity to the electric tool 812 so as to define a single power delivery unit capable of connection to both pneumatic and electric tools.

FIG. 33A shows a first hose 820 featuring a flexible tube 822 of electrically insulating material defining an airway through which compressed air is delivered from the compressor to the pneumatic tool. A first flexible conductive layer 824 is formed by a mesh of conductive material wrapped around the outer periphery of the flexible tube 822 to extend along the length thereof from one end of the hose to the other. A middle layer 826 of electrically insulating material is extends about the first conductive layer 824, to separate and electrically isolate the first conductive layer 824 from a second conductive layer 828 of flexible conductive mesh closed around the middle insulating layer 826. Finally, an exterior cover 830 of electrically insulating material covers the second conductive layer 828 to form the external periphery of the hose 820. The alternating layers of insulating and conducting materials maintain the necessary electrical isolation of the conducting layers to prevent shorts thereacross while also covering the conductors both inside and outside the hose 820.

FIG. 33B shows a second hose 840 also having a hollow flexible tube 842 through which air is delivered, but instead of alternating conducting and insulating layers, having a first conductive wire or strip 844 and a second conductive wire or strip 846 spiraled around the flexible tube 842 in a parallel spaced-apart fashion between opposite ends of the hose 840. The parallel spiraled arrangement gives the appearance of stripes having the repeating pattern: first conductor, space, second conductor, space; extending along the flexible tube 842, where each "space" stripe is an uncovered portion of the flexible tube 842. The spacing between the spiraled conductors electrically isolates them while allowing a greater degree of flexibility in the resulting hose structure. To ensure the conductors do not make contact and create a short during flexing of the hose, each conductor has its own outer insulating layer. Like in the first hose 820, an outer insulating layer 848 covers the conductive layers and flexible tube to define the outer periphery of the hose 840, protect the layers beneath it and prevent contact with any conductor from outside the hose. The flexible tube 842 prevents contact with any conductor from inside the hose.

Figure 34A:
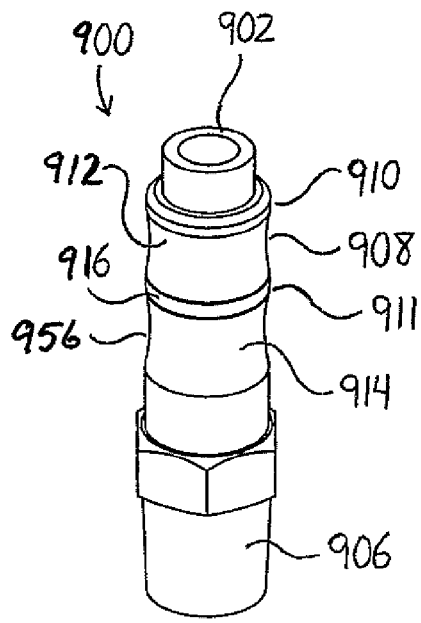
FIGS. 34A and 34B are perspective views of matable male and female connectors respectively, for use in the portable tool system.
Figure 34B:
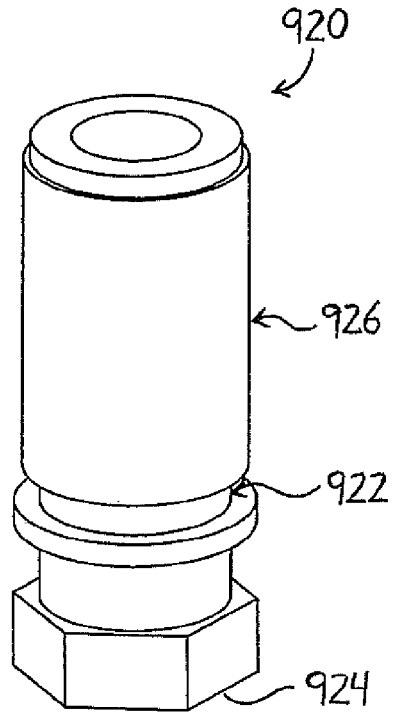
Figure 35:
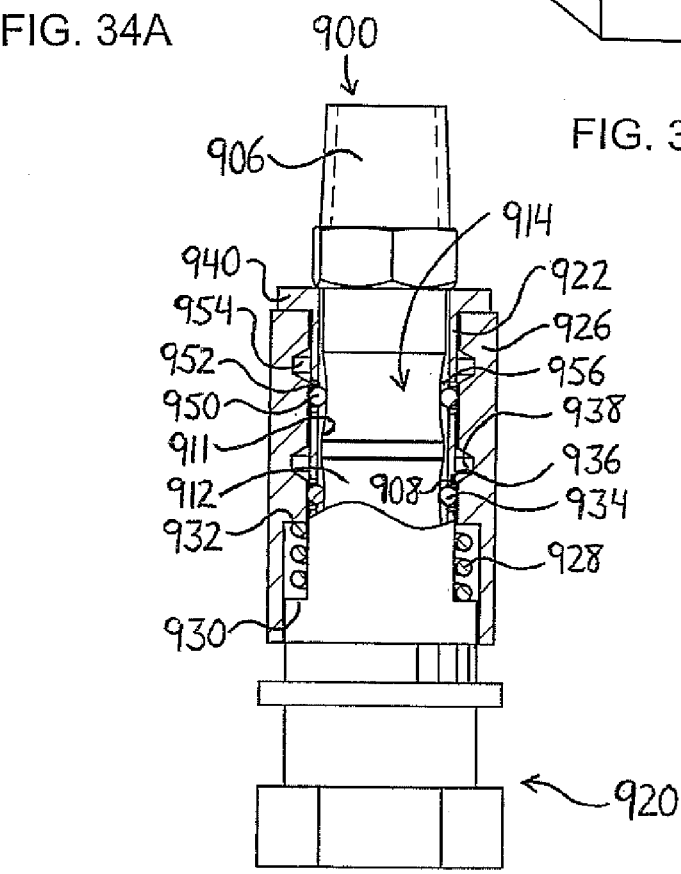
FIG. 35 is a side elevational, partially cross sectioned view of the male and female connectors for use in the portable tool system when mated together.

FIG. 33C shows a third hose 860, in which a hollow flexible tube 862 has a first conductor 864 and a second conductor 866 extending adhered thereto to extend along the flexible tube 862 in diametrically opposite positions. Each conductor is in a band shape of significant width spanning just under half of the flexible tube's circumference so as to leave diametrically opposed gaps 866 of uncovered tube between the two conductors, each gap defining a strip of insulative spacing or separation extending along a respective side of the flexible tube. It is conceived that the two conductors may be formed of foil, conductive ribbon or a conductive coating adhered to the flexible tube. The width of the form fitting conductors adhered to the flexible tube may be varied to change the width of the insulative strips or gaps extending along the tube, for example to increase the gap width to better prevent inadvertent shorting between the two conductors. Again, an outer insulating layer 868 covers the conductive layers and flexible tube to define the outer periphery of the hose 860, protect the layers beneath it and prevent contact with any conductor from outside the hose FIGS. 34A and 34B show male and female halves of an electrical and pneumatic coupling respectively, the halves each having an overall shape similar to the corresponding half of a conventional air hose quick connect pneumatic coupling. FIG. 35 shows the two halves engaged together.

The male connector 900 has a plug tip 902, plug body 904 and a threaded end 906 opposite the plug tip 902. As in a conventional air hose quick connect, the hollow cylindrical plug tip 902 is in fluid communication with a central bore extending longitudinally through the entire male connector 900 to allow air flow therethrough and the plug body 904 is contoured or shaped to define a ball groove or recess 908 between two bosses 910, 911. The male connector 900 is different than that of a conventional air hose quick connect in that the plug body 904 includes a first tubular conductive portion 912 concentrically disposed partially within a second tubular conductive portion 914 with an insulating layer 916 extending entirely about the first conductive portion between the two conductive portions to electrically isolate them. The first conductive portion 912 projects past one end of the second to support the plug tip 902. When fitted on one end of one of the hoses 820, 840, 860, each of the conductors of the hose is electrically connected to a respective one of the plug body conductive portions 912, 914.

The male connector 900 on one end of the hose is matable with a female connector 920, of the type shown in FIG. 34B, engaged to the compressor outlet. Like that of a conventional air hose quick connect, the female connector 920 features a socket body 922 having a central bore therethrough extending the full length of the female connector from an interior threaded end 924 thereof. Over an end of the socket body 922 opposite the threaded end 924 is a hollow cylindrical sleeve 926 extending concentrically about the socket body 922 and arranged for limited sliding therealong. The sleeve 926 is biased toward the end of the socket body 922 opposite the threaded end 924 by a spring 928 mounted between shoulders 930, 932 on the exterior of the socket body 922 and the interior of the sleeve 926 respectively, limiting an annular spring-receiving space therebetween. As in a conventional air hose quick connect, bearing balls 934 are spaced about the socket body within apertures 936 through the wall thereof that taper toward the socket body interior. A groove or recess 938 extends about the sleeve in the interior surface thereof at a height just above the balls 934. The balls 934 project into the interior of the socket body 922 far enough to block motion of the boss 910 of the male connector 900 nearest the plug tip 902 past the bearing balls 934 further into the bore of the female connector 920, until the sleeve 926 is pulled down toward the threaded end 924 to align the sleeve's recess 938 with the bearing balls 934 to allow them to move radially outward as the boss 910 of the male connector 900 is moved therepast. The plug tip 902 of the male connector enters a receiving space in the female connector's bore and the sleeve 926 is released back to its spring biased position against a flange or shoulder 940 formed at the end of the socket body 922 opposite the threaded end 924. The release of the spring biased sleeve 926 forces the bearing balls 934 radially inward as they leave the recess 938 in the sleeve 926 to project into the ball groove 908 of the male connector 900 to lock it in engagement with the female connector by obstructing withdrawal of the boss 910 past the bearing balls 934.

The female connector 920 differs from a conventional one in that a second set of bearing balls 950 are provided in a second set of tapered apertures 952 spaced about the socket body's circumference above the first set of bearing balls 934, that is on a side thereof opposite the threaded end 924. A second recess 954 is provided in the sleeve's interior wall similarly spaced above the first recess 938 so as to be situated just above the second set of bearing balls 950 with the sleeve in the biased position shown in FIG. 35. A slight narrowing of the second conductive portion 914 of the male connector 900 is shown at 956. The bosses 910, 911 defining the groove 908 of the male connector are formed respectively at the ends of the first and second conductive portions 912, 914 thereof nearest the plug tip 902. The narrowing 956 of the second conductive portion 914 occurs between the boss 911 and the threaded end 906 of the male connector 900. The second set of bearing balls 950 in the female connector 920 cooperate with the second recess in the sleeve 954 and the narrowing 956 of the second conductive portion 914 of the male connector 900 in the same way as the first set of bearing balls 934 do with the first recess 938 in the sleeve 926 and the ball groove 908 of the male connector 900. Each set of bearing balls is thus in contact with a respective conductive portion of the female connector 920 when in its radially innerwardmost position, that is with the sleeve 926 in its spring biased position distal to the threaded end 924.

Figure 35A:
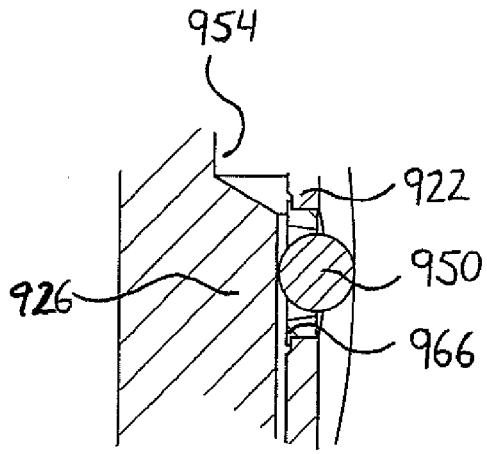
FIG. 35A is a close up side elevational view showing mounting of a bearing ball in the female connector for use in the portable tool system.
Figure 36:
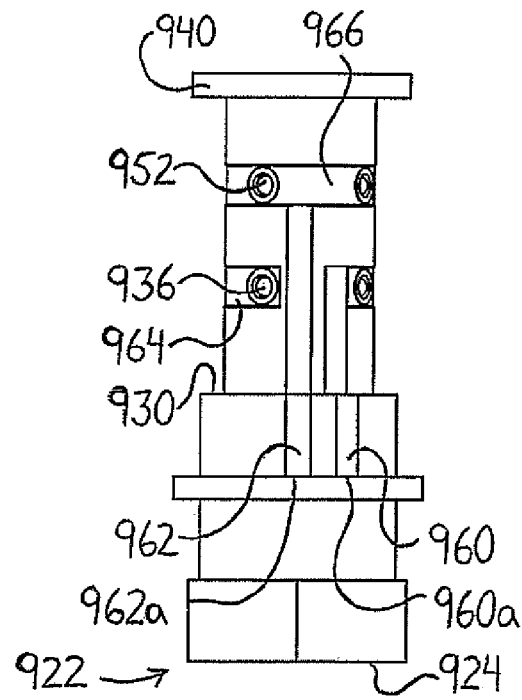
FIG. 36 is a side elevational view of a socket body of the female connector for use in the portable tool system.

Each set of metal bearing balls 934, 950 are in contact with a respective conductive portion of the female connector 920 when biased into their radially inwardmost positions projecting into the socket body interior to contact the respective conductive portion of the male connector 900. This may be achieved for example, by forming the socket body 922 of electrically insulating material and having a continuous band of conductive material coated on the socket body 922 about its outer periphery at each set of apertures retaining the bearing balls as shown in FIG. 36. The conductive bands are electrically isolated from one another by their separation along the insulative socket body 922 and the bands are electrically linked to the selector switch 810 and battery pack 806. Grooves 960, 962 extending along the socket body 922 in the exterior wall thereof allow laying of wire or other conductive material or coating of the socket body within the groove along the exterior of the socket body without interfering with the fitting of the male connector 900 within the female connector 920 or the sliding of the sleeve 926 along the socket body 922. Each band of conductive coating may be recessed slightly into the exterior periphery of the socket body 922 as shown for band 966 in FIG. 35A so as not to project outward from the rest of the socket body 922 and interfere with sliding of the sleeve 926 therealong. The figure also illustrates how connection between the conductive bearing ball 950 and band of coating 966 is established by having the coating material cover the sloping peripheral wall of the aperture so that the ball is held against the coating by the sleeve in the biased position.

The grooves 960, 962 extend from the conductive bands 964, 966 respectively toward the internally threaded end 924 of the socket body 922 for electronical connection to the selector switch 810 near that mounting end of the female connector. For example, connection ends 960a, 962a of the conductor filled grooves 960, 962 opposite the bands 964, 966 and nearest, but spaced along the socket body 922 from, the threaded connection end 924 may service as solder connection points for leads from the battery and switches to establish selective electrical connection to the bands 964, 966 and bearing ball sets 934, 950 while ensuring electrical isolation from the compressor housing coupled to the socket body 922 at the threaded end by a suitable threaded fitting as the housing or fitting may be made of conductive material. A break 968 in the conductive band 964 connecting the bearing balls of the first set 934 allows passage of a conductor past that band to the band of the second set of bearing balls 950.

When the male connector 900 is engaged with the female connector 920, the contact between the conductive bearing ball sets 934, 905 of the female connector 920 and the respective conductive portions 912, 914 of the male connector 900 connects the conductors of the hose 820, 840 or 860 to the switch. At the opposite end of the hose is another female connector 920 wired to the conductors of the hose and engagable to an electric tool equipped with another male connector 900 having its conductive portions wired to the electric drive system of the tool. With the switch 810 set to electric-tool-on and the tool activated by its switch or trigger, a circuit is closed from the battery 806, through the switch 810, through the male/female coupling at the compressor, through the hose and through the male/female coupling at the electric tool for operation thereof.

Alternatively, the female connector on the tool end of the hose may be connected to a pneumatic tool equipped with a male connector in which the conductive portions 912, 914 are not wired to anything, and thus are electrically isolated to define an open circuit through which electricity will not flow even with the switch 810 set to electric-tool-on. Alternatively, the male connector on the tool may be made entirely of non-conductive material to ensure the circuit is not closed. If the switch is set to pneumatic-tool-on, the battery is connected to the pressure switch 808 which will activate the motor 804 if the detected pressure in the compressor manifold is below the predetermined value, which will in turn run the compressor and feed compressed air through the male/female coupling at the compressor, through the air hose, through the male/female coupling at the tool end of the hose, into the pneumatic tool for operation thereof.

It is also conceived that the system may be adapted to be capable of providing both airflow and electricity to the tool end of the electric/pneumatic power delivery hose, for example for use with a hammer drill adapted to use electrical power for rotation and pneumatic power for pounding. As with the portable compressor assembly embodiments, the system may include a battery charger which may also function as an adapter for use of an external power source when desirable.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A reciprocating compressor or pump comprising:
    a housing defining a crank chamber;
    a crankshaft comprising a shaft arranged for driven rotation about an axis and a crank pin carried on the shaft eccentric to the axis within the crank chamber;
    a plurality of cylinders arranged to extend radially about the axis outward from the crank chamber; and
    a piston and rod structure comprising:
        a central body pivotally secured to the crank pin and rotatable about an eccentric axis defined by the crank pin eccentric to the axis about which the shaft is rotatable;
        a plurality of connecting rods each having a first connection at one end thereof to the central body and extending outward therefrom to a second connection, the first connection of each connecting rod allowing generally pivotal motion thereof relative to the central body; and
        a plurality of pistons each connected to the second connection of a respective connecting rod and being sealed against an interior wall of a respective cylinder, the second connection of each connecting rod allowing generally pivotal motion thereof relative to the piston;
    and intake and exhaust valves associated with each cylinder and arranged to allow passage of fluid into the cylinder, and subsequent discharge of the fluid therefrom under exertion of pressure on the fluid by the piston during movement thereof along the cylinder away from the shaft under driven rotation thereof;
    the plurality of connecting rods and the central body all being defined by a single, integral, unitary piece that also defines flexible connections between said connecting rods and the central body, the plurality of connecting rods, the central body and the flexible connections all being of a common material and integral with one another, and said connecting rods being movable relative to the central body in a generally pivotal manner by flexing of the common material at the flexible connections.

2. The reciprocating compressor or pump according to claim 1 wherein the common material is molded plastic forming the single, integral, unitary piece that defines the central body and the connecting rods.

3. The reciprocating compressor or pump according to claim 1 wherein the single, integral, unitary piece also defines the second connection, which connects each connecting rod with the respective piston through the common material.

4. The reciprocating compressor or pump according to claim 3 wherein the common material is molded plastic forming the single, integral, unitary piece that defines the central body and the connecting rods.

5. The reciprocating compressor or pump according to claim 3 wherein the single, integral, unitary piece also defines the plurality of pistons.

6. The reciprocating compressor or pump according to claim 5 wherein the common material is molded plastic forming the single, integral, unitary piece that defines the central body, the connecting rods and the pistons.

7. The reciprocating compressor or pump according to claim 1 wherein the single, integral, unitary piece that defines the central body and the connecting rods is of greater rigidity between the first and second connections of each connecting rod to the central body and the respective piston respectively than at the flexible connection between said connecting rod and the central body.

8. The reciprocating compressor or pump according to claim 2 wherein the single, integral, unitary piece that defines the central body and the connecting rods is of greater rigidity between the first and second connections of each connecting rod to the central body and the respective piston respectively than at the flexible connection between said connecting rod and the central body.

9. The reciprocating compressor or pump according to claim 3 wherein the single, integral, unitary piece that defines the central body and the connecting rods is of greater rigidity between the first and second connections of each connecting rod to the central body and the respective piston respectively than at said first and second connections.

10. The reciprocating compressor or pump according to claim 4 wherein the single, integral, unitary piece that defines the central body and the connecting rods is of greater rigidity between the first and second connections of each connecting rod to the central body and the respective piston respectively than at said first and second connections.

11. The reciprocating compressor or pump according to claim 5 wherein the single, integral, unitary piece that defines the central body, the connecting rods and the pistons is of greater rigidity between the first and second connections of each connecting rod to the central body and the respective piston respectively than at said first and second connections.

12. A reciprocating compressor or pump comprising:
a housing defining a crank chamber;
a crankshaft comprising a shaft arranged for driven rotation about an axis and a crank pin carried on the shaft eccentric to the axis within the crank chamber;
a plurality of cylinders arranged to extend radially about the axis outward from the crank chamber; and
a piston and rod structure comprising:
a central body pivotally secured to the crank pin and rotatable about an eccentric axis defined by the crank pin eccentric to the axis about which the shaft is rotatable;
a plurality of connecting rods each having a first connection at one end thereof to the central body and extending outward therefrom to a second connection, the first connection of each connecting rod allowing generally pivotal motion thereof relative to the central body; and
a plurality of pistons each connected to the second connection of a respective connecting rod and being sealed against an interior wall of a respective cylinder, the second connection of each connecting rod allowing generally pivotal motion thereof relative to the piston;
and intake and exhaust valves associated with each cylinder and arranged to allow passage of fluid into the cylinder, and subsequent discharge of the fluid therefrom under exertion of pressure on the fluid by the piston during movement thereof along the cylinder away from the shaft under driven rotation thereof;
each connecting rod and the respective piston being defined by a single, integral, unitary piece that also defines a respective flexible connection between said connecting rod and said respective piston, the connecting rod, the respective piston and the respective flexible connection therebetween all being of a common material and integral with one another, and the connecting rod being movable relative to said respective piston in a generally pivotal manner by flexing of the common material at the respective flexible connection.

13. The reciprocating compressor or pump according to claim 12 wherein the common material is molded plastic forming the single, integral, unitary piece that defines the connecting rod and the respective piston.

14. The reciprocating compressor or pump according to claim 12 wherein the single, integral, unitary piece also defines the first connection that connects each connecting rod with the central body.

15. The reciprocating compressor or pump according to claim 14 wherein the common material is molded plastic forming the single, integral, unitary piece that defines the connecting rod and the respective piston.

16. The reciprocating compressor or pump according to claim 12 wherein the single, integral, unitary piece that defines the connecting rod and the respective piston is of greater rigidity between the first and second connections of said connecting rod to the central body and the respective piston respectively than at the respective flexible connection between said connecting rod and the respective piston.

17. The reciprocating compressor or pump according to claim 13 wherein the single, integral, unitary piece that defines the connecting rod and the respective piston is of greater rigidity between the first and second connections of said connecting rod to the central body and the respective piston respectively than at the respective flexible connection between said connecting rod and the respective piston.

18. The reciprocating compressor or pump according to claim 14 wherein the single, integral, unitary piece that defines the connecting rod and the respective piston is of greater rigidity between the first and second connections of said connecting rod to the central body and the respective piston respectively than at said first and second connections.

19. The reciprocating compressor or pump according to claim 15 wherein the single, integral, unitary piece that defines the connecting rod and the respective piston is of greater rigidity between the first and second connections of said connecting rod to the central body and the respective piston respectively than at said first and second connections.

* * * * *